US005780789A

United States Patent [19]

Tsuji

[11] Patent Number: 5,780,789

[45] Date of Patent: Jul. 14, 1998

[54] GROUP MANAGING SYSTEM FOR ELEVATOR CARS

[75] Inventor: Shintaro Tsuji, Inazawa, Japan

[73] Assignee: Mitsubishi Denki Kabushiki Kaisha

[21] Appl. No.: 882,226

[22] Filed: Jun. 25, 1997

Related U.S. Application Data

[63] Continuation of Ser. No. 492,040, Jul. 21, 1995, abandoned.

[51] Int. Cl.[6] .............................. B66B 1/18; B66B 1/16; G06F 15/18

[52] U.S. Cl. .............................. 187/382; 187/380; 395/13; 395/901

[58] Field of Search .............................. 187/380, 382, 187/387, 391, 393; 395/901, 13

[56] References Cited

U.S. PATENT DOCUMENTS

| | | | |
|---|---|---|---|
| 4,935,877 | 6/1990 | Koza | 364/313 |
| 5,010,472 | 4/1991 | Yoneda et al. | 364/148 |
| 5,255,345 | 10/1993 | Shaefer | 395/13 |
| 5,307,903 | 5/1994 | Morita et al. | 187/124 |
| 5,394,509 | 2/1995 | Winston | 395/13 |
| 5,557,533 | 9/1996 | Koford et al. | 364/491 |

FOREIGN PATENT DOCUMENTS

| | | |
|---|---|---|
| 57-57168 | 4/1982 | Japan . |
| 451475 | 8/1992 | Japan . |
| 524067 | 4/1993 | Japan . |
| 5319707 | 12/1993 | Japan . |

OTHER PUBLICATIONS

"Current Situations and Problems in the Genetic Algorithm"; J. SICE, vol. 32, No. 1, Jan., 1993. (Not in English). Lao Shihong, et al.; "The Genetic Algorithm as Applied to the Optimal Call Allocation for Elevator Group Control". Lao Shihong, et al.; "GA as Applied to Constructing an Elevator Group Control System"; Proceedings of the 36th Annual Conference of the Institue of Systems, Control and Information Engineers ISCIE (May 20–22, 1992).

Shihong et al., "The Genetic Algorithm as Applied to the Optimal Call Allocation for Elevator Group Control"; 34th United Lecture Meeting of Automatic Control; pp. 347–350, 20 Nov. 1991.

Davis, L.; "Handbook of Genetic Algorithms"; pp. 1–60 Van Nostrand Reinhold, New York, 1991.

Davis, L.; "Handbook of Genetic Algorithms"; pp. 91–98, Van Nostrand Reinhold, New York, 1991.

Davis, L.; "Handbook of Genetic Algorithms"; pp. 332–349, Van Nostrand Reinhold, New York, 1991.

Mansour et al., "A Hybrid Genetic Algorithm for Task Allocation in Multicomputers"; Proceedings of the Fourth International Conference on Genetic Algorithms; pp. 466–473, 13 Jul. 1991.

Davis, Lawrence; "Adapting Operator Probabilities in Genetic Algorithms"; Proceedings of the Third International Conference on Genetic Algorithms; pp. 61–69, 4 Jun. 1989.

Cartwright et al.; "Looking Around; Using Clues from the Data Space to Guide Genetic Algorithm Searches"; Proceedings of the Fourth International Conference of Genetic Algorithms; pp. 108–114, 13 Jul. 1991.

*Primary Examiner*—Robert Nappi
*Attorney, Agent, or Firm*—Leydig, Voit & Mayer, Ltd.

[57] ABSTRACT

A system for group managing plural elevator cars according to a group management algorithm including plural parameters includes a seeking apparatus for seeking the optimum parameter set, the optimum set being taken from combinations of parameter values given to the group management algorithm. Some new sets are produced by crossover or mutation in the operation of the system. Excellent sets are accumulated in a memory using additional registrations in which excellent sets are additionally stored in the memory and deletions in which impaired sets are deleted from the memory. The optimum set is selected from the accumulated sets, so that the system can efficiently seek the optimum set.

46 Claims, 47 Drawing Sheets

Fig. 4

10B

| | |
|---|---|
| MAXIMUM VALUE OF NUMBER OF SETS TO BE REGISTERED | : Pmax |
| MAXIMUM VALUE OF NUMBER OF NEW SETS | : Nmax |
| SEEKING END DETERMINATION VALUE | : NEa |
| DELETION START DETERMINATION VALUE | : Ps |
| DELETION END DETERMINATION VALUE | : Pe |
| CORRECTION VALUE | : AVPE |
| INITIAL SET GROUP (REGULAR OPERATION) | : GPS1 |
| INITIAL SET GROUP (RUSH HOUR OPERATION) | : GPS2 |
| INITIAL SET GROUP (UP-PEAK OPERATION) | : GPS3 |
| INITIAL SET GROUP (DOWN-PEAK OPERATION) | : GPS4 |

Fig. 5

1a

| | | |
|---|---|---|
| ELEVATOR CAR SPECIFICATION DATA (ELS) | NUMBER OF ELEVATOR CARS | 4 |
| | SPEED (M/MIN) | 120 |
| | CAPACITY (PERSONS) | 20 |
| | DOWNMOST FLOOR | 1 |
| | UPMOST FLOOR | 10 |
| | DOOR WIDTH (MM) | 1000 |
| | RIDING TIME PRIORITY ALLOCATION FUNCTION | ON |
| | ELECTRIC POWER SAVING ALLOCATION FUNCTION | ON |
| | ADJACENT CAR PRIORITY ALLOCATION FUNCTION | ON |
| | LIGHT LOAD CAR PRIORITY ALLOCATION FUNCTION | ON |
| | SPECIFIC CAR PRIORITY ALLOCATION FUNCTION | OFF |
| | RUSH HOUR OPERATION | ON |
| | UP-PEAK OPERATION | ON |
| | DOWN-PEAK OPERATION | ON |
| | DISPERSING WAITING OPERATION | ON |
| | ELECTRIC POWER SAVING OPERATION | ON |

Fig. 6

1a

| | | |
|---|---|---|
| TRAFFIC FLOW SPECIFICATION DATA (TRS) | PURPOSE OF BUILDING | OFFICE |
| | START TIME OF TIME BAND | 14:00 |
| | END TIME OF TIME BAND | 15:00 |
| | NUMBER OF ALL PASSENGER (PERSONS / HOUR) | 500 |
| | GROUND FLOOR TRAFFIC RATIO (%) | 80 |
| | TRAVELLING-UP TRAFFIC RATIO (%) | 50 |
| | TRAVELLING-DOWN TRAFFIC RATIO (%) | 50 |

Fig. 7

2a

| | | |
|---|---|---|
| GROUP MANAGEMENT PERFORMANCE DATA (PRF) | MEAN WAITING TIME (SEC) | AWT |
| | LONG WAITING RATE (%) | RLW |
| | MOST WAITING TIME (SEC) | MWT |
| | PREDICTION ERROR RATE (%) | RPE |
| | PREDICTION ALTERATION RATE (%) | RPC |
| | PASSING WHEN FULLY OCCUPIED OCCURENCE RATE (%) | RBP |
| | MEAN BOARDING TIME (SEC) | ABT |
| | MOST BOARDING TIME (SEC) | MBT |
| | POWER CONSUMPTION AMOUNT (KW · Hr) | PWC |
| | ADJACENT CAR RESPONDING RATE (%) | RNR |
| | LIGHT LOAD CAR RESPONDING RATE (%) | RLR |
| | SPECIFIC CAR RESPONDING RATE (%) | RSR |

Fig. 8

11a

| NO. | PARAMETER'S NAME | SYMBOL | PARAMETER VALUE |
|---|---|---|---|
| 1 | FULLY OCCUPIED STATE ESTIMATION COEFFICIENT | Ca | 10,000 |
| 2 | PREDICTION ERROR ESTIMATION COEFFICIENT | Cb | 400 |
| 3 | RIDING TIME PRIORITY DEGREE | Pa | 100 |
| 4 | ELECTRICAL POWER SAVING PRIORITY DEGREE | Pb | 100 |
| 5 | ADJACENT CAR PRIORITY DEGREE | Ba | 100 |
| 6 | LIGHT LOAD CAR PRIORITY DEGREE | Bb | 100 |
| 7 | SPECIFIC ELEVATOR PRIORITY DEGREE | Bc | 100 |
| 8 | LONG WAITING CALLING DETERMINATION VALUE | DL | 120 |
| 9 | PASSING WHEN FULLY OCCUPIED REFERENCE VALUE | DB | 80 |
| 10 | UP-PEAK OPERATION FIRST DETERMINATION REFERENCE VALUE | DUP1 | 70 |
| 11 | UP-PEAK OPERATION SECOND DETERMINATION REFERENCE VALUE | DUP2 | 70 |
| 12 | UP-PEAK OPERATION DETERMINATION PERIOD | DUPT | 120 |
| 13 | UP-PEAK OPERATION LINEUP CAR NUMBER | DUPN | 2 |
| 14 | DOWN-PEAK OPERATION FIRST DETERMINATION REFERENCE VALUE | DDP1 | 70 |
| 15 | DOWN-PEAK OPERATION SECOND DETERMINATION REFERENCE VALUE | DDP2 | 50 |
| 16 | DOWN-PEAK OPERATION DETERMINATION PERIOD | DDPT | 120 |
| 17 | DOWN-PEAK OPERATION PRIORITY DEGREE | DDPE | 20 |
| 18 | RUSH HOUR OPERATION DETERMINATION REFERENCE VALUE | DIUPC | 3 |
| 19 | RUSH HOUR OPERATION LINEUP CAR NUMBER | DIUPN | 3 |
| 20 | RUSH HOUR OPERATION START TIME | DIUPT | 15 |
| 21 | RUSH HOUR OPERATION DOOR OPEN WAITING CAR NUMBER | DIUPW | 2 |
| 22 | ELECTRICAL POWER SAVING OPERATION FIRST SERVICE REFERENCE VALUE | DESW1 | 15 |
| 23 | ELECTRICAL POWER SAVING OPERATION SECOND SERVICE REFERENCE VALUE | DESW2 | 30 |
| 24 | DISPERSING WAITING OPERATION REGULAR NUMBER | DOHN | 3 |
| 25 | DISPERSING WAITING OPERATION REGULAR TIME | DOHT | 60 |

PARAMETER VALUE SET
EPS

Fig. 45

| NO. | PARAMETER'S NAME | EMERGENCE RATE (10B) RPA1 | RPA2 | RPA3 | RPA4 | CORRECTION VALUE (10C) RPAA |
|---|---|---|---|---|---|---|
| 1 | FULLY OCCUPIED STATE ESTIMATION COEFFICIENT | 10 | 10 | 10 | 10 | 5 |
| 2 | PREDICTION ERROR ESTIMATION COEFFICIENT | 10 | 10 | 10 | 10 | 5 |
| 3 | RIDING TIME PRIORITY DEGREE | 10 | 10 | 10 | 10 | 5 |
| 4 | ELECTRICAL POWER SAVING PRIORITY DEGREE | 10 | 10 | 10 | 10 | 5 |
| 5 | ADJACENT CAR PRIORITY DEGREE | 10 | 10 | 10 | 10 | 5 |
| 6 | LIGHT LOAD CAR PRIORITY DEGREE | 10 | 10 | 10 | 10 | 5 |
| 7 | SPECIFIC ELEVATOR PRIORITY DEGREE | 10 | 10 | 10 | 10 | 5 |
| 8 | LONG WAITING CALLING DETERMINATION VALUE | 10 | 10 | 10 | 10 | 10 |
| 9 | PASSING WHEN FULLY OCCUPIED REFERENCE VALUE | 10 | 10 | 10 | 10 | 5 |
| 10 | UP-PEAK OPERATION FIRST DETERMINATION REFERENCE VALUE | 5 | 0 | 10 | 0 | 0 |
| 11 | UP-PEAK OPERATION SECOND DETERMINATION REFERENCE VALUE | 5 | 0 | 10 | 0 | 0 |
| 12 | UP-PEAK OPERATION DETERMINATION PERIOD | 5 | 0 | 10 | 0 | 0 |
| 13 | UP-PEAK OPERATION LINEUP CAR NUMBER | 5 | 0 | 10 | 0 | 0 |
| 14 | DOWN-PEAK OPERATION FIRST DETERMINATION REFERENCE VALUE | 5 | 0 | 0 | 10 | 0 |
| 15 | DOWN-PEAK OPERATION SECOND DETERMINATION REFERENCE VALUE | 5 | 0 | 0 | 10 | 0 |
| 16 | DOWN-PEAK OPERATION DETERMINATION PERIOD | 5 | 0 | 0 | 10 | 0 |
| 17 | DOWN-PEAK OPERATION PRIORITY DEGREE | 5 | 0 | 0 | 10 | 0 |
| 18 | RUSH HOUR OPERATION DETERMINATION REFERENCE VALUE | 0 | 10 | 0 | 0 | 0 |
| 19 | RUSH HOUR OPERATION LINEUP CAR NUMBER | 0 | 10 | 0 | 0 | 0 |
| 20 | RUSH HOUR OPERATION START TIME | 0 | 10 | 0 | 0 | 0 |
| 21 | RUSH HOUR OPERATION DOOR OPEN WAITING CAR NUMBER | 0 | 10 | 0 | 0 | 0 |
| 22 | ELECTRICAL POWER SAVING OPERATION FIRST SERVICE REFERENCE VALUE | 10 | 5 | 5 | 5 | 10 |
| 23 | ELECTRICAL POWER SAVING OPERATION SECOND SERVICE REFERENCE VALUE | 10 | 5 | 5 | 5 | 10 |
| 24 | DISPERSING WAITING OPERATION REGULAR NUMBER | 10 | 5 | 5 | 5 | 5 |
| 25 | DISPERSING WAITING OPERATION REGULAR TIME | 10 | 5 | 5 | 5 | 5 |

GROUP MANAGING SYSTEM FOR ELEVATOR CARS

This disclosure is a continuation of patent application Ser. No. 08/492,040, filed Jul. 21, 1995 now abandoned.

BACKGROUND OF THE INVENTION

1. Field of the Invention

This invention relates to a group managing system for elevator cars and, more particularly, to an apparatus for efficiently seeking an optimum combination of control parameter values.

2. Description of Related Art

A group managing system for elevator cars is a system for effectively operating a number of elevator cars according to various traffic conditions within a building. A group management apparatus in the system controls operation, such as allocations of elevator cars, according to a group managing algorithm. The group managing algorithm, herein, is for executing and operating all functions and motions relevant to the operation of elevator cars, such as, allocation control of elevator cars.

The group managing algorithm includes control parameters of various types. To perform efficient operation, appropriate numerical values are required to be substituted in as those parameters according to various traffic conditions and the like within a building.

In allocation control in response to a floor call (a call from an elevator hall) as one of the fundamental functions of group management, when a floor call is newly registered, an estimation value Em of each elevator car (elevator cabin) is calculated according to an allocation estimating function described below in order to estimate service conditions, such as waiting times and predictions, with respect to the new floor call and floor calls already registered. The elevator car with the minimum estimation value Em is then selected as the allocated elevator car. A hall signal light or the like provided at the floor is turned on, thereby indicating the allocated elevator car for guiding the waiting passengers before the car's arrival (this operation is called a prediction).

The following formula [1], for example, exemplifies a function for determining the allocation estimation value Em described above, wherein: i is a floor call number; m is an elevator car number.

$$Em = \sum_i \{W(i)^2 + Ca \times M(i) + Cb \times Y(i)\} + Pm - Bm \qquad [1]$$

Wherein,

- Em represents the allocation estimation value when a new floor call is assigned to the elevator car m, W(i) represents predicted waiting time of floor call i when a new floor call is assigned to the elevator car m,
- M(i) represents the probability ($0 \leqq M(i) < 1$) of a fully occupied state for floor call i when a new floor call is assigned to the elevator car m,
- Y(i) represents prediction error probability of floor call i when a new floor call is assigned to the elevator car m ($0 \leqq Y(i) \leqq 1$) (the prediction error refers to a situation when another elevator car, not the predicted car, reaches the floor first),
- Pm represents a penalty when a new floor call is assigned to the elevator car m,
- Bm represents a bonus when a new floor call is assigned to the elevator car m,

- Ca represents a fully occupied state estimation coefficient,
- Cb represents a prediction error estimation coefficient.

The fully occupied state estimation coefficient Ca is a coefficient for weighting the fully occupied state estimated value M(i) with respect to a waiting time estimated value $W(i)^2$. If a larger value is given to the coefficient Ca, the system can operate so as to weight the operation for passing through the floors during the fully occupied state rather than weighting the operation for waiting time.

The prediction error estimation coefficient Cb is a coefficient for weighting prediction error estimation value Y(i) with respect to a waiting time estimation value $W(i)^2$. If a larger value is given to the coefficient Cb, the system can allocate the cars so as to weight for prevention of prediction error rather than to weighting the waiting time.

A priority allocation function using the penalty Pm in the formula [1] includes, for example, a riding time priority allocation function [2] and an electrical power saving priority allocation function [3] as follows.

[2] The riding time priority allocation function is a function which attempts to ensure that an elevator car already having a lot of floor calls is rarely given another allocation of a call from any other floor. For example, a value calculated from riding time priority degree (Pa) multiplied by the number of calls (Nm) is given to the penalty Pm.

[3] The electrical power saving priority allocation function is a function which ensures that an inactive elevator car is rarely given an allocation for a new call. For example, a value indicated from electrical power saving priority degree Pb is given to the penalty Pm of the inactive elevator car, whereas zero is given to the penalty Pm of each of the other elevator cars.

A priority allocation function using the bonus Bm in the formula [1] includes, for example, an adjacent car priority allocation function [4], a light load car priority allocation function [5], and a specific car priority allocation function [6].

[4] The adjacent car priority allocation function is a function which ensures that an elevator car (adjacent elevator car) located nearby is readily allocated. For example, a value indicated as adjacent car priority degree Ba is set to the bonus Bm of the adjacent elevator car, whereas zero is set as the bonus Bm of the other elevator cars.

[5] The light load car priority allocation function is a function enabling an empty elevator car or an elevator car (light load elevator car) having a light load to be readily allocated. For example, a value indicated as light load car priority degree Bb is set as the bonus Bm of the light load elevator car, whereas zero is set as the bonus Bm of each of the other elevator cars.

[6] The specific car priority allocation function is a function enabling a specific elevator car to be readily allocated. For example, a value indicated as specific car priority degree Bc is set as the bonus Bm of, for instance, an elevator car traveling to basements, a rooftop, an observation deck, etc. whereas zero is set as the bonus Bm of each of the other elevator cars.

As described above, Ca, Cb, Pa, Pb, Ba, Bb, and Bc are parameters for group management relevant to the allocation estimating function [1].

Waiting for a long period of time may occur in association with an unanticipated call, even after the system has executed the allocation using the allocation estimating function [1]. Therefore, the group managing system has an additional allocation function [7] and an allocation altering function [8].

[7] The additional allocation function for a long period of waiting is a function for additional allocation in which an elevator capable of performing services earlier than the currently allocated elevator is urged to intervene.

[8] The allocation altering function for a long period of waiting is a function for transferring the allocation (and the prediction) of a call having a long period of waiting to the intervening elevator car. In order to detect a long period of waiting, judgment reference value DL is set.

[9] Each elevator car of the group managing system has an automatic passing function during the fully occupied state. The elevator car, if its load exceeds reference value DB, passes without a stop through the floor for which an allocation has already been executed. A intervening operation will be carried out by the allocation altering function for a call in which the elevator car has automatically passed during the fully occupied state.

[10] The allocation altering function for the call having been automatically passed during the fully occupied state transfers the allocation and prediction of the floor calling to another intervening elevator car. Altering the prediction to a new allocated car is called prediction alteration. As described above, DL and DB are also parameters for group management.

The control parameters of various types are used for other operations in addition to the operations relevant to a floor call. For example, the control parameters of various types are used as conditions for selection of the following operation patterns and for canceling the selection.

[11] Selection and cancellation of rush hour operation

Rush hour operation is selected when a start time of the rush hour has passed and when the number of calls registered for the first departing elevator car at the main floor becomes equal to or greater than a reference value DIUPC, and is, on the other hand, canceled when it passes an end time of the rush hour.

[12] Selection and cancellation of up-peak operation

Up-peak operation is selected when an elevator car departs and the number of passengers at the main floor exceeds a first reference value DUP1, and is, on the other hand, canceled when no elevator car departs and the number of passengers at the main floor exceeds a second judgment reference value DUP2 during a period DUPT.

[13] Selection and cancellation of down-peak operation

Down-peak operation is selected when an elevator car is going down with passengers on board exceeding a first reference value DDR1, and is, on the other hand, canceled when no elevator car is going down with passengers on board equal to or greater than the second reference value DDR2 during a period DDPT.

Each operation pattern includes the following controls, also including a control parameter.

[14] Rush hour operation

In the rush hour operation, elevator cars of the number designated as lineup car number DIUPN are lined up at the main floor.

In departing adjustment operation, even if a call for the first departing elevator car at the main floor occurs and the departure is delayed as the door remains open, the departure time, equivalent to a time while the door is kept open is set to reference value DIUPT.

Elevator cars having a number designated as door open waiting car number DIUPW must wait with open doors and the other elevator cars wait with closed doors.

[15] Up-peak operation

In the up-peak operation, elevator cars having a number designated as lineup car number DUPN are lined up at the main floor.

[16] Down-peak operation

In the down-peak operation, when calculated, a predicted waiting time is calculated to be longer on its face by an amount equivalent to priority degree DDPE with respect to a floor call for a direction or directions toward the main floor.

[17] Dispersed waiting operation

Dispersed waiting operation Is an operation intended to shorten the waiting time by previously deploying an elevator car at a floor at which a next call is apt to occur when an empty elevator car is available. This operation is selected where the rush hour operation is not selected.

The dispersing waiting operation is executed when empty elevator cars having a number equal to or greater than a regular number DOHN are available and when such a state continues for at least a standard time DOHT.

In the dispersed waiting operation, a floor or floors at which elevator cars are to wait (waiting floor), the number of elevator cars subject to waiting, and other factors, could be used as control parameters.

Moreover, the following additional control parameters are used to control the number of operating cars.

[18] Electrical power saving operation

Electrical power saving operation is intended to save electrical power by automatically reducing the number of operating cars according to service conditions. When the mean waiting time of the last five minutes is equal to or less than a first service reference value DESW1, the system reduces the current number of active cars by one, and when the mean waiting time is equal to or greater than a second service reference value DESW2, the system increases the current number of active cars by one.

As described above, the group managing algorithm includes many parameters. These parameters are prepared for satisfying various control purposes such as shortening waiting time, improving prediction accuracy, improving comfort of passengers, saving electrical power, and the like. The group management, however, is grossly influenced by combinations of numerical values substituted in the respective parameters because parameters having purposes adverse to one another are present.

In other words, for efficient group management operation in compliance with a building's various traffic conditions which vary from time to time and with various expectations of passengers, it is required to seek the optimum combination of parameters quickly.

It is to be noted that in the following description combinations (series) of parameter values are called a "parameter value set" or simply a "set."

In a conventional optimum set seeking method, there is thorough calculation in which every possible combination of parameter values (i.e. every set) is checked (see, for example, Japanese Patent Publication No. Hei 4-51,475, or Japanese Unexamined Patent Publication No. Sho 57-57,168).

There are few problems when only a few kinds of parameters are used.

However, if the different kinds of parameters increase, the number of combinations of parameter values to be checked is grossly increased, so that selection of the optimum set by checking all possible combinations becomes very difficult. The following is a specific description of such a method.

In the thorough calculation method, it is assumed that the number of kinds of parameters is M and that the number of possible values of the parameters is L. For example, if M=3 and L=6, the total simulation times is 216 times (=$L^M$).

Accordingly, when the kinds or possible values of the parameters are not a small number, a very long time is required to determine the optimum combination of the parameter values even where a simulation is conducted or where elevator cars are test-driven by an actual group management apparatus, thereby proving impractical.

With a system set forth in Japanese Patent Publication No. Hei 5-24,067, it is proposed to reduce the simulation time. That is, for example, if two parameters are used, this system first seeks the optimum value of a first parameter and then seeks the optimum value of a second parameter while the value of the first parameter is fixed to the optimum value. This method is called a sequential method.

According to such a sequential method, if M=3 and L=6, total simulation time is 18 (=L×M) and is significantly reduced in comparison with the thorough calculation method described above.

However, the sequential method is effective only when the parameters have no correlation to each other, and is not applicable when the control of the system contains many parameters having a strong correlation, such as a parameter group for group management.

SUMMARY OF THE INVENTION

It is an object of the invention to provide a managing system to solve the problems of conventional systems, efficiently seeking an optimum set for a parameter group having a particular strong correlation even if the number of parameter sets is grossly large.

It is another object of the invention to provide a managing system realizing an exclusive seeking method for seeking an optimum set based on general technology called the "Genetic Algorithm."

(1) To accomplish the foregoing objects, a managing system having a seeking apparatus includes:

- memorizing means for storing a plurality of sets,
- producing means for selecting at least one set as parents from the memorizing means at one time and for producing at least one new set inheriting part of the nature of the parents at one time,
- estimating means for an executed result, as s group management performance value, at a time that a group management algorithm is executed using the new set,
- electing means for improving plural sets stored in the memorizing means through addition of new sets to the memorizing means and deletion of impaired sets from the memorizing means, and
- extracting means for extracting an optimum set based on the group management performance values of the improved sets stored in the memorizing means.

According to the above construction, the probability that excellent sets are produced becomes higher in conjunction with the genetic production of sets and selection of superior sets, and only child sets (new sets) inheriting only the good nature of parent sets are stored in the memorizing means. That is, by reiterating a cycle, plural sets stored in the memorizing means are sequentially renewed and thereby improved. Based on the group management performance value of each set, the optimum set is finally extracted from the memorizing means. Each numerical value comprising optimum set is substituted into the corresponding parameter in the group management algorithm, so that the system executes group management such as allocations of elevator cars.

Thus, according to the invention, the best set or a set having similar contents to the best will be sought efficiently. That is, the operation amount and simulation times will be reduced, thereby enabling the system to seek them rapidly.

(2) According to the invention, the producing means includes:

- numerical value exchanging means for producing two new sets by exchanging a portion of the numerical values between two sets which are selected from the memorizing means,
- new value replacing means for producing one new set by replacing some parameter values of one set selected from the memorizing means with new numerical values generated in a random manner, and
- production method selecting means for selecting between the exchanging of numerical values and the replacing with new values according to their respective probability.

In this construction, new sets are produced by selecting at random "crossover" in the numerical value exchanging means and "mutation" in the new value replacing means.

In brief, crossover converges the solutions, whereas mutation adds variation to the solutions. Accordingly, crossover is able to converge contents of a set assembly stored in the memorizing means, but in contrast, variation of the set assembly disappears in its early stage, so that the system may default to local solutions and lose the intrinsic solution (the optimum solution). In that situation, the mutation can enable the system to escape from the local solutions. Crossover and mutation are in a complementary relation in this context.

On the other hand, mutation has a tendency to destroy the superior solutions sought by the crossover. In this context, crossover and mutation are in a competitive relation. Therefore, the ratio between the crossover rate when crossover is selected and the mutation rate when mutation is selected is required to be set to a proper value. By using both of the crossover and the mutation properly at the same time, in any ways, the system sufficiently utilizes the advantageous points of both and improves the probability of the production of excellent new sets.

In addition, the system is also capable of seeking the optimum set by either crossover or mutation in some situations.

(3) According to the invention, the producing means includes:

- parent selecting means for selecting at least one from the memorizing means, and
- parameter selecting means for selecting parameters by exchanging numerical values or replacing numerical values.

With this constitution, the parent selecting means selects two parent sets (set pair) from the memorizing means when crossover is selected and one parent set from the memorizing means when mutation is selected. The parameter selecting means selects positions (crossover positions or mutation positions) of the parameters at which the parameter values are replaced in the crossover or the mutation.

(4) The parent selecting means performs parent selections based on parent selection reference information for raising the probability of producing excellent new sets. The system can make the probability of producing excellent new sets higher by use of the parent selection reference information.

(5) If distance between sets is used as the parent selection reference information, similarity between the sets can be used as a reference for the selection. This method allows the system to give priority to variation or convergence of new sets.

(6) If group management performance value is used as the parent selection reference information, the parent sets are selected based on the excellence of each set. This method raises the probability that the excellent parent sets will be selected, and as a result, the system improves the probability of producing excellent new sets.

(7) If a similar set number is used as parent selection reference information, the originality of each set becomes the reference of selection. This method raises the probability of selecting set pairs having different characteristics from each other, thereby ensuring the production of variations of new sets.

(8) It is desirable to modify the conditions of parent selection the parent selecting means in accordance with the progress of seeking. For example, the system can prepare multiple parent selection conditions and exchange them in accordance with the progress of seeking or alter reference values of the parent selection conditions in accordance with the progress of seeking. The system can raise the probability of producing excellent new sets when so constituted.

(9) The parameter selecting means selects parameters based on parameter selection reference information for raising the probability of producing excellent new sets. Hence, the probability of producing excellent new sets becomes higher.

(10) If differences of the parameter values are used as the parameter selection reference information, the similarity between parameters becomes the reference of selection. This method gives priority to the ability to produce variation or convergence of new sets.

(11) If a degree of correlation is used in conjunction with usage circumstances of elevator cars as the parameter selection reference information, the system can raise the probability of selecting parameters having a large degree of correlation with the usage circumstances of the elevator cars, thereby increasing the probability of producing more excellent new sets.

(12) If the correlation degree is used in conjunction with contents of performance estimation values as the parameter selection reference information, the system can raise the probability of selecting parameters having a large degree of correlation with the performance estimation values, thereby increasing the probability of producing more excellent new sets.

(13) It is desirable to modify the conditions of parameter selection with the parameter selecting means in accordance with the progress of seeking. For example, the system can prepare multiple parameter selection conditions and exchange them in accordance with the progress of seeking or alter reference values of the parameter selection conditions in accordance with circumstances. The system can raise the probability of producing excellent new sets.

(14) It is desirable to modify the selection probability in each producing method with probability modifying means in accordance with the progress of seeking. This method allows the system to utilize both the seeking process by mutation and local seeking process by crossover, thereby improving seeking efficiency.

(15) When the system is thus constituted, it is desirable to modify the selection probability with the probability modifying means in accordance with, for example, success index. According to this construction, the system can determine the progress of seeking from the converged degree of seeking, so that the system can set a selection probability suitable for proceeding.

(16) In another aspect of the invention, the seeking apparatus according to the invention includes:

memorizing means for storing plural sets, numerical value exchanging means for producing two new sets partially inheriting their parent's nature by exchanging a part of parameter values between two sets selected as the parents from the memorizing means, new value replacing means for producing one new set partially inheriting its parent's nature by replacing parameter values of a part of one set which is selected as a parent from the memorizing means with new numerical values generated in a random manner, producing method selecting means for selecting between a numerical value exchanging method and a new value replacing method in conjunction with their respective probabilities, estimating means for seeking executed results, as group management performance values, at a time that a group management algorithm is executed using the new set or sets, adding means for additionally storing only excellent new sets satisfying a certain addition condition in the memorizing means, deleting means for deleting impaired sets satisfying a certain deletion condition from the memorizing means, and extracting means for extracting the optimum set based on the group management performance value among plural sets improved and stored in the memorizing means.

According to this construction, set production by exchanging numerical values (crossover) and set production by replacing with new values (mutation) are selected in a random manner to produce new sets. Only new sets satisfying certain addition conditions among the produced new sets are stored in the memorizing means whereas the impaired sets are deleted from the memorizing means.

When such cycles are sequentially repeated, the memorizing means stores only excellent sets, so that the optimum set is extracted therefrom. Then, each numerical value of the optimum set is put into the corresponding parameters of the group management algorithm.

The system, according to the invention, can thereby effectively seek the best set or a set having contents extremely close to those of the best set. That is, the system can reduce operation and simulation times, thereby seeking rapidly.

(17) In a preferred feature of the system, the seeking apparatus further includes additional condition modifying means.

(18) The additional condition is determined based on, for example, the group management performance value of each set stored in the memorizing means, and is set to be gradually stricter. By such operation, the system can always accumulate only excellent new sets in the memorizing means, reducing unnecessary processes, and thereby raising the probability of producing excellent new sets.

(19) The deleting means deletes based on, for example, the group management performance value. By such an operation, the system leaves only excellent sets, thereby promoting the excellence of plural stored parent sets as a whole.

(20) The deleting means deletes based on, for example, distance between sets. By such operation, the system can avoid states in which similar sets exist doubly with respect to plural sets in the memorizing means and can ensure variation of the sets.

(21) The seeking apparatus according to the invention further includes initializing means in its preferred feature. If initialized using an initializing group meeting as closely as possible with the seeking conditions, the system can reduce the seeking time.

(22) The initializing means preferably includes first and second modes. In the first mode, previously prepared plural sets are used as the initial set group, and in the second mode, plural sets improved in the last seeking process are used as the initial set group. If a proper mode is selected according to the condition when the system starts seeking, the system can accelerate the convergence of seeking.

(23) The seeking apparatus according to the invention further includes seeking end determination means in its preferred feature. This means determines the end of seeking process when the system has entered into a state in which the system can expect sufficient improvement of sets during seeking. The system can avoid the end of seeking process if that seeking process is still insufficient and any seeking process is useless.

(24) The number of estimated sets is related to executing times of improving cycles and can be used as the end determination reference.

(25) The number of the added sets indicates the degree of improvement in the memorizing means and can be used as the end judgment reference.

(26) The success index is a ratio of the number of added sets to the number of estimated sets and can be used as reference of the end determination since it indirectly indicates the ability to converge the seeking process.

(27) The distance between the sets can be used as a reference of the end determination indicating the similarity of plural sets in the memorizing means as a whole.

(28) The seeking apparatus according to the invention, preferably, further includes re-seeking determination means, which determines re-seeking based on changes in the premises from those at the start of seeking. This means allows the system to automatically seek the optimum set under new conditions. The premises include, for example, the elevator car specification, the traffic flow specification, the ratio of performance reference value to control reference value, and so forth.

(29) The system according to the invention can even store the group management performance value in the memorizing means.

(30) The seeking apparatus can be connected to a target value setting apparatus for setting a target value in association with the seeking process. Where a control target is freely set, the system can seek the optimum set in compliance with the set target.

(31) Where in this invention the new sets are to be estimated using an exclusive apparatus for simulation, the seeking apparatus is connected to a simulator in addition to a group management apparatus. The simulator contains the same group management algorithm as the group management algorithm contained in the group management apparatus. The estimating means sets the executed results of simulations as the group management performance values. When using the simulator, the system can estimate new sets without interruption of group management.

(32) The group management apparatus is installed in the same building as, for example, the seeking apparatus (and the simulator) in the invention. Where the seeking apparatus (and the simulator) is required to be installed away from the group management apparatus, a communication line would link the group management apparatus and the seeking apparatus. If plural group management apparatus commonly use a single seeking apparatus (and the simulator), costs of the system are reduced.

(33) In the present invention, the group management apparatus connected as a practical apparatus to the seeking apparatus can be used to carry out simulation. Accordingly, the simulator is not required and the costs of the system can be reduced.

(34) Also in the present invention, the group management apparatus and the seeking apparatus are connected with a communication line where the seeking apparatus is located far away from the group management apparatus. If a plurality of group management apparatus share one seeking apparatus, the costs of the system can be reduced.

(35) This invention can be extended for the purpose of estimation of the group management algorithm by connecting the simulator and the seeking apparatus.

Relationship between present invention and GA

The genetic algorithm has been described in various types of documents to date (see for example, "Current Situations and Problems in Genetic Algorithm", Vol. 32, No. 1 "Measurement and Control" January 1993.). The basic genetic algorithm generally includes a series of cycles of initialization, parent selection, crossover, mutation, and generation.

In an article, "Solving Method by Genetic Algorithm for Cabin Allocation Problem of Elevator Group Control for Firm Calls", 34th United Lecture Meeting of Automatic Control (held Nov. 20 to Nov. 22, 1991), a system that applies the genetic algorithm to the group management of elevator cars thereof has been described.

Such conventional systems perform optimum allocation of elevator cars for "permutation of calls" using the genetic algorithm. Therefore, the present invention and the conventional system are common in terms of a system related to the genetic algorithm, but are different in their objects to be sought and greatly different in their fundamental constitution and the like.

Briefly, this invention is not merely applying the genetic algorithm but providing new seeking technology having optimum parameter value sets. This feature of the invention will be apparent from the particular structure of the invention which originated from the particular nature of the parameter value sets.

BRIEF DESCRIPTION OF THE DRAWINGS

FIG. 4 is a diagram showing a structure of the inside of a ROM 10B in FIG. 2;

FIG. 5 is a diagram showing a structure of the elevator car specification data (ELS);

FIG. 6 is a diagram showing a structure of the traffic flow specification data (TRS);

FIG. 7 is a diagram showing a structure of the group management performance data (PRF);

FIG. 8 is a diagram showing a structure of the parameter value set (EPS);

FIG. 45 is a diagram showing emergence rates of respective parameters of the fifteenth embodiment;

DETAILED DESCRIPTION OF THE PREFERRED EMBODIMENTS

[Basic Principle]

As described above, the group management algorithm includes multiple types of parameters. In order to efficiently perform group management of a number of elevator cars, it is required to seek the optimum combination of parameter values according to traffic circumstances. An apparatus for such a purpose is an optimum set seeking apparatus, and in FIG. 50, the basic principle of the seeking apparatus according to the invention is shown. As described above, combinations (sequences) of parameter values are called a "parameter value set" or simply a "set."

Figure 50:
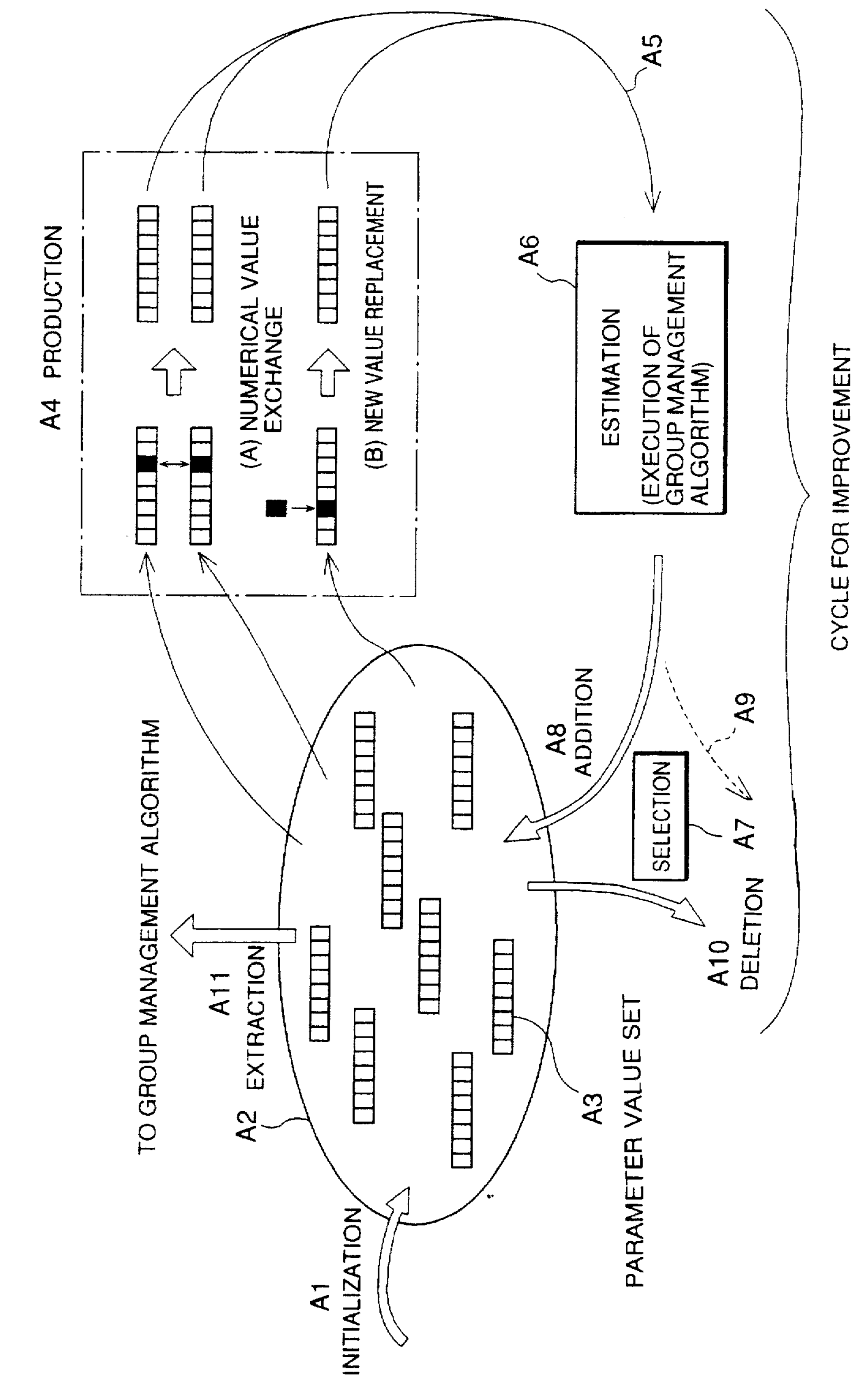
FIG. 50 is an illustration showing an optimum set seeking method according to the invention.

As shown in FIG. 50, the optimum set is sought by repeating production of new sets and selection of excellent sets. A specific description is as follows.

First, a memory A2 is initialized (A1). For example, plural initial sets which have been previously prepared are stored in the memory (A2).

New sets are then produced (A4). The new sets are produced by randomly selecting either numerical value exchange (crossover) or new value replacement (mutation). When the crossover method is selected, two sets (parent set pair) are taken out of the memory A2, and a part of the parameter values are exchanged between the two sets to produce two new sets. When the mutation process is selected, one set (parent set) is taken out of the memory A2, and a part of the parameter values in the set is replaced with a new numerical value produced in a random manner to produce a new set.

It is to be noted that selections of producing methods, parent sets, and parameters in which numerical values are exchanged, are basically performed at random, while each selection condition can be determined arbitrarily, and that each selection element can be weighted with respect to its selection probability.

Next, the produced new set or sets AS are estimated (A6). That is, the group management algorithm into which each new set is put is virtually or actually executed to obtain the executed result. The executed result is achieved as a "group management performance value" indicative of the performance of the new set, and a new set having an excellent group management performance value is stored in the memory A2 (A8). Impaired sets are not stored and are discarded (A9) or, otherwise, are deleted after being stored (A10). Such selection for excellent sets (A7) always accumulates only excellent sets in the memory A2.

Where such a cycle for improvement is sequentially repeated, plural sets A3 accumulated in the memory A2 are gradually distinguished and improved. The best set is finally extracted as the optimum set among the stored plural sets A3 (A11), and the optimum set is fed to the group management algorithm for group management.

According to such a seeking method for the optimum set thus described, child sets inheriting the good characteristics of their parent sets are efficiently produced. That is, the system can raise the probability of producing excellent child sets from excellent parent sets, thereby enabling them to be sought rapidly.

It is possible to use either of crossover and mutation, but preferably, it is better to randomly select between both so that the plural accumulated sets satisfy both convergence and variation properly.

[First Embodiment]

Description of the Structure

Figure 1:
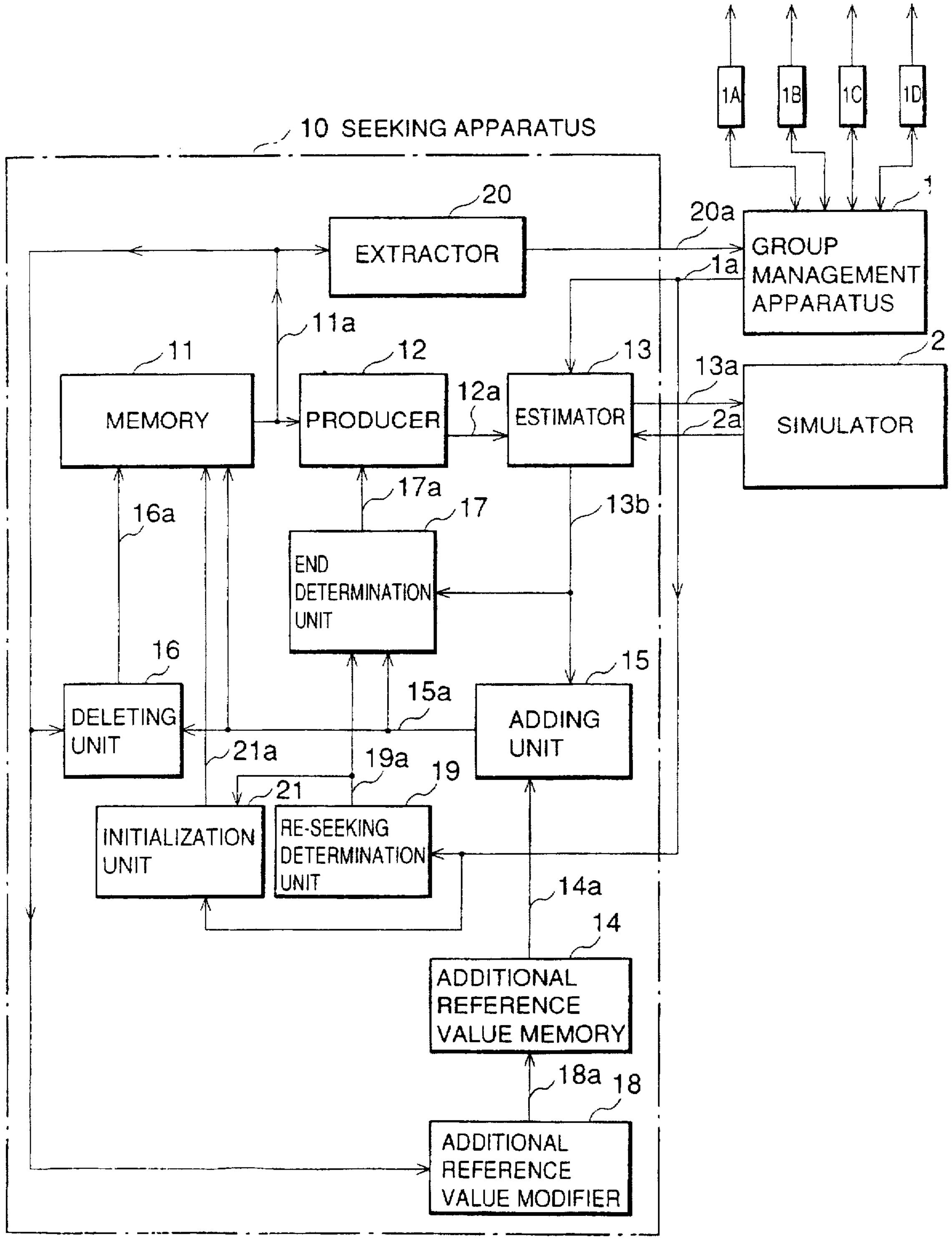
FIG. 1 is a block diagram showing an overall structure of the first embodiment according to a system of the invention.

FIGS. 1 to 20 are diagrams showing a first embodiment of a group managing system for elevator cars according to the invention. FIG. 1 shows an entire system, and it includes a known group management apparatus 1, a known simulator 2, and a seeking apparatus 10.

The group management apparatus 1 includes a microcomputer and, in this embodiment, manages a group of four elevator cars installed in a ten store office building. As described above, the group management apparatus 1 contains a group management algorithm (see FIG. 9) including multiple control parameters.

The group management apparatus 1 is connected to four car controllers 1A to 1D through communication cables. The car controllers 1A to 1D include respective microcomputers, and variously control the corresponding elevator cars. Each controller 1A to 1D has functions, such as, registration of calls, operation control, door control, and display control.

The registration function for calling the car is to register a call in a memory when the call occurs. The function of operation control is to control determinations of traveling, stop, and direction of motion of the elevator car in order to make the elevator car respond to calls (car calls and allocated floor calls) which must be responded to. The function of door control is to open and close the door provided on the elevator car and at the floors. The function of display control is to notify the waiting passengers of the allocated elevator car by turning on a hall signal light and to inform them of the arrival of the elevator car by flashing the hall light.

The controllers 1A to 1D transmit signals indicative of the operation state (such as, car position, traveling direction, door open and close state, car call and so forth) to the group management apparatus 1. In contrast, the group management apparatus 1 transmits signals indicative of various commands (allocation command for floor calling, reference value DB for passing when the car is fully occupied, set value of the door open period, and so forth) to the cabin controllers 1A to 1D.

The group management apparatus 1 delivers to the seeking apparatus 10 a seeking condition signal la indicative of the condition when the optimum set is sought. The seeking condition signal 1*a* includes "elevator car specification data" required to simulate the group managing system for elevator cars on the computer, "traffic flow specification data" required to simulate traffic flow in the building on the computer, and "seeking command data" to command seeking of the optimum set. The elevator car specification data include data indicative of, for example, number, speed, limit of passengers, floors to stop at, and type of door of the elevator car, and in- or out of-service of additional operations such as electrical power saving operation and rush-hour operation. The traffic flow specification data includes, for example, when traffic flow in the building is indirectly designated, data for a combination of characteristic values such as the total number of passengers per hour and the floor to floor traffic ratio and data in a combination of characteristic values such as the number of passengers boarding per unit time with respect to each floor and each direction, and on the other hand, when the traffic flow in the building is directly designated, passenger data for all passengers (such as occurrence time, occurrence floor, destination floor, and the like).

The simulator 2 includes a micro computer and has the same group management algorithm as the group management apparatus 1. The simulator 2 receives a simulation condition signal 13*a* which includes elevator car specification data, traffic flow specification data, and the parameter value sets. The simulator 2 operates upon the signal 13*a* for multiple elevator cars under virtually the same conditions as the actual conditions through the group management algorithm. After execution, the simulator 2 delivers group management performance data, as group management performance value signal 2*a*, indicative of statistical results (such as, mean waiting time, longest waiting time, and the like) showing the performance of group management.

The seeking apparatus 10 includes a microcomputer and seeks the optimum set as described above.

In the seeking apparatus 10, a memory 11 stores a plurality of parameter value sets and stores the group management performance data with respect to the corresponding sets. The output signal 11*a* from the memory 11 includes the parameter value sets and the group management performance data.

A producer 12 produces new sets by the "crossover method" and the "mutation method" described above. The new sets are temporarily stored in the producer 12 until estimated by an estimator 13 as described below. The producer 12 delivers a new set signal 12*a*.

The estimator 13 yields the simulation signal 13*a* based on the seeking condition signal 1*a* and the new set signal 12*a* and delivers it to the simulator 2. The estimator 13 yields an estimation result signal 13*b* based on the group management performance value signal 2*a* from the simulator 2 after the simulator 2 executes the group management simulation and delivers it to an adding unit 15.

An additional reference value memory 14 memorizes an additional reference value for determining whether the new sets thus estimated are to be additionally registered in the memory 11, or discarded. The additional reference value memory 14 delivers an additional reference value signal 14*a* at its output.

The adding unit 15 yields a performance estimation value for an additional registration determination from the group management performance data contained in the estimation result signal 13*b* and compares the value with the additional reference value. When the performance estimation value is better than the additional reference value, the adding unit 15 produces a signal 15*a* containing the new sets and their group management performance value and delivers it to the memory 11. As a result of this operation, excellent new sets are additionally registered in the memory 11, When certain conditions regarding set registration circumstances are satisfied, a deleting unit 16 calculates, based on the group management performance data a performance estimation value for a deletion determination with respect to each set. The deleting unit 16 selects sets having a poor performance estimation value and delivers a deletion command signal 16*a* indicative of the number of poor sets. As a result of this operation, registration of the designated sets is deleted from the memory 11.

An end determination unit 17 determines whether seeking is to end and delivers, when having determined the end of seeking, a seeking end signal 17*a* to the producer 12. As a result of this operation, the seeking apparatus stops producing new sets.

An additional reference value modifier 18 modifies the additional reference value stored in the additional reference value memory 14 by using modification signal 18*a*. The degree of modification is determined based on the group management performance data of each set in the memory 11.

A re-seeking determination unit 19 monitors the seeking condition signal 1*a* and provides a re-seeking command signal 19*a* for execution of seeking the optimum set again when the elevator car specification or the traffic flow specification is changed. If the signal 19*a* is output, the seeking end command is negated upon receipt of the seeking end signal 17*a*, and then, or even in the middle of seeking, seeking is started again from the beginning.

An extractor 20 calculates a performance estimation value for determination of the optimum set based on the group management performance data of each set in the memory 11 and extracts the set having the best group management performance data. That is, the extractor 20 extracts the optimum set. A signal 20*a* at the output of the extractor 20 includes the optimum set, the elevator car specification data, the traffic flow specification data, and the seeking status data.

An initialization unit 21 includes plural initial set groups and specifies, at the time of seeking start, an appropriate set group to be used for initialization among plural initial set groups previously stored in accordance with the seeking condition signal 1*a* or the re-seeking command signal 19*a* to deliver it to the memory 11.

Figure 2:
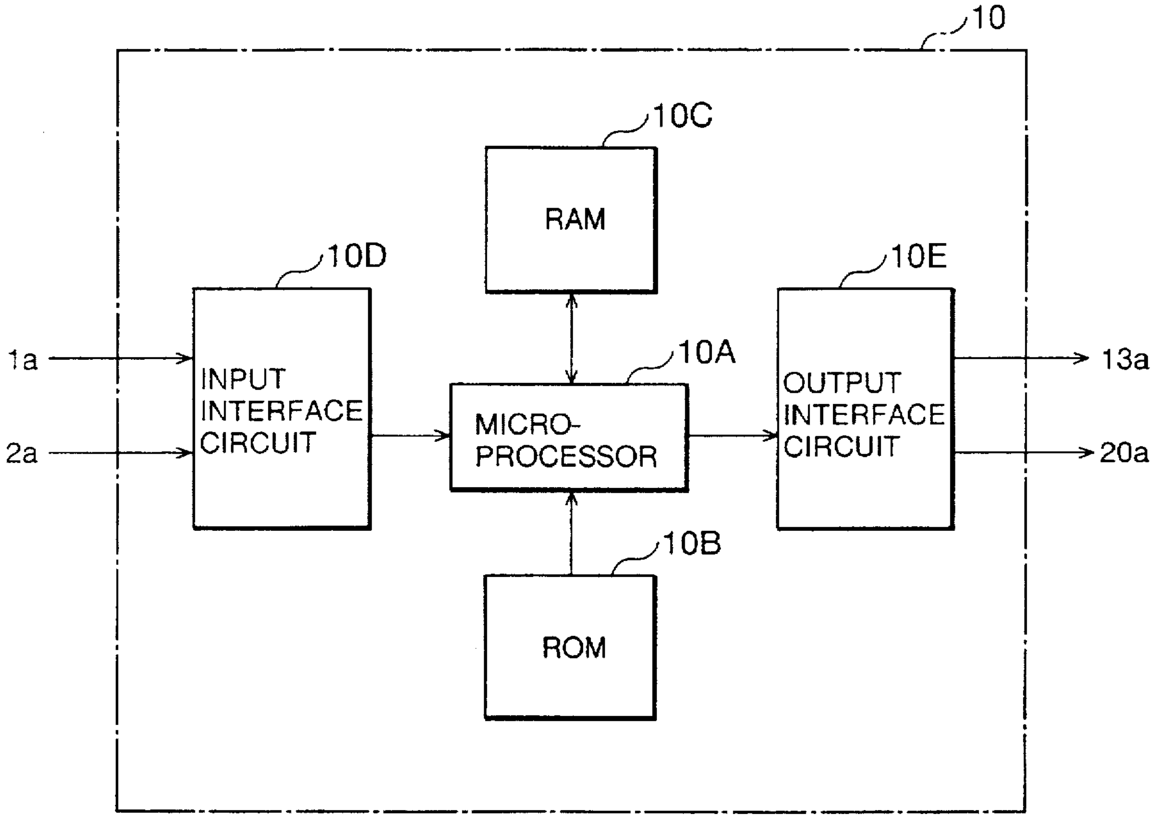
FIG. 2 is a diagram showing a structure of the seeking apparatus including a micro computer.

FIG. 2 illustrates a hardware structure of the seeking apparatus 10 shown in FIG. 1. In FIG. 2, the seeking apparatus 10 includes a microprocessor 10A, a read only memory (ROM) 10B, a random access memory (RAM) 10C, an input interface circuit 10D, and an output interface circuit 10E. In this case, the ROM 10B stores a seeking program describing operation steps of the microprocessor 10A and the fixed data. The RAM 10C stores arithmetic operation results (operation data) from the microprocessor 10A, contents (input data) of the seeking condition signal 1*a* and the group management performance value signal 2*a* which are fed from the outside, and contents (output data) of the simulation signal 13*a* and the optimum set signal 20*a* to be delivered externally.

Figure 3:
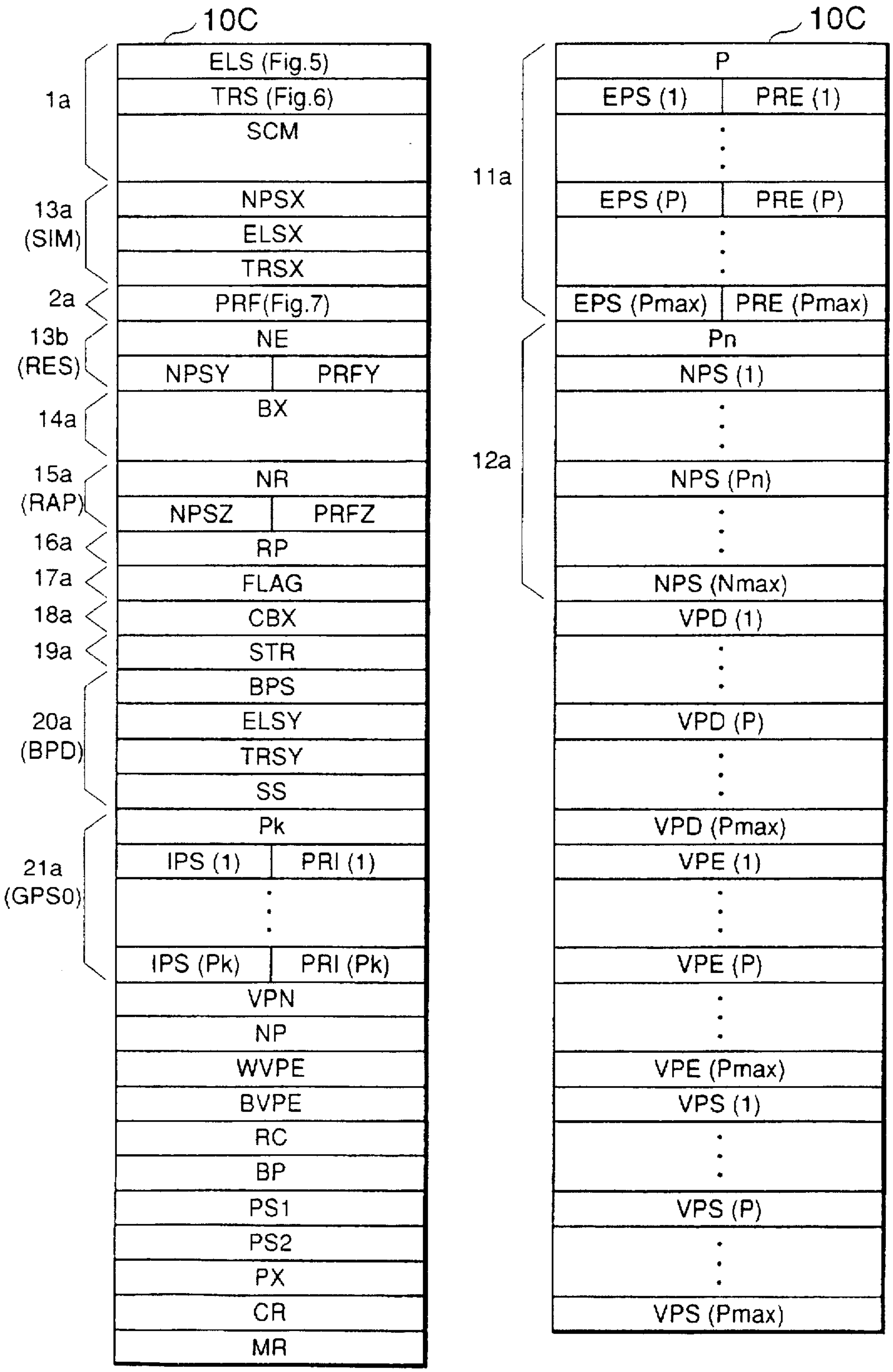
FIG. 3 is a diagram showing a structure of the inside of a RAM 10C in FIG. 2.

FIG. 3 shows the memory contents of the RAM 10C in FIG. 2; and FIG. 4 shows a fixed data portion in the memory contents of the ROM 10B.

In FIG. 3, ELS is the data showing the specification of cars; TRS is the data indicative of the specification of the traffic flow; and SCM is the data indicative of the seek command. These input data are contained in the seek condition signal 1*a* shown in FIG. 1.

FIG. 5 shows a specific structure of the elevator car specification data ELS. In the example shown in FIG. 5, it is specified that the number of cars is four; the speed is 120 m/min; the passenger capacity is 20; the elevator car stops at ten floors, with the 1st floor being the lowermost floor and the 10th floor being the uppermost floor; and the door width is 1,000 mm. Regarding priority allocation operations, [2] the riding time priority allocation function, [3] the electrical power saving allocation function, [4] the adjacent car priority allocation function, and [5] the light load car priority allocation function are all set as "valid", and the specific car priority allocation function [6] is set as "invalid." Regarding the various operations, [11,14] the rush hour operation, [12,15] the up-peak operation, [13,16] the down-peak operation, and [17] the dispersing waiting operation are all set as "valid", and [18] the electrical power saving operation, as another additional operation, is also set as "valid". Though not shown in FIG. 5, [8] the allocation modification operation in response to a long waiting call, [9] the automatic passing when fully occupied function, and [10] the allocation alteration function are basically always set as "valid".

FIG. 6 shows a specific construction of the traffic flow specification data TRS. The example shown in FIG. 6 is for a business hour time band (14:00 to 15:00). For example, based on the results of the traffic flow actually measured In advance using the group management apparatus 1, the number of passengers is 500 persons per hour; the ratio of the traffic between the ground level and any of the other floors (2nd to 10th) to the entire traffic amount is 80% (ground floor traffic ratio); the ratio of traveling-up traffic to the entire traffic (traveling-up traffic ratio) is 50%; and the ratio of traveling-down traffic to the entire traffic (traveling-down traffic ratio) is 50%.

PRF appearing on an upper left side of FIG. 3 means the data representing group management performance indicative of excellence of individual sets and is equivalent to the group management performance value signal 2*a* in FIG. 1.

FIG. 7 shows a specific structure of the group management performance data PRF. In this example, the group management performance data PRF includes mean waiting time AWT, long waiting rate RLW, the most frequent waiting time MWT, prediction error rate RPE, prediction alteration rate RPC, passing when fully occupied occurrence rate RBP, mean boarding time ABT, the most frequent boarding time MBT, power consumption PWC, adjacent car responding rate RNR (the rate at which a call at a bottom floor is handled by a car near the bottom floor), light load car responding rate RLR (the rate at which a floor call registered by a light load car will be allocated thereto), and specific car responding rate RSR (the rate at which a floor call registered to a particular car will be allocated thereto).

Again, in FIG. 3, P located on an upper right side is data indicative of the number of sets (called possibly excellent sets) registered in the memory 11; EPS(1) to EPS(Pmax) are data representing sets of the numbers from 1st to Pmax; and PRE(1) to PRE(Pmax) are data representing the group management performance values corresponding to EPS(1) to EPS(Pmax). The set number P, the set data EPS(1) to EPS(Pmax), and the group management performance data PRE(1) to PRE(Pmax) correspond to the signal 1*a* shown in FIG. 1. Pmax, described below, is a number representing the maximum value of the number of sets capable of being registered.

FIG. 8 shows a specific structure of the parameter value sets as an example. In FIG. 8, the set includes 25 types of control parameters. That is, each set data EPS(1) to EPS (Pmax) shown in FIG. 3 is as shown in FIG. 8. The group management performance data PRE(1) to PRE(Pmax) in FIG. 3 have almost the same structure as the group management performance data PRF (see also, FIG. 7 for the specific structure).

Shown midway between the top and the middle of the right side of FIG. 3, Pn is data representing the number of new sets produced; NPS(1) to NPS(Nmax) are data representing new sets of the set numbers from 1st to Nmax. The new set number Pn and the new sets NPS(1) to NPS(Nmax) correspond to the signal 12*a* shown in FIG. 1. Nmax, described below, is a numeral representing the maximum value of the number of new sets capable of being produced.

On the upper left side of FIG. 3, SIM is output data equivalent to the simulation condition signal 13*a* in FIG. 1 and is composed of set data for estimation NPSX, elevator car specification data ELSX, and traffic flow specification data TRSX. The set data for estimation NPSX are data indicative of contents of the new sets whose group management performance is to be estimated by simulation and is structured as the EPS in FIG. 8. The elevator car specification data ELSX and traffic flow specification data TRSX are data indicative of the elevator car specification and the traffic flow specification, respectively, when the simulation is implemented and are structured as ELS in FIG. 5 and TRS in FIG. 69 respectively.

The RES shown at the upper left side in FIG. 3 below SIM, is data corresponding to the estimation result signal 13b in FIG. 1 and includes the number of times of estimation NE, sets for estimation NPSY, and group management performance data PRFY. The number of times of estimation NE is data representing the number of times of accumulation of the estimation. The sets for estimation NPSY is data representing the new sets after the group management performance is estimated by the simulation, and is structured as EPS in FIG. 8. The group management performance data PRFY is data representing the group management performance value given by the simulation, and is structured as PRF in FIG. 7.

BX is data representing an additional reference value for determining whether the estimated new set is to be additionally registered and corresponds to the additional reference value signal 14a in FIG. 1.

RAP is data corresponding to the additional registration signal 15a in FIG. 1 and includes the number of times of additional registration NR, estimation sets NPSZ, and group management performance data PRFZ. The number of times of additional registration NR is data representing the number of times of determining the additional registration. The estimation sets NPSZ are data representing the excellent new sets to be registered in the memory 11 and is structured as EPS in FIG. 8. The group management performance data PRFZ is data representing the group management performance when the group management simulation is implemented using the estimation sets NPSZ and is structured as PRF in FIG. 7.

RP shown at the middle of the left side of FIG. 3 is data indicative of numbers of sets whose registration is to be deleted as impaired sets with respect to P of the registered sets EPS(1) to EPS(P) and corresponds to the deletion command signal 16a in FIG. 1.

FLAG is data (seeking permission flag) for commanding whether to continue to seek the optimum set or whether to end seeking and corresponds to the seeking end signal 17a in FIG. 1.

CBX is data for newly re-writing the additional reference value BX and corresponding to the modification signal 18a in FIG. 1.

STR is data for commanding a restart of seeking the optimum set and corresponds to the re-seeking command signal 19a in FIG. 1.

BPD is output data equivalent to the optimum set signal 20a in FIG. 1 and includes the optimum set BPS, the elevator car specification data ELSY, the traffic flow specification data TRSY, and the seeking status data SS. The optimum set BPS is the set having the best performance value among the registered sets and is structured as EPS in FIG. 8. The elevator car specification data ELSY and the traffic flow specification data TRSY are data representing the elevator car specification and the traffic flow specification, respectively, when the group management simulation is implemented using the optimum set BPS, and are structured as ELS in FIG. 5 and TRS in FIG. 6, respectively. The seeking status data SS is data representing the seeking status when the optimum set is selected and is, in this embodiment, set to a value indicating the number of estimation times NE.

GPS0 shown below BPD on the left side of FIG. 3 is data corresponds to the initialization signal 21a in FIG. 1 and includes the initial set number Pk, the plural initial sets IPS(1) to IPS(Pk), and the plural group management performance data PRI(1) to PRI(Pk). The initial set number Pk is data indicative of the set number when seeking starts and is ordinarily set to the same value as a value Pe for determining the end of the deletion process. The plural initial sets IPS(1) to IPS(Pk) are prepared as set groups to be used when seeking starts, and are structured as EPS in FIG. 8. The group management performance data PRI(1) to PRI(Pk) are data indicative of the group management performance when the group management simulation is implemented using the initial sets IPS(1) to IPS(Pk), and are structured as PRF in FIG. 7.

VPD(1) to VPD(Pmax), shown at the right side of FIG. 3, are performance estimation values for deletion determination; VPE(1) to VPE(Pmax) are performance estimation values for setting the additional reference value to be used when the additional reference value BX is modified; VPS(1) to VPS(Pmax) are performance estimation values for determining the optimum set to be used when the optimum set is selected; and VPN located below GPS0 on the left side of FIG. 3 is a performance estimation value for an additional determination to be used when determining whether the estimation sets NPSY are additionally registered. In this embodiment, the mean waiting time AWT taken out of the group management performance data is put into each performance value without modification.

NP is data indicative of the set numbers of the sets whose group management performance is to be estimated among the new sets NPS(1) to NPS(Nmax).

WVPE is data indicative of the worst of the performance estimation values; BVPE is data indicative of the best of the performance estimation values; RC is a seeking counter for counting a set number to be used when seeking the worst value WVPE and the best value BVPE; and BP is data indicative of the registration set No. having the best value BVPE.

PS1 is a first parent set number indicating the number of the parent set for producing the new sets; PS2 is, similarly, a second parent set number; PX is data indicating the number (position) of the parameters at which the crossover process or the mutation process is implemented; CR is data indicative of selection probability (emergence rate) of the crossover; and MR is data indicative of selection probability (emergence rate) of the mutation.

In FIG. 4, Pmax is data indicative of the maximum value of the number of registerable sets; Nmax is data indicative of the maximum value of the number of new producible sets; in this embodiment, Pmax is set to 50, and Nmax is set to 20.

NEa is a seeking end determination value used at one time to determine, together with the number of times of seeking NE, whether seeking of the optimum set has converged. In this first embodiment, NEa is set to 1,000 times.

Ps is a deletion start determination value used at one time to determine, together with the number of the registered sets P, whether the impaired sets are to be deleted; Pe is a deletion end determination value used at one time to determine whether the deletion process of the impaired sets is to end. In this first embodiment, Ps is set to 50, and Pe is set to 30.

AVPE is data indicating a correction value to be added to the worst value WVPE of the performance estimation values when the additional reference value CBX is set. In other words, the additional reference value is modified with the correction value AVPE added to the worst value WVPE. As the correction value, a value of zero seconds or above is generally set; in this embodiment, AVPE is set to 1 second.

GPS1 to GPS4 are set groups for initialization corresponding to regular operation (business hour), rush hour operation, up-peak operation, and down-peak operation. Each set group for initialization GPS(1) to GPS(4) is structured as the set group for initialization GPS0 in FIG. 3.

Description of Operation

Figure 9:
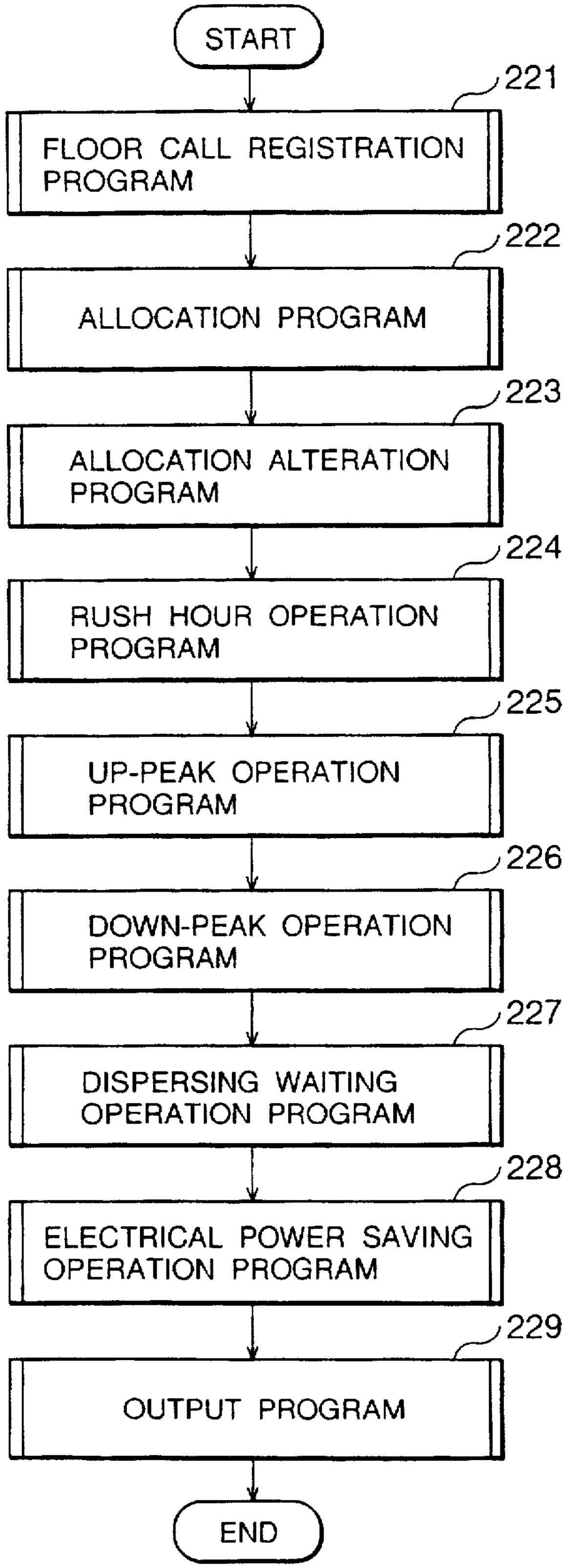
FIG. 9 is a flow chart showing contents of a control program for the first embodiment.

Referring to FIGS. 9 to 20, the operation of the first embodiment will be described. FIG. 9 shows the main part of a control program in the group management apparatus 1. The control program includes the group management algorithm, and the group management apparatus 1 operates based on the control program. The group management algorithm itself is known.

In FIG. 9, a floor call registration program operates at step 221. Specifically, a floor call occurring when a passenger operates a button is registered in a memory. When any elevator car deals with the call, the registration of the call is erased.

An allocation program operates at step 222. Specifically, the allocation estimating function of the formula [1] is used to compute the allocation estimation value with respect to each elevator car. The elevator car whose estimation value is lowest is allocated for the call. This step includes, in addition to the basic allocation computation in the estimating functions processes based on the riding time priority allocation function [2], the electrical power saving allocation function [3], the adjacent car priority allocation function [4], the light load car priority allocation function [5], and the specific car priority allocation function [6].

At step 223, an allocation altering program operates. Specifically, the system detects deterioration of the floor call service allocated as described above and performs an allocation to rescue it. This step includes the processes based on the allocation alteration operation for long waiting calls [8] and the allocation modification operation for floor calls passed when a car is fully occupied [10].

A rush hour operation program is executed at step 224. Specifically, according to the condition of selection and cancellation of the rush hour operation [11], the operation mode is selected or canceled, and if the rush hour operation is selected, then the system operates according to the rush hour operation control [14].

An up-peak operation program is executed at step 225. Specifically, according to the condition of selection and cancellation of the up-peak operation [12], the operation mode is selected or canceled, and if the up-peak operation is selected, then the system operates according to the up-peak operation control [15].

A down-peak operation program is executed at step 226. Specifically, according to the condition of selection and cancellation of the down-peak operation [13], the operation mode is selected or canceled, and if the down-peak operation is selected, then the system operates according to the down peak operation control [16].

At step 227, the dispersing waiting operation program is executed. Specifically, the dispersing waiting operation is selected where none of the rush hour operation, the up-peak operation, or the down-peak operation is selected. When the dispersing waiting operation is selected, the system operates according to the dispersing waiting operation control [17].

At step 228, the electrical power saving operation program is executed. Specifically, in order to save electrical power in consideration of the service circumstances of the operation, the operation is controlled by increasing or reducing the number of on-service elevator cars according to the electrical power saving operation [18].

At the final step 229, the output program is executed. Specifically, the reference value DB for passing when the car is fully occupied, which is required for the automatic passing function during the fully occupied state [9], is fed to the four controllers 1A to 1D connected to the group management apparatus 1. Each controller 1A to 1D determines whether it is in the fully occupied state, based on the load and the reference value DB for passing when the car is fully occupied. If it is in the fully occupied state, the controller causes the elevator car to automatically pass by the floor or floors at which the call occurred. Since the reference value DB for passing when the car is fully occupied greatly affects the group management performance, it is handled as a control parameter as an object to be sought.

It is to be noted that the entire group management program (including the control program shown in FIG. 9 and the seeking command program shown in FIG. 10) is periodically executed (for instance, by every 100 m sec.)

Figure 10:
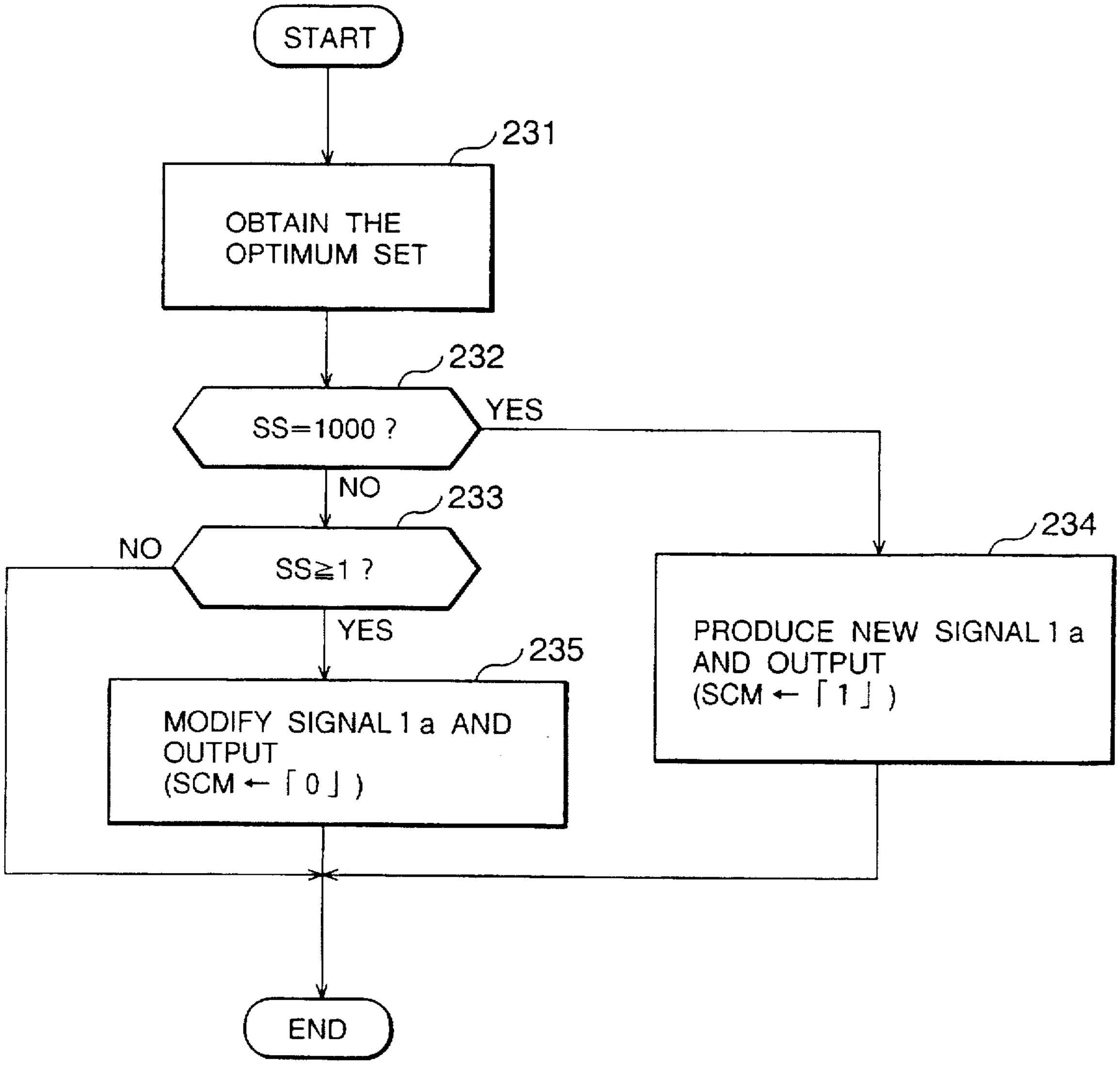
FIG. 10 is a flow chart showing a seeking command program for the first embodiment.

FIG. 10 shows the seeking command program provided in the group management apparatus 1. This program is a program for commanding seeking by the seeking apparatus 10.

In FIG. 10, step 232 is executed when the optimum set is already obtained with respect to any traffic flow, and the optimum set signal 20*a* is fetched from the seeking apparatus 10 to store the optimum set BPS corresponding to its traffic flow TRS in the memory of the group management apparatus 1. The seeking status data SS contained in the optimum set signal 20*a* are also stored at that time.

At steps 232 and 233, the preceding seeking is determined from the seeking status data SS. If the seeking status data SS is equal to NEa (=1,000), then the traffic flow at which the optimum set is to be sought is determined at step 234 since the seeking process has been completed, and a seeking condition signal 1*a* including the specification data TRS of the traffic flow, the elevator car specification data ELS, and the seeking command data SCM set to "1" is newly produced and delivered.

In contrast, if the seeking status data SS is determined to be 1 or over at step 233, this indicates that the seeking process has already begun, and then at step 235 the group management apparatus 1 re-writes the value of the seeking command data SCM in the seeking condition signal 1*a* to "0" and delivers a new seeking condition signal 1*a* at its output. To seek the optimum set for each traffic flow, the group management apparatus 1 sequentially selects four types of traffic flows corresponding to regular operation (business hour), rush hour operation, up-peak operation, and down-peak operation.

Although at step 234 the traffic flow specification data TRS is produced based on the actually measured results of the group management apparatus 1, the group management apparatus 1 could be connected to a known traffic measuring apparatus, which cumulates collected traffic condition data (for instance, the number of on/off boarding passengers, the number of calls, and so forth) and then feeds the data to the group management apparatus 1, and, based on that data, could produce the traffic flow specification data TRS.

Where the seeking apparatus 10 adopts the mode that the optimum set is constantly supplied even in the course of seeking, the group management apparatus 1 could determine how much of the optimum set that has been obtained so far is reliable, in accordance with the seeking status data SS stored at step 231. For example, if the seeking status data SS indicates an initial stage of seeking, the group management apparatus 1 can use, as sets actually to be used, not the sets supplied from the seeking apparatus 10 but the sets having satisfactory results for use. This method prevents the group management performance of the system from being deteriorated. If the seeking status data SS indicates a half or final stage of seeking, the optimum set from the seeking apparatus 10 is determined to be highly reliable, so that the system performance can improve using that set for the group management operation before the seeking processes is completely finished.

Figure 11:
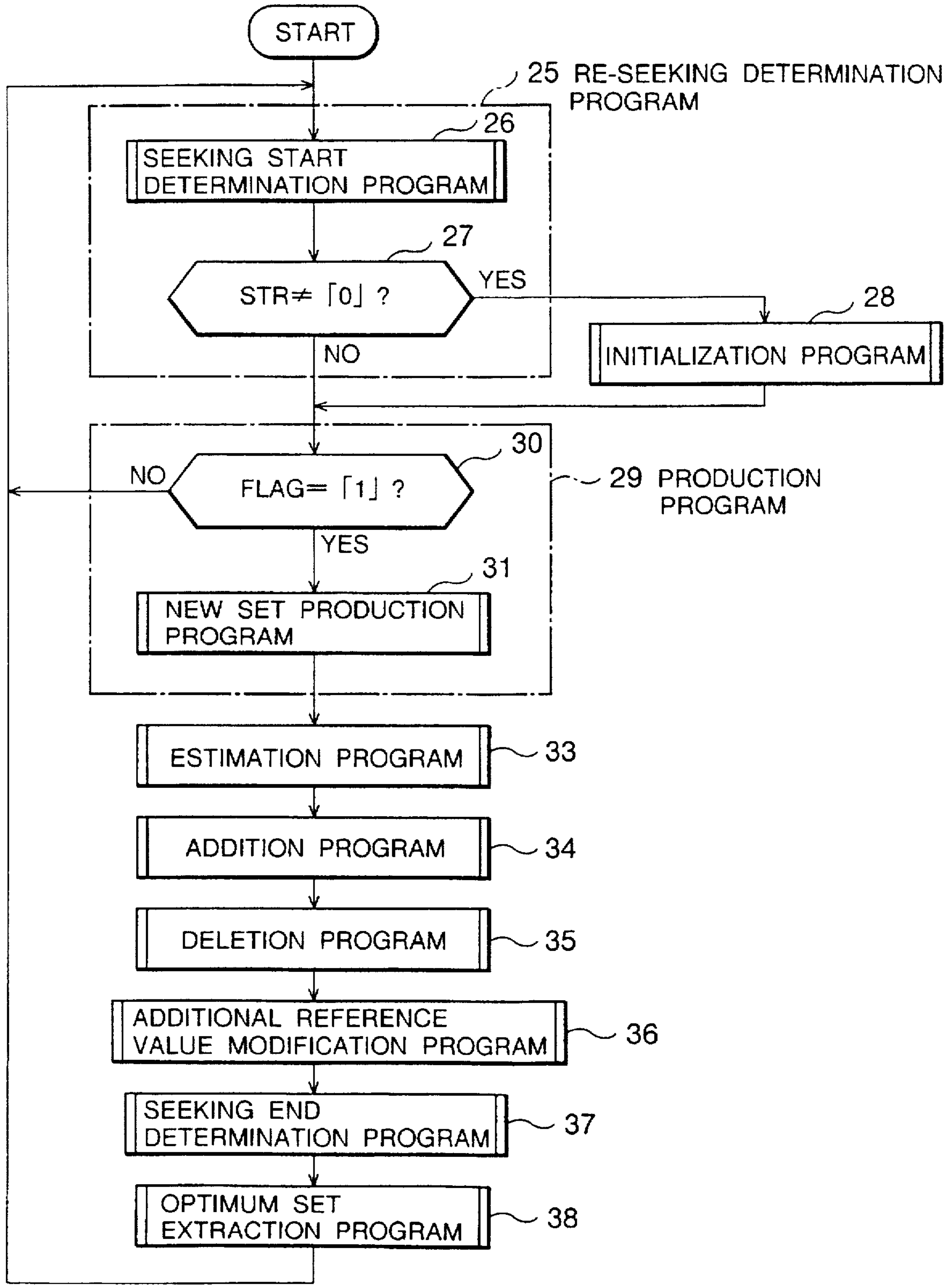
FIG. 11 is a flow chart showing a seeking main program for the first embodiment.

FIG. 11 shows a seeking program (main program) stored in the seeking apparatus 10. The program is stored in the ROM 10B.

In FIG. 11, at step 25 a re-seeking determination program having the function of the re-seeking unit 19 shown in FIG. 1 is implemented. A seeking start determination program is executed at step 26, and the apparatus 10 determines whether it is the time for restarting seeking of the optimum set. Now, referring to FIG. 12, a re-seeking determination method is shown.

Figure 12:
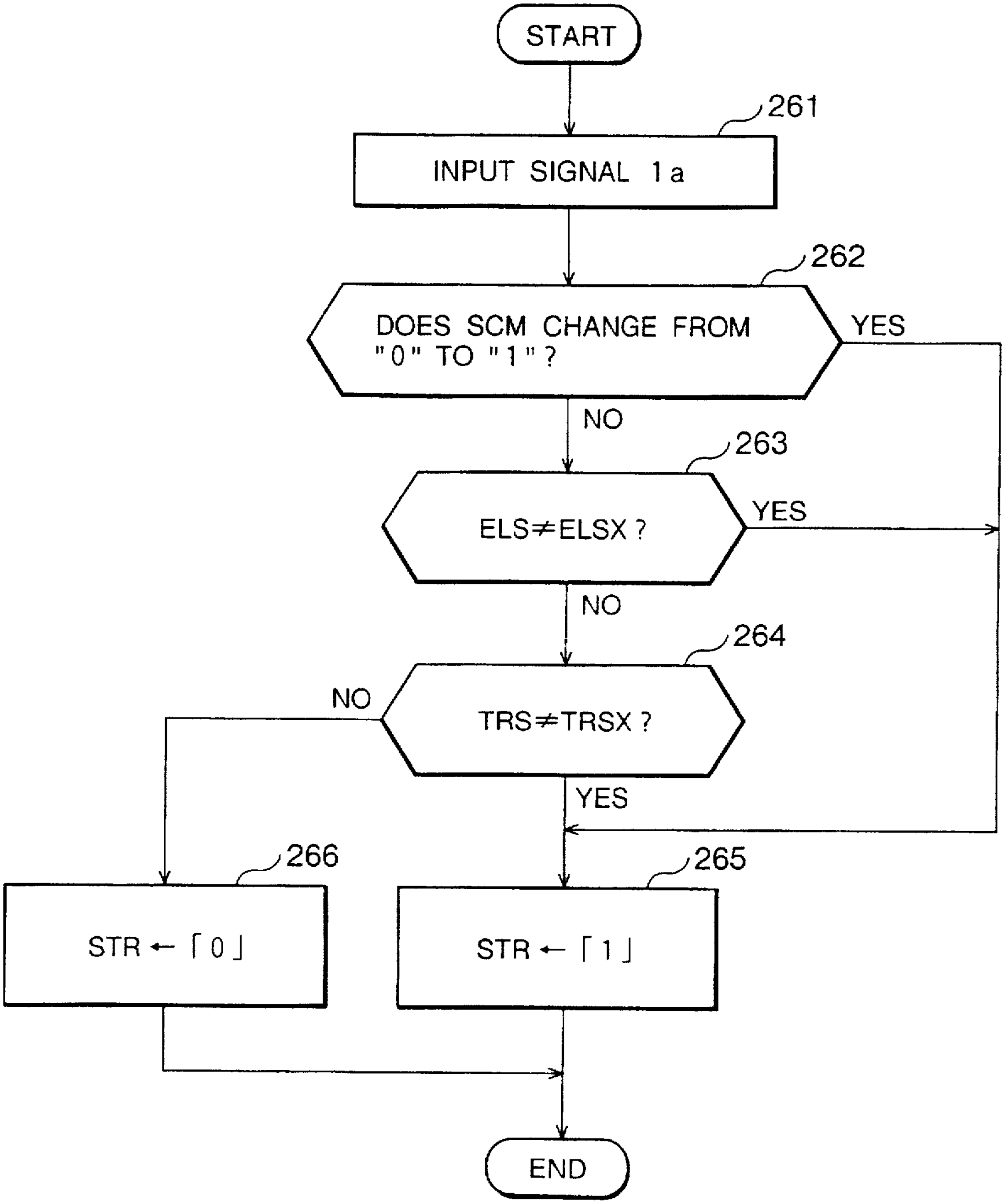
FIG. 12 is a flow chart showing a seeking start determination program for the first embodiment.

In FIG. 12, the seeking apparatus 10 receives the seeking condition signal 1*a* from the group management apparatus 1 at step 261, and memorizes, the elevator car specification data ELS in the RAM 10C, the traffic flow specification data TRS, and the seeking command data SCM. The seeking apparatus 10 then detects a change of the seeking command data SCM from "0" to "1" at the next step 262, and, if a change is detected, the seeking apparatus 10 sets the seeking start flag STR to "1" at step 265. In contrast, when the seeking apparatus 10 determines that the seeking command data SCM has not yet changed from "0" to "1", the apparatus 10 determines at detection step 263 whether the elevator car specification data ELS is different from the elevator car specification data ELSX which have been sought so far, and determines at step 264 whether the traffic flow specification data TRS is different from the traffic flow specification data TRSX which have been sought so far. If the ELS is different from the ELSX, or if the TRS is different from the TRSX, the seeking start flag STR is set to "1" at step 265, and, otherwise, at step 266 the seeking start flag STR is set to "0."

The reason that the restart of seeking is determined at steps 263 to 265 is that seeking the optimum set again is required when the circumstances of seeking change so that it is highly probable that the current registered optimum set is no longer the best. For example, when the traffic flow in the building has changed due to movements of the tenants or a part of the group management algorithm is altered to improve the function of the system, re-seeking would be implemented.

Referring to FIG. 11, at step 27 the seeking apparatus 10 determines whether it is required to initialize again, based on the result at step 26. On one hand, an STR equal to "0" means that the seeking is in process. On the other hand, an STR not equal to "0" means that seeking is to be cut off midway and restarted from the beginning or that re-seeking is to start after the current seeking finishes. Accordingly, when the STR is equal to "0", the process goes to a production program 29, but when the STR is not equal to "0", an initialization program at step 28 is implemented, and then after initialization of various data, the process goes to the production program 29.

Figure 13:
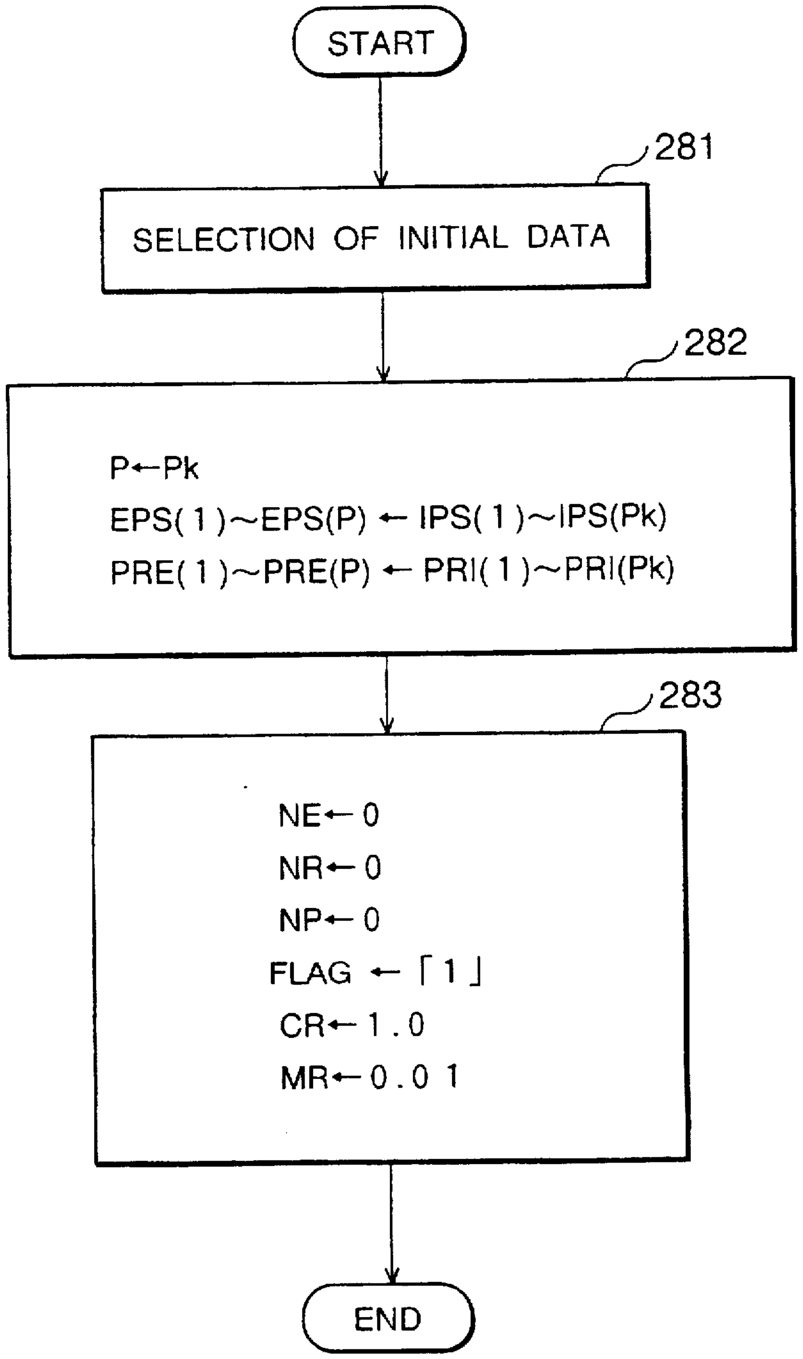
FIG. 13 is a flow chart showing an initialization program for the first embodiment.

Referring to FIG. 13, operation of the initialization program 28 is described below.

In FIG. 13, an initial data group suitable for the designated traffic flow is selected at step 281 out of multiple initial data groups previously memorized. Each initial data group includes the initial set number Pk, the initial sets of Pk items, and the group management performance data of Pk items.

For example, where a regular time band is designated from the traffic flow specification data TRS, an initial data group suitable for regular operation is selected out of the plural initial data groups GSP1 to GSP4, and the selected initial data group is registered as the data group for initialization GPS0 in FIG. 3. The data group for initialization GPS0 includes the initial set number Pk, the plural initial sets IPS(1) to IPS(Pk), and the group management performance data PRI(1) to PRI(Pk).

The initial set number Pk to be set is the same value (=30) of the deletion end determination value Pe.

At step 282, the initial set number Pk is input as the set number P; the initial sets IPS(1) to IPS(Pk) are input as the registered sets EPS(1) to EPS(P); and the group management performance data PRI(1) to PRI(Pk) are input in the group management performance data PRE(1) to PRE(P). That is, as shown in FIG. 50, the initialization A1 of the memory A2 is executed.

At step 283, as initialization: the number of estimation times NE is set to zero; the number of additional registration times NR is set to zero; the set number for estimation NP is set to zero; the seeking permission flag is set to "1"; the crossover probability CR is set to 1.0; and the mutation probability MR is set to 0.01. Then, this program reaches the end.

Referring to FIG. 11, the production program corresponding to the producer 12 in FIG. 1 is executed at step 29. First, it is determined at step 30 whether seeking is to be continued. If the seeking permission flag FLAG is "0", the process returns to the seeking start determination program at step 26, while on the other hand, if the seeking permission flag FLAG is "1", the process goes to the new set production program at step 31.

Figure 14:
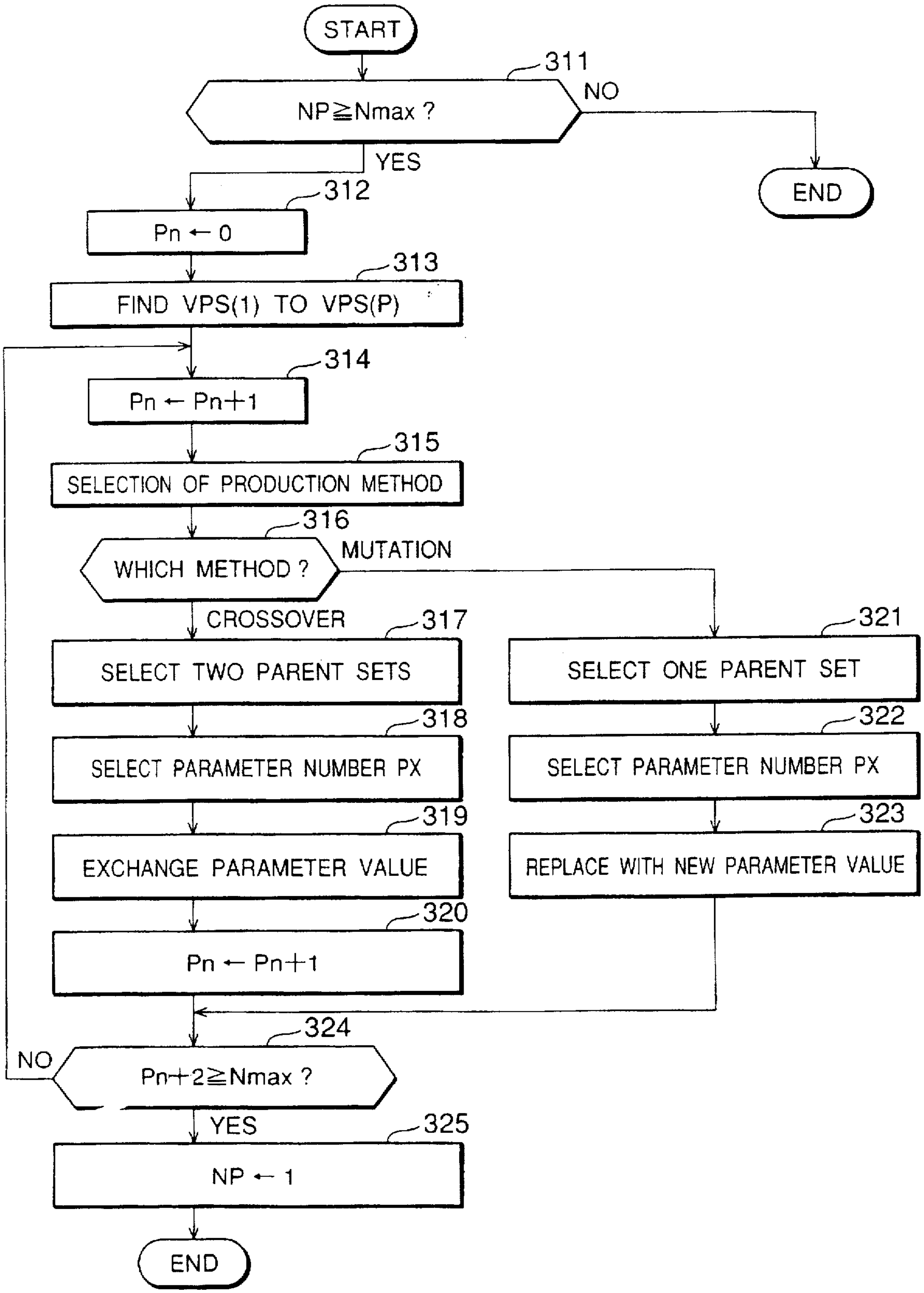
FIG. 14 is a flow chart showing a new set production program for the first embodiment.

Referring to FIG. 14, the new set generation program is described as follows.

In FIG. 14, first at step 311, it is determined whether new sets, which are not yet estimated remain. If the estimation set No. NP is less than the maximum value Nmax, the process immediately quits from this program step 311 to estimate the new sets because there are remaining new sets not yet estimated. On the contrary, if the estimation set No. NP is the maximum value Nmax or over, or, if the estimation of all the new sets has been completed, the process goes to step 312 and initializes to set the number of sets Pn which have been generated to 0 (zero).

At next step 313, each mean waiting time AWT(1) to AWT(P) is taken out of the group management performance data PRE(1) to PRE(P) with respect to the P registered sets, EPS(1) to EPS(P), and is put in the performance estimation value for the maximum value determination VPS(1) to VPS(P). The probability (emergence rate) that each set is selected as a parent set is determined based on the inverse of the performance estimation value VPS(1) to VPS(P)

Then, new sets, up to the maximum value Nmax, are produced by repeating the process of steps 314 to 324 as described below.

First, the number of generated sets Pn is incremented by one at step 314. A random number having a value between zero and [CR+MR] (a sum of the crossover rate and the mutation rate) is made at the next step 315, and the production method is randomly selected. If the random number is less than CR (=1.0), the method selected is "crossover" and if the random number is CR (=1.0) or above the method selected is "mutation", providing that the ratio between the crossover rate (the probability that crossover is selected) CR and the mutation rate (the probability that mutation is selected) MR can be modified based on a certain reference.

If "crossover" is selected at step 316, the process goes to step 317. Each set is given the inverse value of the corresponding performance estimation value VPS as a weighting value. The weighting value indicates the probability that the set will be selected. Two random numbers are then produced in a range from "0" as a lower limit to "the sum of the inverses of the performance estimation values VPS(1) to VPS(P)" as an upper limit. Two sets are then selected in association with the random numbers produced. Now, the two parent sets (crossover set pair) are assumed to be the set EPS(PS1) of the number PS1 and the set EPS(PS2) of the number PS2.

At the next step 318, one random number having a value between 0 and 25 is produced, and a parameter number PX specified by the random number is selected. The parameter number is common between the two parent sets and determines parameter positions at which a numerical value is exchanged.

At step 319, the PXth numerical value in the parent set EPS(PS1) and the PXth numerical value in the parent set EPS(PS2) are exchanged with each other. This operation produces two new sets. The two new sets are set as the new set NPS(Pn) of the number [Pn] and the new set NPS(Pn+1) of the number [Pn+1].

Finally, the number Pn of the new sets already produced is incremented by one at step 320.

On the other hand, if the "mutation" is selected at step 316, the process goes to step 321. Each set is given the inverse value of the corresponding performance estimation value VPS as a weighted value. The weighted value indicates the probability that the own set will be selected. One random number is then produced in a range from "0" as a lower limit to "a sum of all the inverses of the performance estimation values VPS(1) to VPS(P)" as an upper limit. One set is then selected in association with the value of the generated random number.

At step 322, as in step 318, a random number is generated to select a parameter number PX at which mutation occurs.

Another random number is produced at step 323 between [the minimum] and [the maximum] which the parameter specified by the number PX can take. The numerical number of the number PX in the excellent set EPS(PS1) of the number PS1 is replaced with the random number. In this operation, the produced set is the new set NPS(Pn) of the number Pn.

At next step 324, it is determined whether the new sets having the required number are produced. Since two new sets are produced at one time in "crossover", if Pn+2>Nmax, the production of the new sets is completed. Until this completion, new sets, up to the number Nmax, are produced by repeating steps 314 to 324. When the production of the new sets is completed, the set number of the new set to be estimated first, or the set number for estimation NP, is set to 1 at step 325.

"Crossover" is a seeking method for convergence of solutions. In contrast, "mutation" is a seeking method possessing varied solutions. That is, if the process is conducted only by crossover, the direction of seeking is localized, thereby raising the probability of losing the optimum solution. However, if mutation is properly used as well as crossover, the system can escape from local solutions. In this context, the methods are in a complementary relation. However, the use of mutation is so dangerous that the optimum solutions, even if finally sought may be destroyed. In this context, both processes are in a competitive relation.

Accordingly, to avoid the risk that both will achieve a competitive relation while utilizing their complementary relation, the mutation rate MR is set to a very small value in comparison with the crossover rate CR in the first embodiment.

In this embodiment, after twenty (=Nmax) new sets are produced, group management performance is estimated with respect to each new set. However, other methods could be used as well.

For example, by setting the maximum value Nmax to "1", the group management performance with respect to the new sets can be estimated for every "crossover" or "mutation", and can be repeated.

In this connection, when the maximum value Nmax becomes larger, the operation time can be shortened because the new sets can be produced at once. In such a case, however, the system is required to ensure a large capacity of RAM 10C. It is desirable to determine the maximum value Nmax in association with the operation time and memory size.

Figure 15:
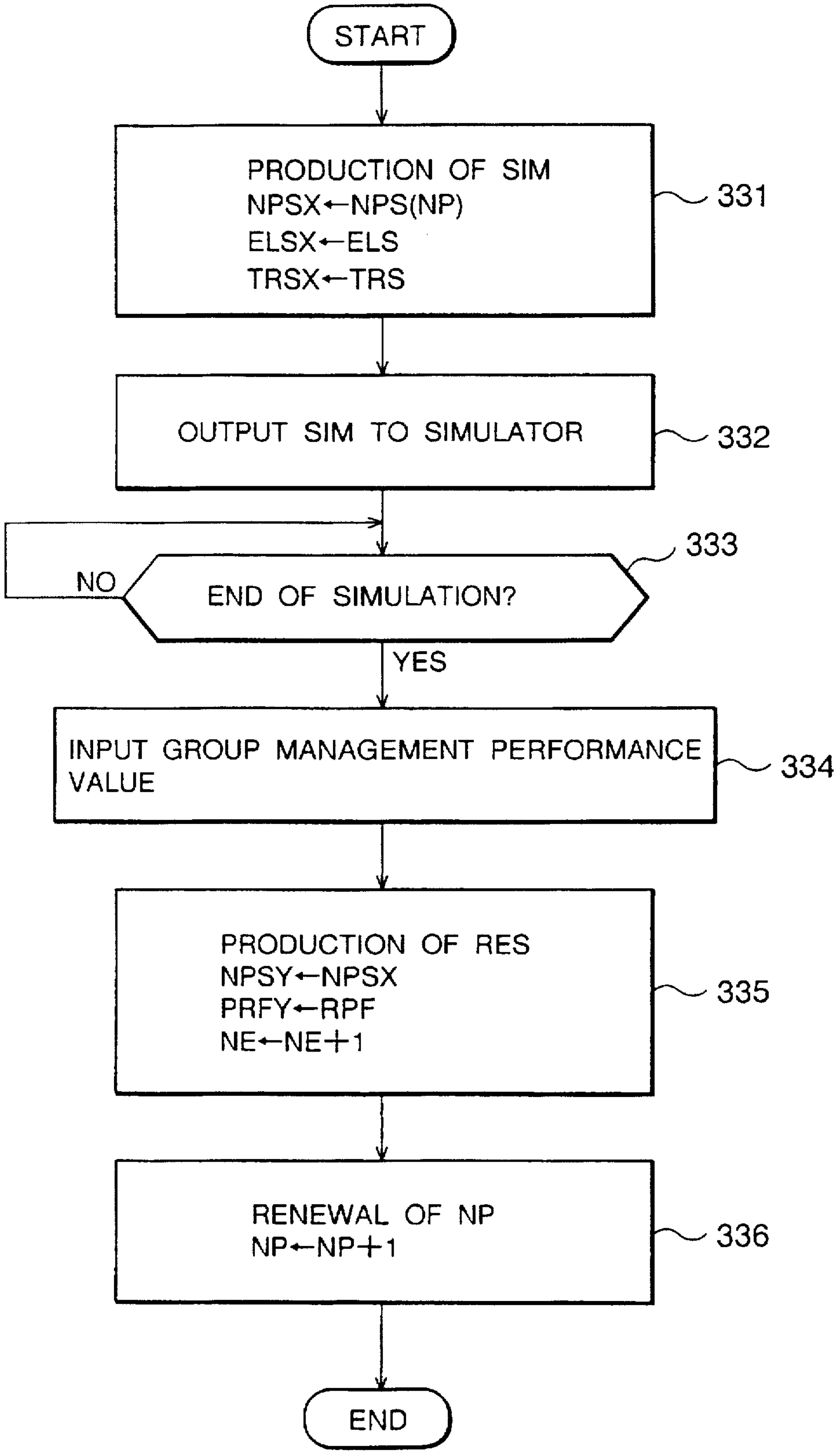
FIG. 15 is a flow chart showing an estimation program for the first embodiment.

Referring to FIG. 11, an estimation program at step 33 is described below. The estimation program corresponds to the estimator 13 in FIG. 1, and executes the group management algorithm by giving the new sets to the simulator, thereby obtaining the executed results. Referring to FIG. 15, this estimation program is described in detail In FIG. 15, at step 331 the simulation condition data SIM including the sets for estimation NPSX, the elevator car specification data ELSX, and the traffic flow specification data TRSX are produced. That is, the system sets the new sets NPS(NP) to the sets for estimation NPSX, and sets the elevator car specification data ELS and the traffic flow specification data TRS, which are contained in the seeking conditional signal 1*a*, to the elevator car specification data ELSX and the traffic flow specification data TRSX, respectively. At the next step 332, the seeking apparatus 10 serves to output the simulation condition data SIM as the simulation condition signal 13*a* to the simulator 2 to cause the simulator 2 to perform a virtual group management operation. The process waits for the completion of the simulation at step 333.

The simulator 2 simulates according to the simulation condition signal 13*a*, and when completing the simulation, delivers the group management performance value signal 2*a* to the seeking apparatus 10. At step 333, it is determined, upon receiving the group management performance value signal 2*a*, that the simulation is completed, and the RAM 10C stores the group management performance data PRF contained in the group management performance value signal 2*a* at step 334. Then, the process goes to next step 335.

At step 335, the number of estimation times NE is increased by one, and the estimation result data RES, including the number of estimation times NE, the sets for estimation NPSY(=NPSX), and the group management performance data PRFY(=PRF), are produced. Then, the value of the set number for estimation NP for the new sets is increased by one at step 336.

Figure 16:
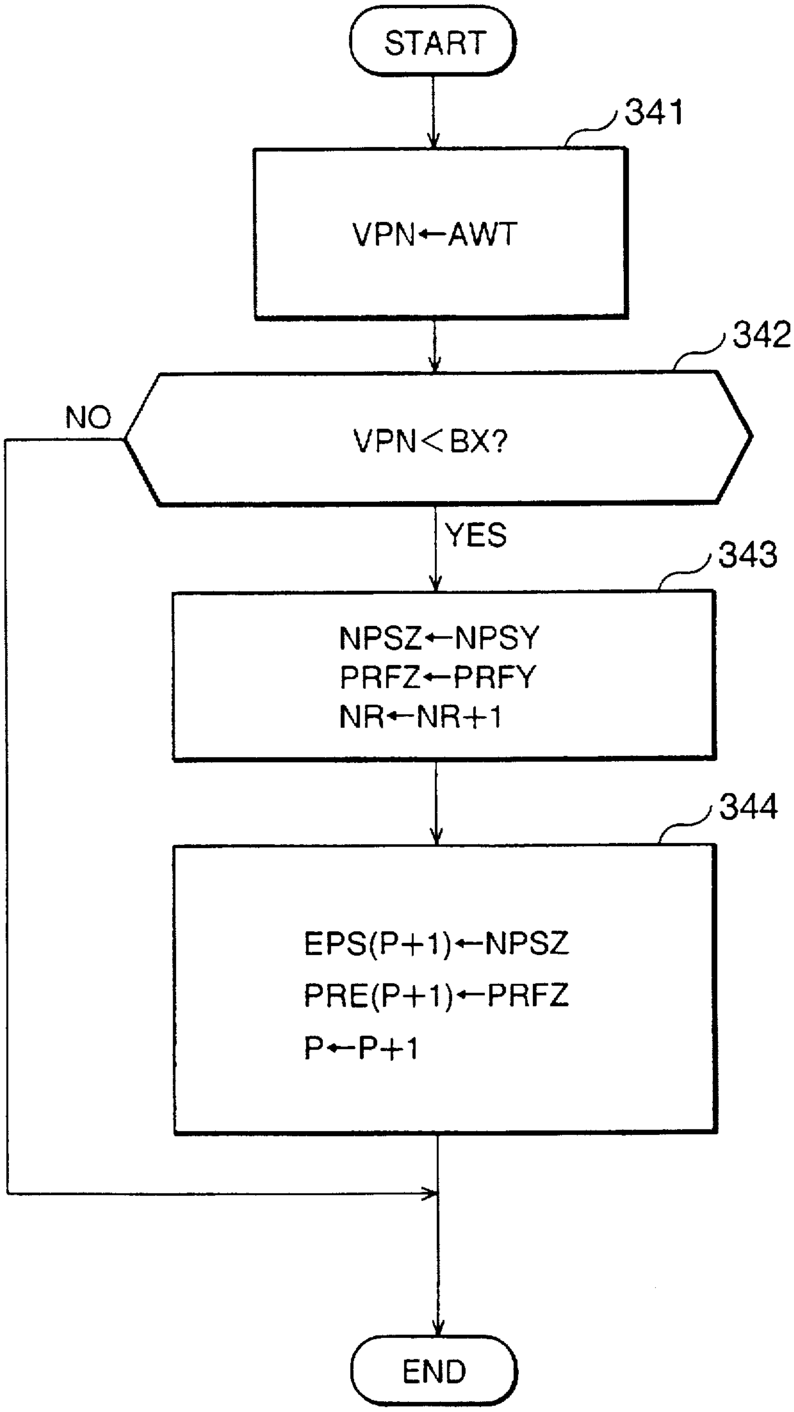
FIG. 16 is a flow chart showing an addition program for the first embodiment.

Referring to FIG. 11, an addition program at step 34 correspond to the adding unit 15 in FIG. 1 and determines whether the new set (unit number NP) is to be registered. This addition program is described using FIG. 16. In FIG. 16, the mean waiting time AWT is taken out of the group management performance data PRFY at step 341 and is set as the performance estimation value VPN for addition registration determination. At step 342, the performance estimation value VPN and the addition reference value BX are compared to determine whether it is to be registered in the memory. If VPN is equal to BX or above, the system does not permit the registration and ends the program 34 immediately.

On the contrary, if VPN is less than BX, the process goes to step 343, and the value of the addition registration time number NR is incremented by one, thereby generating the data for addition registration RAP including the number of addition registration times NR, the estimation sets NPSZ(=

NPSY), and the group management performance data PRFZ (=PRFY). The new set is additionally registered as the set of the number |P+1| at step 344, and at the same time, the value of the number of sets P already registered is increased by one.

Referring to FIG. 11, a deletion program at step 35 corresponds to the deleting unit 16 in FIG. 1 and deletes sets having a poor performance estimation value.

Figure 17:
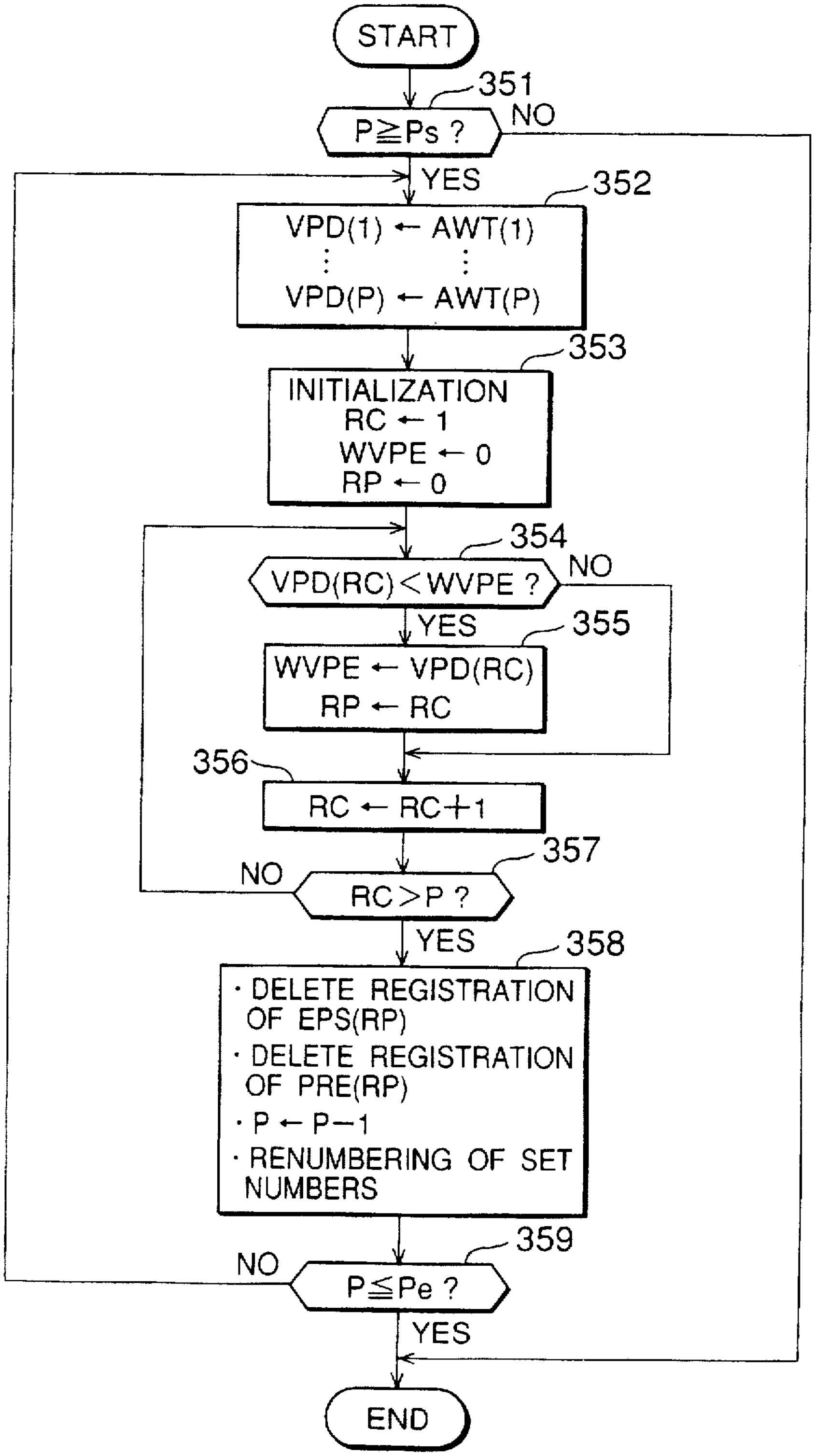
FIG. 17 is a flow chart showing a deletion program for the first embodiment.

Referring to FIG. 17, the deletion program is described. In FIG. 17, the number P of registered sets and the deletion start determination value Ps are compared at step 351 to determine whether it is time for deletion of sets. If P is less than Ps, it is determined that it is not correct timing to delete the impaired sets and the process immediately quits from this program 35. If P is equal to or greater than Ps, it is determined that it is correct timing to delete the impaired sets, and the impaired sets are deleted until the set number P becomes the deletion end determination value Pe by repeating steps 352 to 359.

At step 352, the mean waiting times AWT(1) to AWT(P) are taken out of the group management performance data PRE(1) to PRE(P), respectively, and are set to the performance estimation values VPD(1) to VPD(P), respectively. The initialization is then implemented at step 353 to detect the impaired sets to be deleted. That is, the counter RC for seeking is set to 1; the worst value WVPE of the performance estimation value is set to zero; and the deletion set number RP is set to zero.

The set (set number RP) having the worst performance estimation value is specified by repeating the processes of steps 354 to 357. That is, when any set whose performance estimation value VPD(RC) is worse than the present worst value WVPE is detected at step 354, the performance estimation value VPD(RC) is newly set to the worst value WVPE at step 355. The value of the counter RC for seeking is set to the deletion set number RP. The counter RC is incremented by one at step 356 and it is determined at step 357 whether seeking with respect to all sets has been completed.

At step 358, the registration of sets having the worst value WVPE (whose deletion set number is the RP) is deleted, and the registration of the group management performance data PRE(RP) is also deleted. The value of the number of sets already registered P is also reduced by one. Then, the remaining sets are renumbered sequentially from 1, so that the sets are restored, and then the process at step 358 ends.

At step 359, it is determined whether the number of sets P after deletion is equal to or less than the deletion end determination value Pe. If not, the system repeats the processes of steps 352 to 358 described above. When P becomes equal to or less than Pe, this deletion program ends.

Although in this embodiment the deletion start determination value Ps and the deletion end determination value Pe are set to 50 and 30, respectively, at step 351, they can be other numbers.

The deletion start determination value Ps is to be set in a range where the value does not exceed the maximum value Pmax of sets that can be stored in the RAM 10C. If the deletion start determination value is set so that Ps=Pe+1, any time a set is additionally registered, a substitute set is deleted. This method is convenient when the RAM 10C does not have sufficient memory size.

The deletion end determination value Pe at step 359 means the remaining number of sets become parents. If the deletion end determination value Pe is small, the probability that excellent new sets are produced will be reduced because it is difficult to maintain the variation of the new sets produced. On the contrary, if the deletion end determination value Pe is large, the new sets produced will ensure variation, and, as a result, the probability that excellent new sets will be produced is increased. It is, however, not desirable to give a large number to the deletion end determination value Pe for an effective seeking process, since the production operation may increase.

Accordingly, it is desirable to determine the deletion end determination value Pe in accordance with the combination of two sets performing crossover, the kinds and numbers of the control parameters, and so forth, or occasionally, by trial and error. This embodiment ensures the combinations (=30×29÷2) since Pe=30.

Referring to FIG. 11, an additional reference value modification program at step 36 corresponds to the additional reference value modifier 18 in FIG. 1 and modifies the additional reference value BX in accordance with the registration status of the sets in the memory 11.

Figure 18:
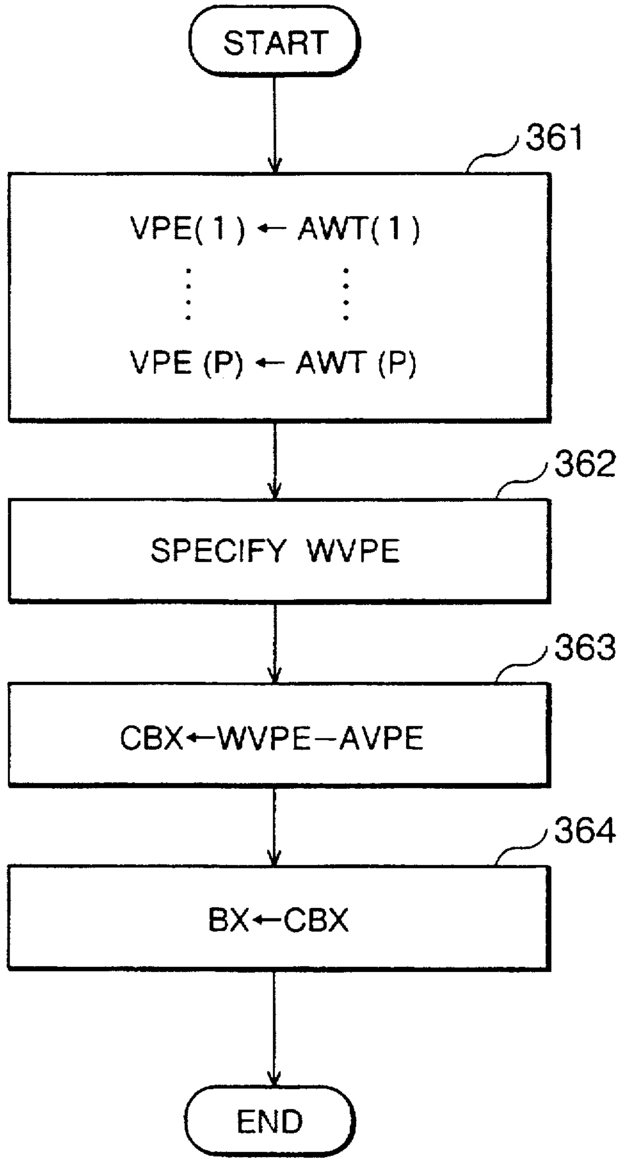
FIG. 18 is a flow chart showing an additional reference value modification program for the first embodiment.

FIG. 18 describes the additional reference value modification program. In FIG. 18, at step 361, each mean waiting time AWT(1) to AWT(P) is fetched out of the group management performance data PRE(1) to PRE(P) and is put in the performance estimation value VPE(1) to VPE(P) for setting the reference value. The system operates to specify the worst value WVPE among the performance estimation values VPE(1) to VPE(P) for setting the reference value at step 362. This operation is the same as the processes at steps 353 to 357. At step 363, a modification value CBX is obtained from the calculation of |the worst value WVPE—the correction value AVPE|, and the modification value CBX is put in the additional reference value BX to modify it at step 364.

In this embodiment, the correction value AVPE is fixedly set to one second between the beginning and the end of seeking. That is, the additional reference value BX, meaning the mean waiting time, is set so as to be smaller by one second per cycle. However, the system can use other values.

If the correction value AVPE is set to a large value, the condition for additional registrations gradually becomes stricter, so that it should not be a very large value to obtain as many excellent sets as possible in limited estimation times. On the contrary, if the correction value AVPE is set to zero seconds, the probability that many sets having similar characteristics and little distinctive performance are additionally registered may increase. Therefore, it is necessary to properly determine the value in accordance with the seeking conditions.

Referring to FIG. 11, a seeking end determination program at step 37 corresponds to the seeking end determination unit 17 and determines whether seeking the optimum set has ended. This is described using FIG. 19.

Figure 19:
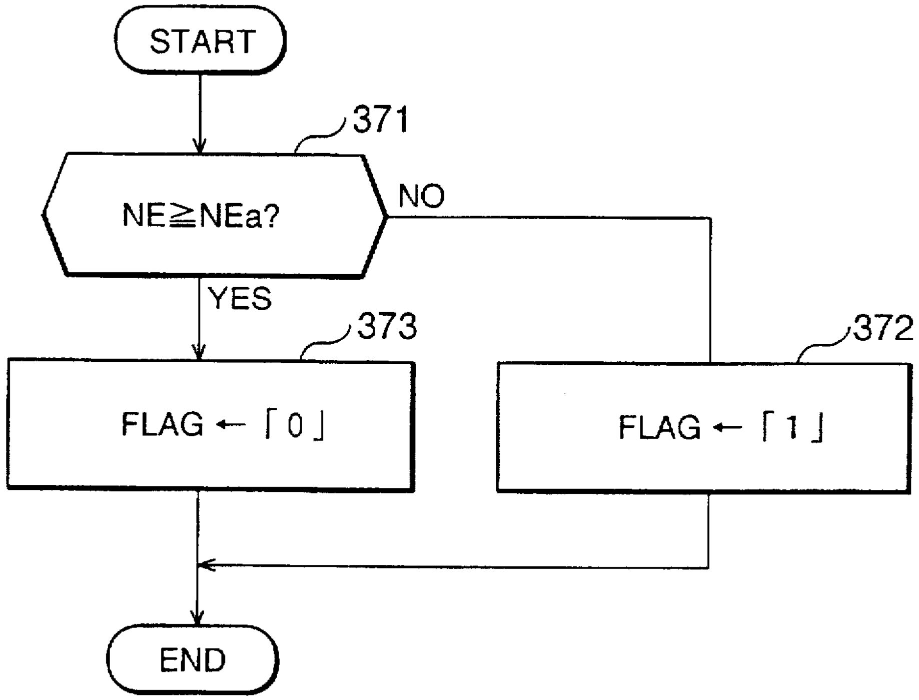
FIG. 19 is a flow chart showing a seeking end determination program for the first embodiment.

In FIG. 19, it is determined whether the seeking process is to end based on the number of estimation times NE and the seeking end determination value NEa at step 371. If NE<NEa, it is determined that the seeking process is insufficiently completed, and, at step 372, the seeking permission flag FLAG is set to "1" for continuing the seeking process. If NE≧NEa, it is determined that the seeking process has been executed sufficiently, and the seeking permission flag FLAG is set to "0", ending the seeking process.

Although in this embodiment the seeking end determination value NEa is set to 1,000, the determination value NEa can be another value.

Generally, it is difficult to determine how many estimations are sufficient. This is because the convergence of seeking is grossly dependent on seeking conditions, such as kinds and number of the control parameters, contents of initial sets, the method of producing the new sets, and conditions of additional registrations.

To obtain many excellent sets showing excellent group management performance, the seeking end determination value NEa should be set to as large a value as possible. If a cumulative value NE of the number of seeking times becomes too large, however, it would take considerable time to end the seeking process, thereby resulting in an ineffective seeking process. Therefore, to efficiently obtain many excellent sets, the seeking end determination value NEa is necessarily determined according to the seeking conditions.

Figure 20:
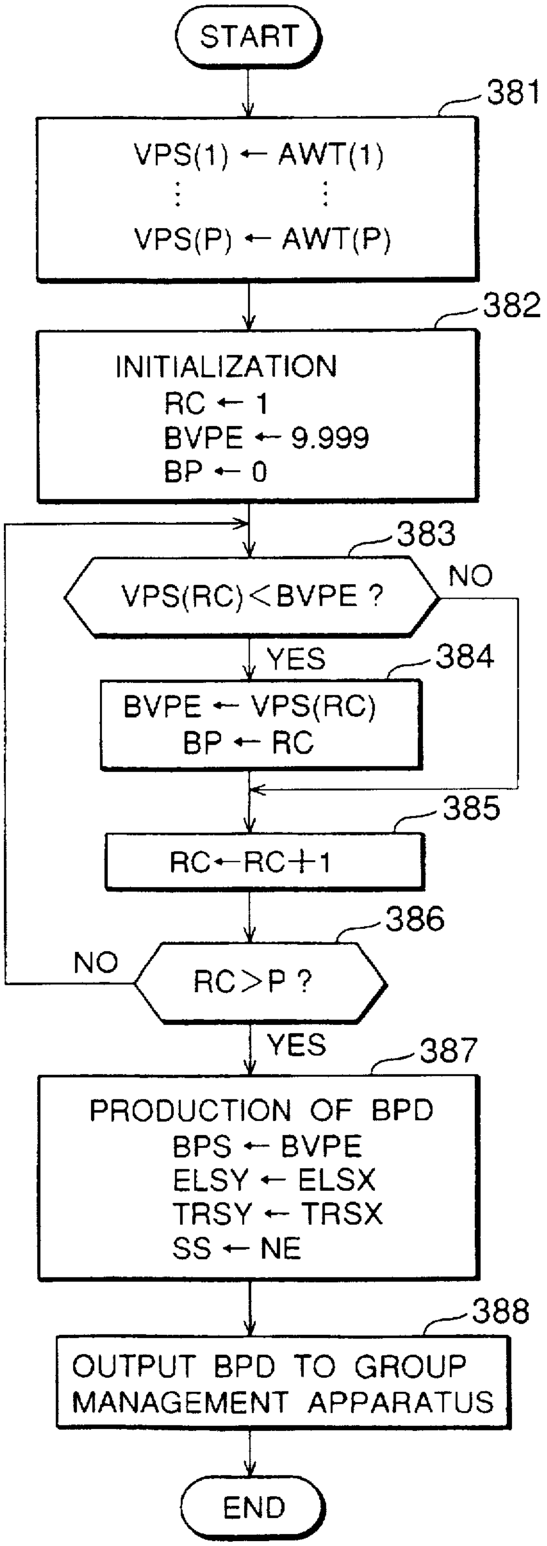
FIG. 20 is a flow chart showing an optimum set extraction program for the first embodiment.

Referring to FIG. 11, an optimum set extraction program at step 38 corresponds to the extractor 20 in FIG. 1 for extracting one optimum set out of the plural sets. This is described below with reference to FIG. 20. In FIG. 20, at step 381, each mean waiting time AWT(1) to AWT(P) is fetched out of the group management performance data PRE(1) to PRE(P) and is put in the performance estimation value VPS(1) to VPS(P) for optimum value determination. The system is then initialized to detect the optimum set at step 382. That is, the counter RC for seeking is set to 1; the best value BVPE of the performance estimation value is set to 9,999; and the set number BP is set to zero.

Next, the optimum set (set number BP) having the best performance estimation value is specified by repeating the processes of steps 383 to 386. That is, at step 383, the performance estimation value VPS(RC) and the best value BVPE obtained previously are compared. If a performance estimation value VPS(RC) better than the best value BVPE is detected, the performance estimation value VPS(RC) is put in the best value BVPE at step 384, and the value of the counter RC for seeking is put in the set number BP. The counter RC for seeking is advanced by one at step 385, and it is determined whether the search has been completed for all sets at step 386.

The optimum set data BPD including the optimum set BPS, the elevator car specification data ELSY, the traffic flow specification data TRSY, and the seeking status data SS is produced at step 387. That is, the contents of the set having the best value BVPE are put in the optimum set BPS, and the same contents as the elevator car specification data ELSX and the traffic flow specification data TRSX of the simulation condition data SIM are set as the elevator car specification data ELSY and the traffic flow specification data TRSY, respectively. The value of the number of estimations NE up to that time is set to the seeking status data SS.

Finally, the optimum set signal 20 containing the optimum set data BPD is fed to the group management apparatus 1 at step 388.

Referring to FIG. 11, as described above, if seeking of the optimum set is completed, the process goes back to step 26, and steps 26, 27, 30 to 38 are repeatedly implemented until when the seeking permission flag FLAG is reset to "0" in the seeking end determination program when the completion of seeking is detected. If the contents of the elevator car specification data and the traffic flow specification data are changed during the course of seeking, re-seeking is implemented. That is, the seeking permission flag FLAG is changed to "1", and respective steps from step 31 are implemented.

Advantages of the First Embodiment

As described above, according to the first embodiment, excellent sets are efficiently produced, thereby enabling efficient seeking of the optimum set. Since the simulator 2 for group management is a separate body from the group management apparatus 1, the optimum set is sought without disturbing the original group management operation.

The first embodiment can sufficiently entertain the characteristics of "crossover" and "mutation" since new sets are produced under both methods. In other words, new sets to be produced can be provided with the proper variation and convergence at the same time, so that the optimum set can be sought early through combinations of broad and local seeking.

In the first embodiment, the parent set is selected after each parent set is weighted with a selection probability based on the performance estimation value, so that the system can raise the probability of selecting excellent parents, and, in other words, so that the system can raise the probability that excellent new sets inheriting the good nature of the parents are produced.

With the first embodiment, the system can avoid a useless process of deleting immediately after additional registrations because the additional reference value is modified based on the worst value among the plural performance estimation values, thereby becoming gradually stricter. If the determination of a seeking end and conditional modification of parent set and parameter selections are performed based on the number of additional registrations, the system can realize a proper process according to the progress of seeking.

Also in the first embodiment, a reasonable registration of sets is implemented taking the memory's capacity into account, because the registered sets can be maintained at less than a certain number by the deletion process. As a result, more excellent sets can be selected out of as many sets as possible.

With the first embodiment, the system can retain the sets having a good performance estimation value because the system sequentially deletes the sets having a bad performance estimation value, thereby always providing excellent sets as the parent sets when the new sets are produced.

In the first embodiment, the extractor seeks the optimum set even during the course of seeking and provides the optimum set at its output. The group management apparatus 1 can therefore obtain the optimum set without waiting for the completion of seeking, even during the course of seeking, and use it. The group management apparatus 1 can properly determine a value for use of the optimum set provided during the seeking process, because the group management apparatus 1 can obtain the seeking status data (the number of estimation times NE) from the optimum set during the seeking process.

With the first embodiment, continuation of seeking until the seeking times reach a certain number prevents the seeking process from ending prior to that sufficient seeking.

Also in the first embodiment, the system also has a re-seeking function, so that when any of the elevator car specification data and the traffic flow specification data is changed, the system can automatically restart seeking excellent sets even after the end of seeking. Therefore, even if a command for the start of seeking is delayed from the group management apparatus for some reason, the system can start quickly seeking. The system can consequently obtain the optimum set corresponding to the recent group management conditions at an early stage. The system can automatically restart seeking from the beginning under a new group management condition by means of the re-seeking function even during seeking at a time when the elevator car specification data or the traffic flow specification data changes.

In the first embodiment, the initial set groups corresponding to each traffic flow specification are previously prepared. When starting seeking, the system can select the most suitable initial set group for the traffic flow at that time to initialize itself. Therefore, the system can render sets excellent to a certain degree as the parent sets from the beginning, thereby seeking rapidly. When the set provided as the optimum set is used during the seeking process, the system can enjoy good group management performance to some extent even during the early stage of the seeking process.

In the first embodiment, the group management performance data PRF obtained at the simulator 2 are stored in the memory 11. The group management performance data PRF includes plural data as shown in FIG. 7. Some data contained in the group management performance data PRF are substituted in the performance estimation value VPN for additional registrations, the performance estimation value VPE (1) to VPE(P) for setting the reference value, the performance estimation value VPD(1) to VPD(P) for deletion determination, and the performance estimation value VPS(1) to VPS(P) for optimum value determination. Therefore, no simulation is required at any time when each performance estimation value needs to be obtained. Where the performance estimation values include the common data (such as the mean waiting time), only the common data are to be stored as the group management performance data PRF as a matter of course.

[Outline of Production Method and Selection Method]

Production methods for new individuals (children) of (n+1)th generation from individual groups (parents) of nth generation are generally classified in two ways. A first method is that newly produced individuals (children) are used as parents to produce the next new individuals (children) belonging to the same generation ((n+1)th generation) as the parents. On the other hand, a second method is that they are not used. More specifically, where:

- Gn(Mn) represents an nth generation individual group whose assembly size is Mn;
- Gn*(j) represents a new individual group, whose assembly size is j, including new individuals and produced based on at least the individual group Gn(Mn);
- gn(i) represents an individual of number i of nth generation; and
- gn*(j) represents a new individual of number j of the new individual group Gn*(j), there are two methods for newly producing a new individual gn*(j+1) of number (j+1) to be added and producing a new individual group Gn*(j+1).

[Production method A]:

A production method A in which only the current generation individual group Gn(Mn) is used as the parent to produce the new individuals gn*(j+1) as the children from crossover or mutation.

[Production method B]:

A production method B in which all or part of the current generation individual group Gn(Mn) and the new individual group Gn*(j) are used as the parents to produce the new individuals gn*(j+1) as the children from crossover or mutation, wherein:

Gn(Mn)={gn(1), gn(2), . . . , gn(Mn)};

Gn*(j)={gn*(1), gn*(2), . . . , gn*(j)}; and

Gn*(j+1)={gn*(1), gn*(2), . . . , gn*(j), gn*(j+1)}.

It is to be noted that there is another method (hereinafter called "production method Ba"), as a modification of the production method B, in which only the individuals eligible for parents are used, where a part of the new individual group Gn*(j) is made the parents.

On the other hand, selection methods for the next generation individual group are classified according to whether the current generation individuals remain as the next generation individuals. That is, where: Gn*(Mn*) represent a new individual group whose assembly size is Mn*; and Gn+1(Mn+1) represents a next generation individual group whose assembly size is Mn+1, the two methods A and B are as follows.

[Selection method A]

A selection method A Is a method in which new individuals gn+1(i) (i=1, . . . , Mn+1) of Mn+1 individuals are selected under a certain threshold out of the new individual group Gn*(Mn*) and used as the next generation individual group Gn+1(Mn+1). In this method, the current generation individual group Gn(Mn) never remains as the next generation individuals.

[Selection method B]

A selection method B is another method in which new individuals gn+1(i) (i=1, . . . , Mn+1) of Mn+1 individuals are selected under a certain threshold out of all or part of the current generation individual group Gn(Mn) and the new individual group Gn*(Mn*), and used as the next generation individual group Gn+1(Mn+1), providing that:

Gn*(Mn*)={gn*(1), gn*(2), . . . , gn*(Mn*)}; and

Gn+1(Mn+1)={gn+1(1), gn+1(2), . . . , gn+1(Mn+1)}.

It is to be noted that there is another method (hereinafter called [selection method Ba]), as a modification of the [selection method B], in which the individuals who cannot be the parents of the new individual group Gn*(Mn*) among the current individual group Gn(Mn) cannot remain as the next generation individuals. Moreover, there is yet another method (hereinafter called [selection method Bb]), as a modification of the selection method B, in which new individuals not eligible as the parents for the new individual group Gn*(Mn*) cannot remain as the next generation individuals.

[Examples of Combinations of Production Method and Selection Method]

(A) For implementing the optimum set seeking method in combination of the production method B and the selection method B, the method is as follows.

The memory 11 is divided into two, a region for a current generation set group and a region for an additionally registered set group. Then, a new set group is produced by the producer 12 using the current generation set group and the additionally registered set group. New sets are selected with a certain reference (including the case that all new sets are unconditionally selected) among the new set group by the adding unit 15 and additionally registered. On the other hand, a fixed number of sets are selected by the deleting unit 16 with a certain reference among the current generation set group and the additionally registered set group whenever the number of additional registration reaches a predetermined value (for example, Ps−Pe+1), and the set group is newly set as the current generation set group. Then, these steps are repeated.

In such a combination, the function of the [production method B] is assigned to the producer 12 and the adding unit 15, and the function of the [selection method B] is assigned to the adding unit 15 and the deleting unit 16.

The first embodiment uses the production method Ba as a modification of the [production method B] and the selection method Bb as a modification of the [selection method B]. From the point of view that the adding unit 15 of the first embodiment additionally registers only sets eligible as parents among new sets and uses them as one of the parents for the next new sets, it can be said that the unit 15, as well as the producer 12, is in charge of the functioning of the [production method Ba]. At the same time, from a point of view that the adding unit 15 of the first embodiment additionally registers only sets eligible as parents and uses them as the potential parent sets for the next generation, the adding unit 15, as well as the deletion unit 16, is in charge of the functioning of the [selection method Bb].

(B) Where the [production method A] and the [selection method A] are combined, the method is as follows. The memory 11 is divided into two, a region for a current generation set group and a region for additionally registered set group. Then, a new set group is produced by the producer 12 from the current generation excellent set group. Plural sets are selected with a certain reference from the new set group by the adding unit 15 and additionally registered. On the other hand, all the current generation set group is deleted by the deleting unit 16 whenever the number of additional registration reaches a predetermined value (for example, Pe), and the additionally registered set group is moved thereto to renew the generation. Then, these steps are repeated.

In such a combination, the function of the production method A is assigned to the producer 12 in the first embodiment, and the function of the [selection method A] is assigned to the adding unit 15 and the deleting unit 16.

(C) Where the [production method A] and the [selection method B (or Bb)] are combined, the method is as follows.

The memory 11 is divided into two, a region for a current generation set group and a region for an additionally registered set group, and then, a new set group is produced by the producer 12 from the current generation set group. A set group is newly selected with a certain reference from the new set group by the adding unit 15 and additionally registered. On the other hand, a set group is selected by the deleting unit 16 from the current generation excellent set group and the additionally registered excellent set group whenever the number of additional registrations reaches a predetermined value (for example, Ps−Pe+1), and the set group is set as the current generation excellent set group. Then, these steps are repeated.

Accordingly, in such a combination, the function of the [production method A] is assigned to the producer 12 in the first embodiment, and the function of the [selection method B (or Bb)] is assigned to the adding unit 15 and the deleting unit 16.

(D) Where the [production method B (particularly Ba)] and the [selection method A] are combined, the method is as follows.

The memory 11 is divided into two; a region for a current generation set group and a region for an additionally registered set group. Then, a new set group is produced by the producer 12 from the current generation excellent set group and the additionally registered excellent set group. A new excellent set group is selected with a certain reference from the new set group by the adding unit 15 and additionally registered. On the other hand, the whole current generation excellent set group is deleted by the deleting unit 16 whenever the number of additional registration reaches a predetermined value (for example, Pe), and the additionally registered set group is moved thereto as it is to renew the generation. Then, these steps are repeated.

In such a combination, the function of the [production method B (particularly Ba)] is assigned to the producer 12 and the adding unit 15 in the first embodiment, and the function of the [selection method A] is assigned to the adding unit 15 and the deleting unit 16.

[Performance Estimation Value]

As a reference, each performance estimation value used in the embodiment is summarized as follows with respect to the means of implementation and the purpose.

[19] Performance estimation values for optimum set determination: VPS(1) to VPS(P).

Means: the extractor 20.

Purpose: for selection of the optimum set.

[20] Performance estimation values for additional registration determination: VPN.

Means: the adding unit 15.

Purpose: for determination of additional registration of new sets.

[21] Performance estimation values for deletion determination: VPD(1) to VPD(P).

Means: the deleting unit 16.

Purpose: for determination of deletion against the registered sets.

[22] Performance estimation values for setting additional reference value: VPE(1) to VPE(P).

Means: the reference value modifier 18.

Purpose: for reference when the additional reference value BX is modified.

[23] Performance estimation values for setting parent selection probability: VPS(1) to VPS(P).

Means: the producer 12.

Purpose: for selection of the parent sets.

Regarding each set, herein, its excellence is determined from various aspects. For example, it is determined from a point of view of to what extent the control goal demanded by the group management apparatus is satisfied. As the performance estimation value at that time, the group management performance values (see FIG. 7) directly relevant to the demanded control goal can be used as they are.

Regarding crossover, the excellence as the parent of each set is determined from a point of view of variations in the memory. This is because crossover by sets having different characteristics from one another can raise the probability that more excellent sets are produced.

The "distribution index" can be used as the performance estimation value showing their variations. The distribution index can be defined as, for example, the number of other sets, with respect to each set as a center, located so that the distance between the sets is equal to or less than a certain value. The distance between the sets is herein defined in a multi-dimension space defined by multiple set forming elements. The distribution index indicates similarity between sets, and the lower the value of the index, the higher the performance as a parent.

The distribution index can be defined as a sum of distances from other sets. In such a case, the greater the value of the index, the higher the performance as a parent. The distribution index can be defined as the number of other sets whose distance to the set is larger than a predetermined value. In such a case, the greater the value of the index, the higher the performance as a parent.

Next, a way of finding the performance estimation value is described in detail. In the first embodiment, any performance estimation value includes the mean waiting time AWT. However, it is possible to change the contents of each performance estimation value according to the purpose of its use. For example, each performance estimation value E may be calculated using different performance estimation functions from one another.

Generally, the performance estimation function regarding the group management performance is expressed as follows, where F(x) means a function of x.

$$E=F(X1, X2, \ldots, Xi, \ldots, Xn, T1, T2, \ldots, Ti, \ldots, Tn) \quad [24]$$

where;

n: the number of estimation terms for the group management performance

Xi: performance value at the estimation term i (i=1, 2, . . . , n)

Ti: a performance reference value at the estimation term i (i=1, 2, . . . , n)

The performance reference value Ti indicates a [target value] to be finally reached as the group management performance or a [limited value] to be necessarily satisfied. The [limited value] includes an [upper limit value] and a [lower limit value]. Whether the performance reference value is given as the [target value] or as the [upper limit value] or the [lower limit value] is determined differently in accordance with where the object of the group management control is placed.

It should be noted that, where the performance reference value Ti means the "target value" in regard to the performance estimation function [24], the performance will become better as |Xi−Ti| becomes smaller. Where the performance reference value Ti means the [upper limit value], the performance will become better as (Ti−Xi) becomes larger. Where the performance reference value Ti means the [lower limit value], the performance will become better as (Xi−Ti) becomes larger.

In summary, the performance estimation values shown in the functions [19] to [23] are determined by the performance estimation function, the estimation term therein, and the performance reference value.

The following are some specific examples to describe operation methods of the performance estimation value.

[25] First Example of Performance Estimation Function (in the case of the first embodiment):

Control Object: [to reduce the mean waiting time as much as possible]

Performance Reference Value: T1=0 sec. (T1: [target value] of the mean waiting time).

Performance Estimation Function: E=|AWT−T1|=AWT (AWT: mean waiting time).

Determination of Additional Registration: E<BX (BX: additional reference value, for instance, BX=15 sec.).

[26] Second Example of Performance Estimation Function (in the case of a second embodiment as described below):

Control Object: [to make the mean waiting time as close to the predetermined value as possible]

Performance Reference Value: T1=20 sec. (T1: [target value] of the mean waiting time).

Performance Estimation Function: E=|AWT−T1| (AWT: mean waiting time).

Determination of Additional Registration: E<BX (BX: additional reference value, for instance, BX=3 sec.).

[27] Third Example of Performance Estimation Function:

Control Object: [to make the mean waiting time AWT, the long waiting rate RLW, and the prediction error rate RPE as close to respective target values as possible]

Performance Reference Value: T=15 sec., T2=2%, T3=3% (wherein T1: [target value] of the mean waiting time, T2: [target value] of the long waiting rate, T3: [target value] of the prediction error rate).

Performance Estimation Function: E=Ap×|AWT−T1|+Aq×|RLW−T2|+Ar×|RPE−T3| (wherein Ap, Aq, and Ar are weighting coefficients).

Determination of Additional Registration: E<BY (BY: general estimation reference value, for instance, BY=10).

[28] Fourth Example of Performance Estimation Function:

Control Object: [to make the mean waiting time AWT, the long waiting rate RLW, and the prediction error rate RPE generally as small as possible]

Performance Reference Value: T1=0 sec., T2=0%, T3=0% (wherein T1: [target value] of the mean waiting time, T2: [target value] of the long waiting rate, T3: [target value] of the prediction error rate).

Performance Estimation Function: E=Ap×AWT+Aq×RLW +Ar×RPE (wherein Ap, Aq, and Ar are weighting coefficients).

Determination of Additional Registration: E<BY (BY: general estimation reference value, for instance, BY=1000).

[29] Fifth Example of Performance Estimation Function:

Control Object: [to make the number of estimation terms such that the mean waiting time AWT, the long waiting rate RLW, and the prediction error rate RPE stay within their respective allowable range of increase as much as possible]

Performance Reference Value: T1a=15 sec., T1b=3 sec., T2=2%, T3=3% (wherein T1a: [target value] of the mean waiting time, T1b: an allowable range of mean waiting time deviation, T2: [upper limit value] of the long waiting rate, T3: [upper limit value] of the prediction error rate).

Performance Estimation Function: E=f(|AWT−T1a|−T1b) +f(RLW−T2)+f(RPE−T3) (wherein f(x) represents a function that f(x)=1, x≧0 and f(x)=0, x<0).

Determination of Additional Registration: E<BY (BY: general estimation reference value, for instance, BY=1).

[30] Sixth Example of Performance Estimation Function:

Control Object: [to make the mean waiting time AWT stay within its predetermined allowable range from its best value (the minimum value) and to reduce the long waiting rate RLW as much as possible]

Performance Reference Value: T1a=BVPE (sec.), T1b=2 sec., T2=2% (wherein T1a: [target value] of the mean waiting time, T1b: an allowable range of mean waiting time deviation, T2: [target value] of the long waiting rate).

Performance Estimation Function: E=(100−RLW)×f(T1b −|AWT−BVPE|) (wherein f(x) represents a function that f(x)=1, x≧0 and f(x)=0, x<0).

termination of Optimum Value: Max {E}.

The first and second examples of performance estimation functions [25], [26] refer to a case in which the estimation item is only one mean waiting time and their control objects are also simple, and therefore the estimation functions can be relatively easily generated. It is very easy to use the estimation terms shown in FIG. 7 (even estimation terms outside those shown in FIG. 7, as a matter of course) in lieu of the mean waiting time.

On the other hand, for multiple estimation terms, the performance estimation function becomes complicated since the control object becomes variable. When the third and fourth performance estimation functions [27] and [28] are used, the performance estimation functions are weighted sums in conjunction with deviations between the estimation term and the target value. The method in which a goal achievement degree is thus generally estimated in association with priorities of respective estimation terms, generally works well. In particular, it is a very convenient method where the estimation terms have control objects adverse to each other.

As shown in the fifth performance estimation function [29], the number of the estimation terms in which the group management performance value falls within a determined allowable range (for example, equal to the upper limit value or below, equal to the lower limit value or above, or that the deviation from the target value remains within a certain value) is sought with respect to each estimation term, and the group management performance can be estimated from this number.

Moreover, each estimation value is calculated from two or more different performance estimation functions, respectively, and the additional registration determination, the deletion determination, the optimum set determination, and so forth can be performed based on combinations of the plurality of estimation values.

As shown in the sixth performance estimation function [30], where there are two conditions, namely that the mean waiting time stays in a predetermined allowable range from the minimum value (E1=|AWT−BVPE|, E1≦T1b) and that the long waiting rate is the minimum among them (E2=RLW, Min {E2}), a candidate for the optimum value can be first selected by the performance estimation function E1, and then the optimum value can be finally selected by the performance estimation function E2. As shown in the sixth performance estimation function [30], it is possible to synthesize two sets of performance estimation functions and two conditions to rewrite one of the performance estimation function and one of the determination condition, and to select the optimum set using the performance estimation function and the determination condition.

Although in the first embodiment the selection probability of the parent sets is determined based on the performance estimation values, it is also possible to equally divide the selection probability. In such a case as the first embodiment, new sets having a similar nature tend to be produced, and, therefore, the variations of the sets stored in the memory 11 may disappear. When the variations disappear, there may be a problem in converging local solutions even at an initial stage of seeking. Therefore, where it is necessary to avoid the problem of initial convergence, or where it is necessary to reduce the calculation amount, the selection probability of the parent sets can be provided so as to be equally divided.

[Second Embodiment]

Referring to FIGS. 21 to 25, a second embodiment will be described as follows. In the description of the second embodiment, different portions from the first embodiment are mainly described.

Figure 21:
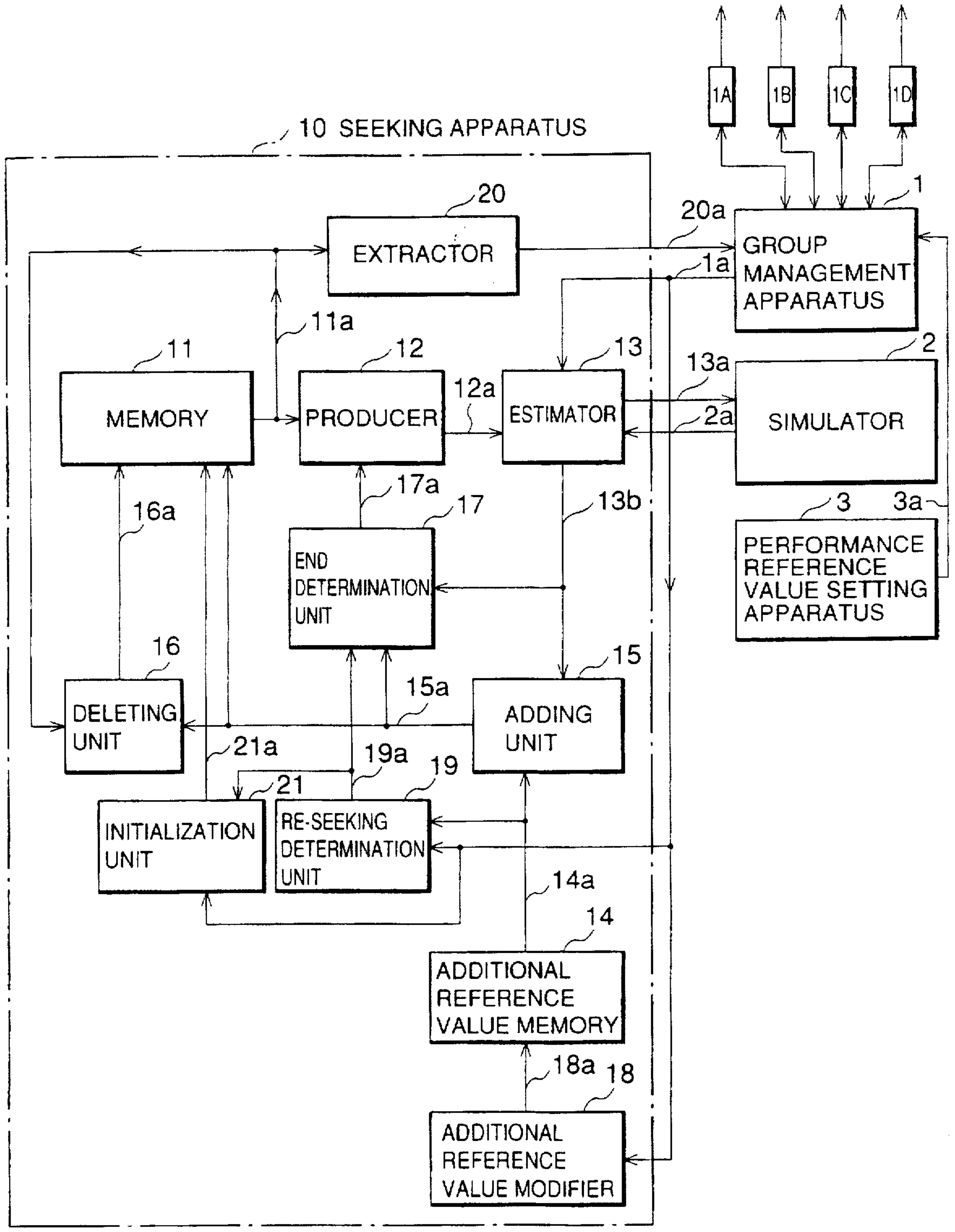
FIG. 21 is a block diagram showing a second embodiment of the invention.

FIG. 21 is a diagram corresponding to FIG. 1 and shows the second embodiment. In FIG. 21, a performance reference value setting apparatus 3 includes a personal computer and provides a reference value signal 3*a* to the group management apparatus 1. The reference value signal 3*a* includes the [performance reference value] for the group management performance and the [control reference value] for control of the seeking apparatus. In this embodiment, the performance reference value is the [target value] of the mean waiting time; the control reference value is the [designated value] given to the additional reference value BX. The reference value signal 3*a* can be fed directly to the seeking apparatus 10 (the estimator 13, the reference value renewing unit 18, the re-seeking unit 19, and the initialization unit 21).

Figure 22:
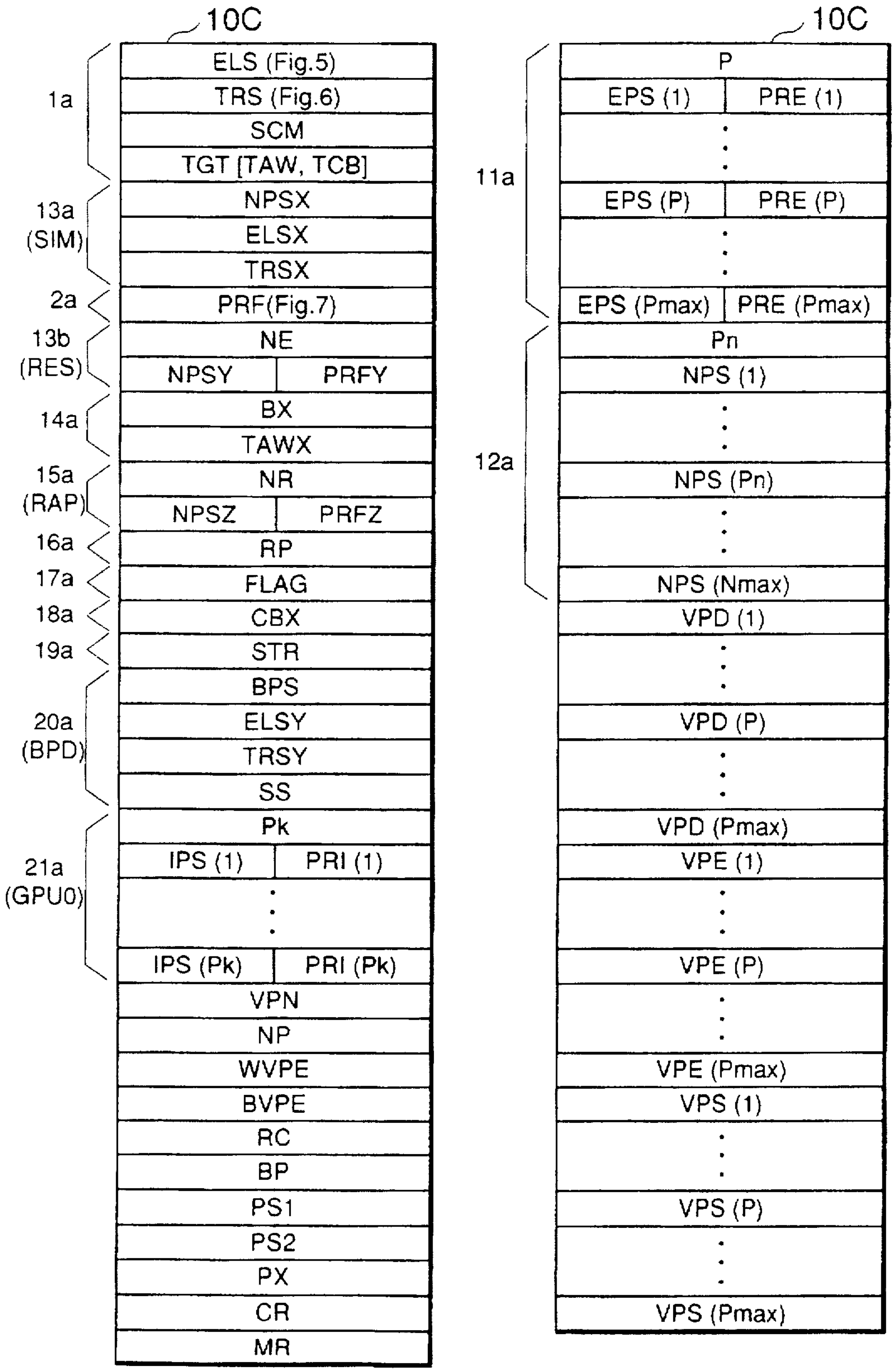
FIG. 22 is a diagram showing a RAM in the second embodiment.

FIG. 22 corresponds to FIG. 3 and shows the memory contents of the RAM 10C. In FIG. 22, TGT is one of the data items forming the contents of the seeking condition signal 1*a* and includes the data TAW (waiting time target value) indicating the [target value] of the mean waiting time AWT and the data TCB (additional reference designated value) indicating the designated value for the additional reference value BX. For example, the waiting time target value TAW is set to 5 seconds, and the additional reference designated value TCB is set to 3 seconds. TAWX is the data transcribed from the waiting time target value TAW and is used for calculation of the performance estimation values.

Upon the input of the reference value signal 3*a*, the group management apparatus 1 takes out the performance reference value (the waiting time target value TAW) and the control reference value (the additional reference designated value TCB) contained in the reference value signal 3*a*. As well as the operation at step 234 in FIG. 10, the group management apparatus 1 feeds the seeking condition signal 1*a* including the elevator car specification data ELS, the traffic flow specification data TRS, the seeking command data SCM, the waiting time target value TAW, and the additional reference designated value TCB, to the seeking apparatus 10. If the seeking process starts (see FIG. 11), the production, the estimation, the addition, the deletion, and the additional reference value modification are sequentially performed in the seeking apparatus 10 similary to the first embodiment. Upon the input of the seeking condition signal 1*a* to the seeking apparatus 10 based on the seeking start determination program 26 (see FIG. 25), the RAM 10C stores the elevator car specification data ELS, the traffic flow specification data TRS, the seeking command data SCM, the waiting time target value TAW, and the additional reference designated value TCB, as shown in FIG. 22.

In this second embodiment, an addition program 34 and a deletion program 35 contain have particular features. In the second embodiment, the performance estimation value E is computed based on the performance estimation function (E=|AWT−T1|) shown in the second performance estimation function [26], and the performance estimation value E and the additional reference value BX are compared with each other. If the performance estimation value E is smaller than the additional reference value BX, an additional registration is determined. That is, the difference between the actual value and the target value is compared with the designated value, and the new sets are additionally registered when the difference is smaller than the designated value. Therefore, at step 341 of the addition program 34 (see FIG. 16), the calculation [VPN←|AWT−TAWX|] is implemented, thereby setting the performance estimation value VPN for additional registration determination.

At step 352 of the deletion program 35 (see FIG. 17), the calculation [VPD(P)←|AWT(P)−TAWX|] is implemented, thereby setting the performance estimation values VPD(1) to VPD(P) for deletion determination.

Figure 23:
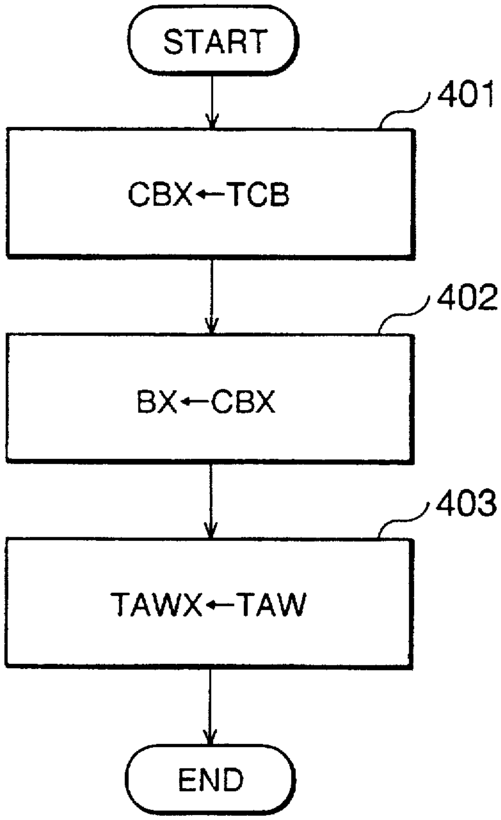
FIG. 23 is a flow chart showing an additional reference value modification program for the second embodiment.

FIG. 23 shows the contents of an additional reference value modification program 36 of the second embodiment.

In FIG. 23, the additional reference designated value TCB is read out at step 401 to be substituted into the modification value CBX. The additional reference value BX is rewritten with the modification value CBX at next step 402. At step 403, the waiting time target value TAW is read out, and, the performance reference value (the waiting time target value TAWX), which is being currently used, is rewritten with this value.

When the modification of the additional reference value is thus completed, the determination of the end of the seeking process and the extraction of the optimum set is implemented as in the first embodiment (see FIG. 11), providing that in the extraction program 38 for the optimum program the calculation method of the performance estimation value is different from the first embodiment. That is, at step 381 of the optimum set extraction program 38 (see FIG. 20), the performance estimation values VPS(1) to VPS(P) for optimum set determination are computed in such a manner that [VPS(1)←|AWT(1)−TAWX|, . . . , VPS(P)←|AWT(P)−TAWX|].

Figure 24:
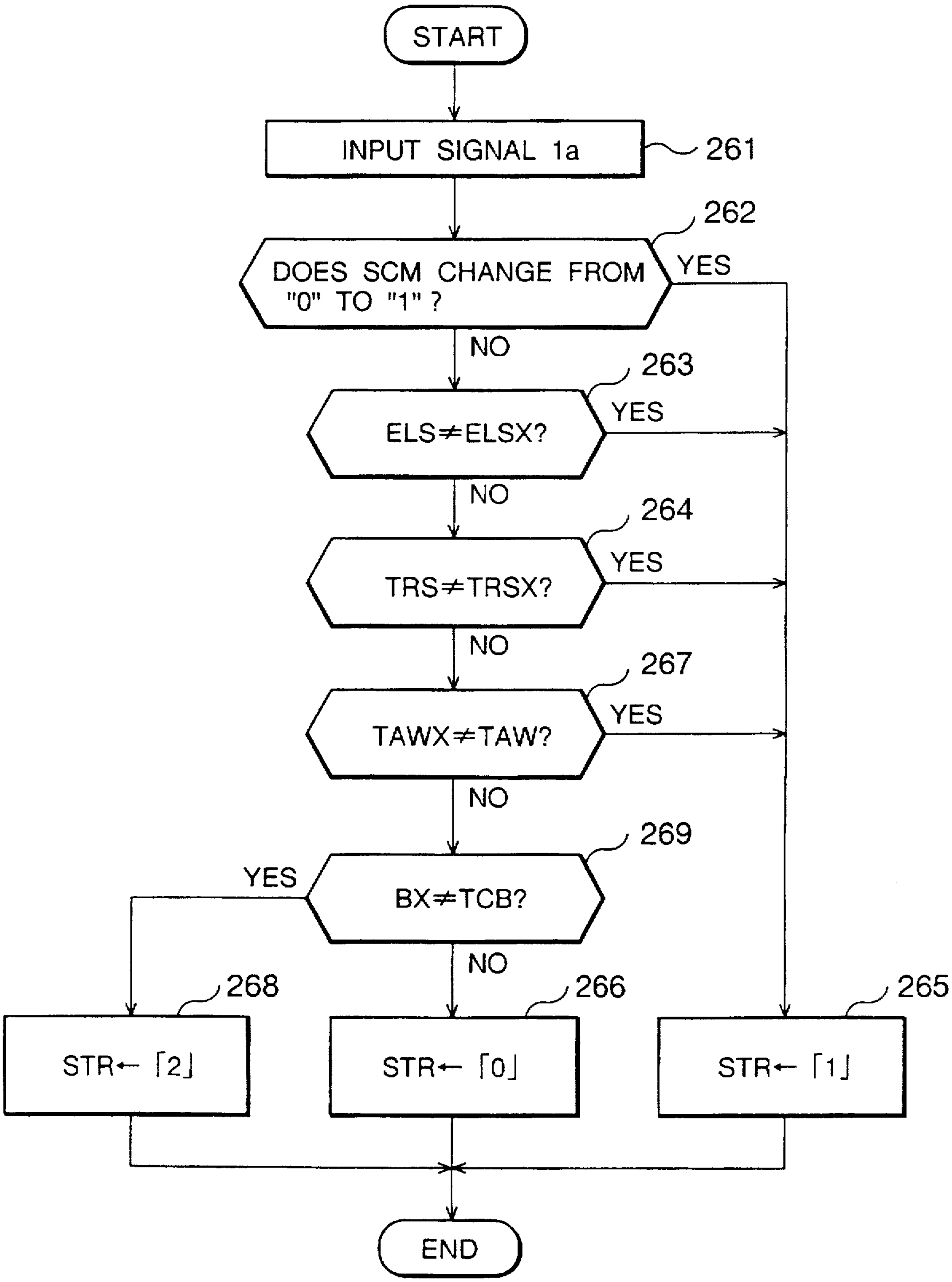
FIG. 24 is a flow chart showing a seeking start determination program for the second embodiment.

After the treatment of the optimum set extraction program 38, the process goes to the steps of the re-seeking determination program 25. Referring to FIG. 24, the operation steps of the seeking start determination program 26 in the re-seeking determination program 25 are described. It should be noted that FIG. 24 corresponds to FIG. 12 for the first embodiment.

In FIG. 24, at step 261, the seeking condition signal 1*a* is given from the group management apparatus 1, and then the RAM 10C stores the elevator car specification data ELS, the traffic flow specification data TRS, the seeking command data SCM, the waiting time target value TAW, and the additional reference designated value TCB. Then at steps 262 to 264, similary to the seeking start determination program 26 of the first embodiment (see FIG. 12), changes in the seeking command data SCM from [0] to [1], the elevator car specification data ELS, or the traffic flow specification data TRS are detected. At step 265, when at least one change has been detected, the seeking start flag STR is set to [1], and the start of the seeking process is commanded after being initialized by a first mode described below.

On the other hand, if any of the seeking command data SCM, the elevator car specification data ELS, and the traffic flow specification data TRS does not show a change, it is determined at step 267 whether the waiting time target value TAW changes. That is, the waiting time target value TAW and the waiting time target value TAWX currently being set are compared with each other to determine any change. If TAW is not equal to TAWX, it is noted as [changed], and then the seeking start flag STR is set to [1] at step 265. In contrast, if TAW is equal to TAWX, it is determined as [not changed], and the operation at step 269 is executed.

At step 269, it is determined whether the additional reference designated value TCB changes. That is, the additional reference designated value TCB and the additional reference value BX currently set are compared with each other to determine the existence of any change. If BX is equal to TCB, it is determined as [not changed], and then the seeking start flag STR is set to "0" at step 266, thereby maintaining the continuing state if seeking the optimum set, or maintaining its completed state if the seeking process is completed. In contrast, if BX is not equal to TCB, it is determined as [changed], and the seeking apparatus 10 sets the seeking start flag STR to [2] at step 268 and then commands the start of the seeking process after being initialized by a second mode. The initialization in the first mode includes initialization of the memory and a general initialization (initialization to the number of estimation times NE, the number of additional registration times NR and the like). The initialization in the second mode means the processing for general initialization excluding the initialization of the memory.

The reason that the initialization by the second mode is performed when the additional reference value BX is altered at step 269 is that it is no problem to continue the seeking process to the extent of the prior seeking process even if the additional reference value BX is changed to a more restricted (namely, smaller) value. From the point of view of convergence, better seeking efficiency is obtainable when the seeking process is restarted using the production and selection sets used as the initial sets. In particular, when the performance estimation function contains only a single estimation term and when only the additional reference value BX is altered, initialization in the second mode is more suitable.

It is now assumed that the seeking start flag STR is set to [0] as a result of determination thus conducted as to whether to let seeking of the optimum set stay in a current status (continuing status or to ending status) or restart from the beginning. In such a case, the process goes from step 27 to step 30 in FIG. 11, and whether the seeking process is underway or ended is determined from the value of the seeking permission flag FLAG. If the seeking process is underway, the FLAG is equal to [1], so that the process goes to step 31, thereby resetting the seeking permission flag FLAG to [0] at the seeking end determination program 37, repeating the operations at steps 31 to 38, 26, and 27 until the end of seeking is determined at step 27.

If seeking is completed, the seeking permission flag FLAG is set to [1] by the seeking end determination program 37, so that through repeating of steps 26, 27, 30, 26 in this order, the process waits for re-seeking.

If the elevator car specification data ELS, and the traffic flow specification data TRS, the performance reference value TAW, or the control reference value TCB is altered during or after seeking, the seeking start flag STR is set to [1] or [2] by the seeking start determination program 26, and the process goes to the initialization program 28 from step 27.

Figure 25:
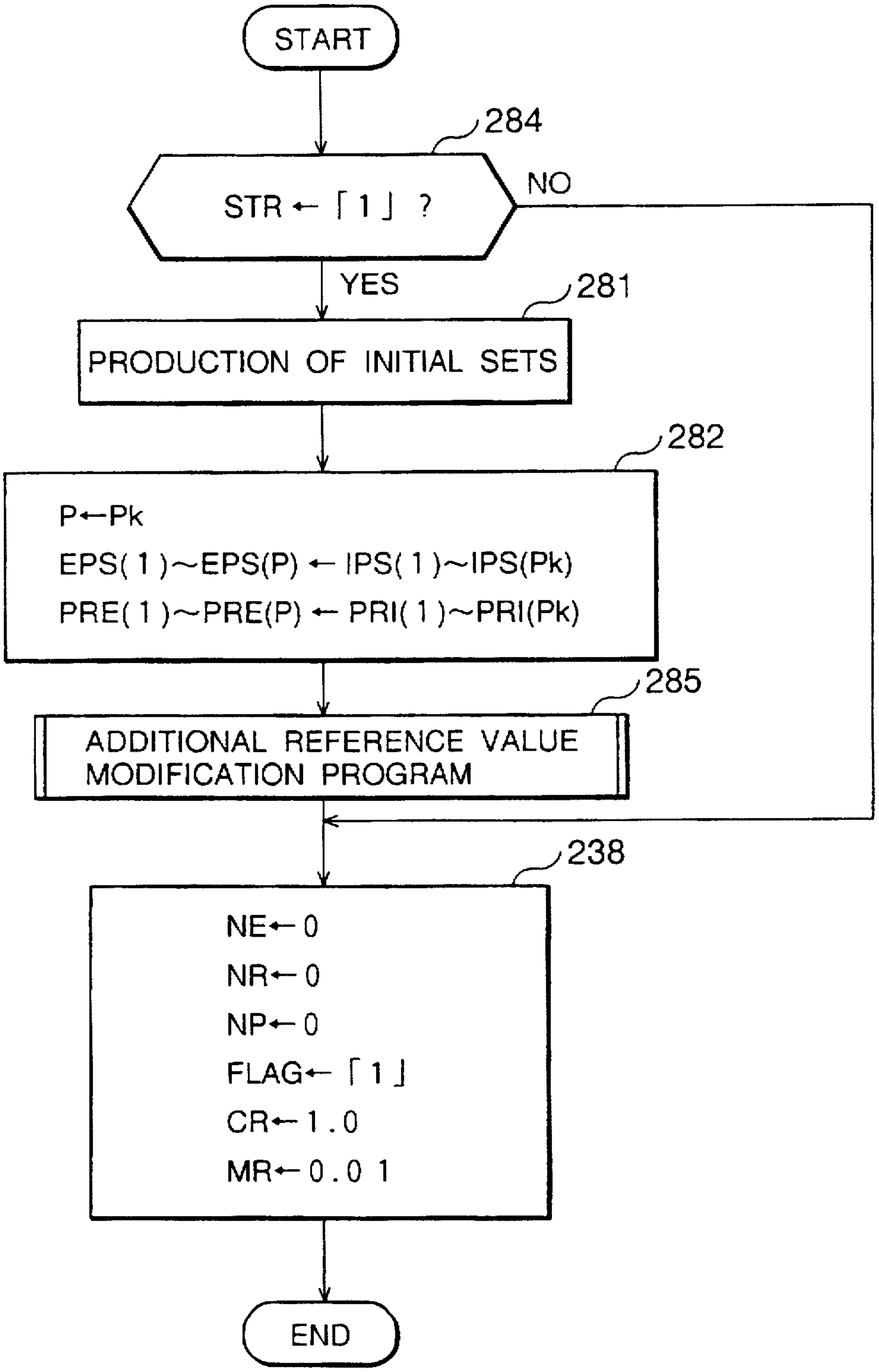
FIG. 25 is a flow chart showing an initialization program for the second embodiment.

FIG. 25 shows the initialization program 28.

FIG. 25 corresponds to FIG. 13 for the first embodiment. Referring to FIG. 25, it is determined whether initialization of the memory is necessary in accordance with the value of the seeking start flag STR at step 284. If the initialization by the first mode is designated, or namely, if the seeking start flag STR is set to [1], the initial set group and the group management performance data which correspond to the traffic flow specification data TRS are read out at step 281 similarly to the initialization program 28 for the first embodiment (see FIG. 13). The initialization is then implemented using the initial set group and the group management performance data at step 282.

At step 285, a modification program for an additional reference value is started. The modification program for an additional reference value at step 285 has the same contents as the program 36 shown in FIG. 23. New additional reference value (BX) and new performance reference value (waiting time target value TAWX) are set at this step 285. The general initialization is then implemented at step 283 as well as the initialization program 28 for the first embodiment (see FIG. 13). This is for the initialization by the first mode.

On the other hand, when the seeking start flag STR is "2" at step 284, or namely, when the initialization by the second mode is designated, only the general initialization at step 283 is implemented. That is, without the operations at steps 281, 282, the set group registered in the memory prior to the start of seeking is used as the initial set group. Specifically, the excellent sets EPS(1) to EPS(P) remaining in the memory 11 when the last seeking was ended and their group management performance data PRE(1) to PRE(P) are used. This is for initialization by the second mode.

As described above, in the second embodiment, the target value TAWX of the mean waiting time and the designated value BX of the additional reference value can be supplied externally by means of the performance reference value setting apparatus 3. Therefore, the optimum set meeting with an expected policy for group management control or seeking can be sought.

In the second embodiment, a change of reference values TGT (the waiting time target value TAW and the additional reference value BX) is detected during seeking or after the end of seeking, so that re-seeking can be implemented. Accordingly, when the control policy for the group management is artificially changed, or when the reference value TGT is artificially changed, re-seeking is automatically implemented, so that the optimum set can be rapidly obtained.

In the second embodiment, the initialization by the first mode or by the second mode can be selected in accordance with circumstances at the time of starting seeking, so that proper initialization is performed. For example, when the additional reference value BX is slightly modified, the re-seeking can be completed quickly by the initialization the second mode. When the additional reference value BX is altered by a large amount, it is, as a matter of course, desirable to apply the initialization by the first mode. On the contrary, in the second embodiment, although when a change of the performance estimation functions (the estimation item, the performance reference value, the structure) is detected, the initialization of the first mode is used, it is possible to use the initialization by the second mode when the change is a small amount.

In brief, mode selection as to initialization by the first or second mode results in a problem as to which of the set group, namely one obtained at that time and one for initialization of GPS0, can realize efficient seeking under new seeking conditions. However, such a determination requires considerable computation time, and is deemed impractical. Therefore, it is desirable to select the mode according to the altered term and amount as described above.

The performance estimation function described above is an example, so that other functions such as the performance estimation function [24], or the first to sixth examples of performance estimation functions, ([25]–[30]) and so forth may be used.

The performance estimation value described above is not only the performance estimation value for additional registration determination but also the performance estimation value for optimum set determination [19], the performance estimation value for deletion determination [21], the performance estimation value for reference value determination [22], or the like.

[Third Embodiment (another embodiment of the deleting unit)]

Based on FIG. 26, another embodiment of the deleting unit 16 is described as follows, and the description is mainly directed to portions which are different from the first embodiment.

Figure 26:
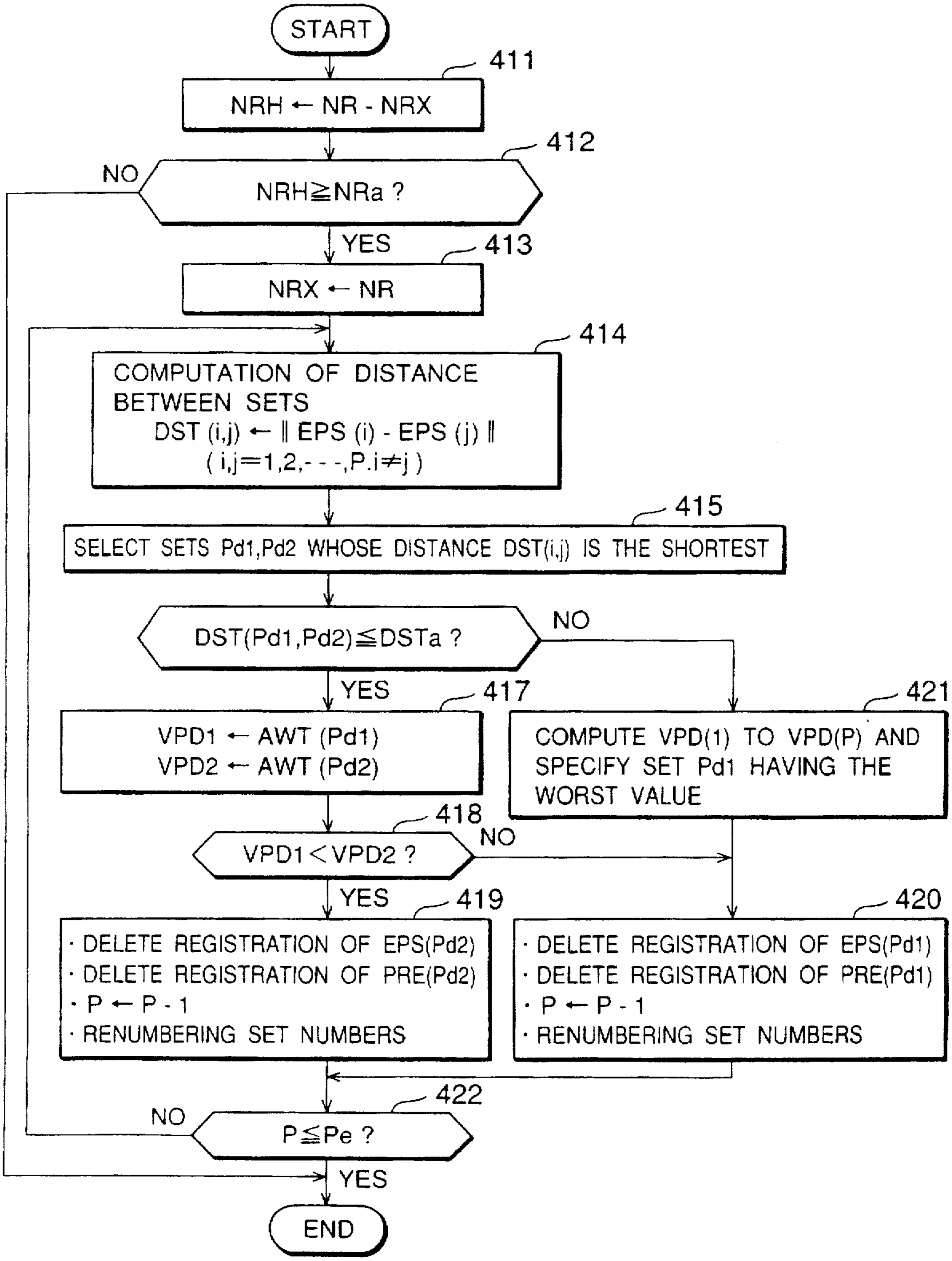
FIG. 26 is a flow chart showing a deletion program for a third embodiment.

FIG. 26 shows the deletion program 35 of the third embodiment. This flow chart corresponds to FIG. 16 for the first embodiment.

First, at step 411, a formula, NRH=NR−NRX, is computed to calculate the number of new registrations NRH. The number of new registration NRH is the number of additional registrations for new sets occurring after the last deletion process. The number of registrations NRX at the time of the last determination is a value indicated from the number of additional registrations NR when the last deletion process is implemented.

Next, at step 412, the number of new registrations NRH and the deletion start determination value NRa are compared to determine whether it is the time for deletion. The deletion start determination value NRa is set, for example, to 10 times.

If NRH<NRa, it is determined that it is not time for deletion of sets, and then the process Immediately exits the program 35. On the other hand, if NRH≧NRa, it is determined that it is time for deletion, and then the value of the number of additional registrations NR at that time is set to the number of registrations at the last determination NRX, thereby renewing it.

The sets are then deleted by repeating steps 414 to 422 until the number of units P reaches the deletion end determination value Pe. The initial value of the NRX is initialized to [0] (not shown) at step 283 of the initialization program 28 (see FIG. 13).

At step 414, distance DST(i,j) between sets is calculated (providing that i, j=1, 2, . . . , P; i≠j). This distance the DST(i,j), the norm about two sets (i, j as described below.

$$DST(i,j)=\|EPU(i)-EPU(j)\| \quad [31]$$

(where: i, j=1, 2, . . . , P; i≠j.)

It is assumed that parameter values of each set EPS(i), (i=1, 2, . . . , P), are normalized with respect to each parameter. That is, each parameter value is expressed as a rate against the possible maximum value taken by each parameter, a value between 0 to 100.

For example, if the possible maximum value taken by the fully occupied state estimation coefficient Ca as one of the parameters is hypothetically 50,000, the normalized value of the parameter value about the fully occupied state estimation coefficient Ca is calculated as 20{=(10,000÷50,000)×100} in the set EPS(1) of FIG. 8. Likewise, when the parameter value of the prediction error coefficient Cb (the maximum value: 1,600) is normalized, it is calculated as (400÷1,600)×100=25.

Consequently, the DST(i,j) will be 0≦DST(i,j)≦500, since there are twenty five control parameters in total. Each normalized parameter value is reconverted into the original value when the optimum set data BPD are produced at step 387 of the optimum set extraction program 38 (see FIG. 20). (For example, in the case of the fully occupied state estimation coefficient Ca, it is reconverted as 20×50,000÷100=10,000.)

At step 415, a set pair Pd1, Pd2 forming the shortest distance DST(i,j) is selected. Then, it is determined at step 416 whether the characteristics of the pair Pd1, Pd2 are alike. That is, the distance DST(Pd1, Pd2) and the determination value DSTa are compared, and the similarity is determined from the result of comparison. The determination value DSTa, is set to for example, twenty five.

If DST(Pd1, Pd2)≦DSTa, the process goes to the step 417, at which the mean waiting time AWT(Pd1), AWT(Pd2) are taken from the group management performance data PRE(Pd1), PRE(Pd2) of the two sets Pd1, Pd2, respectively, and then set as performance estimation values VPD1, VPD2 for deletion.

The performance estimation values VPD1 and VPD2 are compared to decide the set to be deleted at step 418. If VPD1<VPS2, the set of the set number Pd2 is determined to be deleted, and the process goes to step 419. Then, the registrations of the set EPS(Pd2) and the group management performance data PRE(Pd2) are deleted. The value of the number P for units already registered is then decremented by one. The set numbers are re-assigned to the remaining sets and the process at step 419 reaches the end.

If VPD1≧VPD2 at step 418, it is determined that one of the set Pd1 is to be deleted, and then the process goes to step 420. Then, registrations of the set EPS(Pd1) and the group management performance data PRE(Pd1) are deleted. The value of the number P for units already registered is then decremented by one. The remaining sets are renumbered and the process at step 420 reaches the end.

If DST(Pd1, Pd2)>DSTa at step 416, it is determined that the characteristics are not similar, and then the process goes to step 421, at which the performance estimation values VPD(1) to VPD(P) for deletion determination with respect to all unit numbers 1 to P are found to specify the set having the worst value among them and its set number is then set to Pd1. This step 421 is similar to steps 352 to 357 of the deletion program 35 (see FIG. 17) in the first embodiment, so that its description is omitted. The deletion set number RP in FIG. 17 is equivalent to the set number Pd1.

At step 422, it is determined whether the set number P after deletion becomes the deletion end determination value Pe or below. If not, the process repeats steps 414 to 422, and ends the operation of the deletion program 35 when P becomes equal to or less than Pe.

As described above, in this third embodiment, a pair having similar characteristics is specified based on the distance DST between the sets and one set of the pair is deleted, so that plural sets having characteristics different from each other can remain in the memory 11, thereby ensuring variations in the memory 11. When a pair is selected, a pair having the best similarity (shortest distance) takes priority in the selection, so that the plural sets having characteristics as different from each other as possible can remain.

In the third embodiment, when one of the pair is deleted, the set having the better performance estimation value is retained whereas the set having the worse performance estimation value is deleted, so that the group management performance of the plural sets stored in the memory 11 can be maintained at a high level over all. It should be noted that, in this third embodiment, when a similar pair to be deleted does not exist, the set having the worst performance estimation value will be deleted sequentially. Therefore, the unnecessary sets continue to be deleted until the deletion end determination value Pe.

[Fourth Embodiment (another embodiment of seeking end determination)]

Referring to FIG. 19, another embodiment of the seeking end determination unit is described as follows. In this fourth embodiment, portions which are different from the first embodiment are mainly described.

At step 371 in FIG. 19, the number of additional registration times NR is used in lieu of the number of estimation times NE, and the seeking end determination value NRb is used in lieu of the seeking end determination value NEa. Notably, the number of additional registration times NR is set for example, to 200.

That is, if NR<NRb, the seeking permission flag FLAG is set to [1] at step 372 to continue the seeking process, and if NR≧the NRb, the seeking permission flag FLAG is set to [0] at step 373 to end seeking.

Generally, when the number of seeking times NE becomes a large value and when seeking is converged to a certain degree, the ratio of the number of additional registration times to the number of seeking times tends to be lowered. Accordingly, to perform seeking efficiently, it is necessary to determine the end of seeking in consideration with the results from the operation of seeking, namely, the number of sets additionally registered. Therefore, in this fourth embodiment, the seeking process is continued until the number of additional registration times NR representing the number of additional registrations reaches the seeking end determination value NRb.

As described above, according to the fourth embodiment, the system can avoid its seeking process from ending before the seeking process is sufficiently implemented.

[Fifth Embodiment (yet another embodiment of seeking end determination)]

Figure 27:
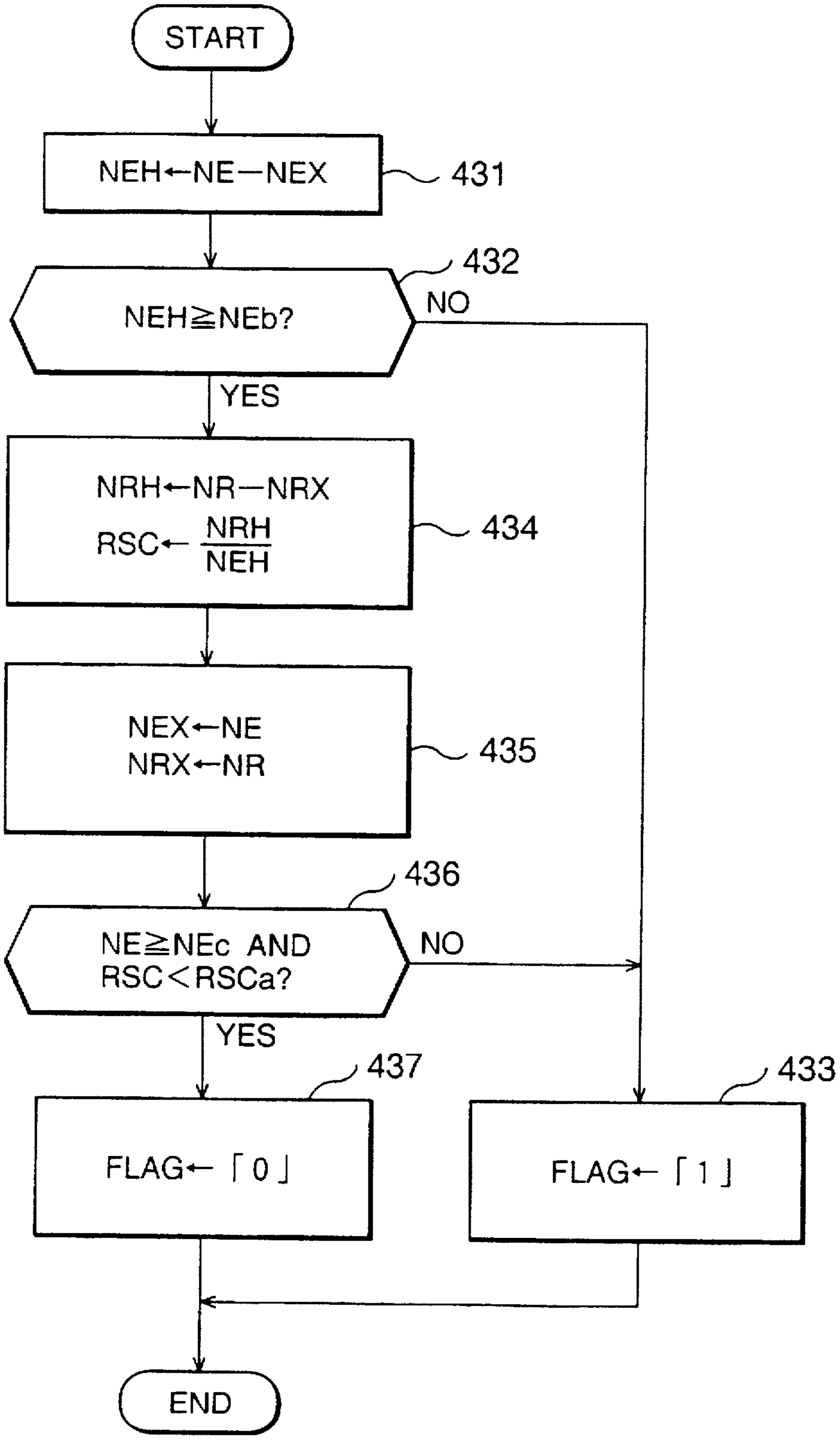
FIG. 27 is a flow chart showing a seeking end determination program for a fifth embodiment.

Referring to FIG. 27, yet another embodiment of the seeking end determination unit is described as follows. In this fifth embodiment, portions which are different from the first embodiment are mainly described.

FIG. 27 shows a seeking end determination program 37 of the fifth embodiment and corresponds to FIG. 19 for the first embodiment.

At step 431, the number of elapsed estimation times NEH is computed from a formula NEH=NE+NEX. The number of elapsed estimation times NEH is the number of new estimations after the last determination of the end. The number of estimation times at the last determination of the end NEX represents the number of estimation times NE at a time that the end is determined in the last cycle. At step 432, it is determined whether the estimations of the number of times is equal to or more than a certain number of times after the last time. If the number of elapsed estimation times NEH is less than a certain value NEb, the seeking permission flag FLAG is set to "1" at step 433 to continue seeking. Notably, the number of elapsed estimation times NEH is set, for example, to 20.

If the number of elapsed estimation times NEH is equal to or greater than the certain value NEb at step 432, the process goes to step 434 and calculates a success index RSC. First of all, the number of new registration times NRH is computed from a formula, NRH=NR−NRX. The number of new registration times NRH indicates the number of times that new sets are additionally registered after the last end determination is performed. The success index is then calculated from a formula, RSC=NRH+NEH. The number of registration times at the last determination NRX represents a value of the number of additional registration times NR counted when the end determination had been performed in the last cycle.

At next step 435, the number of estimation times at the last determination NEX and the number of registration times at the last determination NRX are renewed based on the number of estimation times NE and the number of additional registration times NR at that time. At step 436, based on the number of estimation times NE, a seeking final stage determination value NEc, the success index RSC, and the seeking end determination value RSCa, it is determined whether to end seeking. The seeking final stage determination value NEc is set, for example, to 600. The seeking end determination value RSCa is set, for example, to 0.05.

If NE<NEc or if RSC≧RSCa, it is determined that seeking has not yet been sufficiently completed, and the seeking permission flag FLAG is set to [1] to continue seeking at step 433. If NE≧NEc and if RSC<RSCa, it is determined that seeking has been sufficiently completed, and at step 437 the seeking permission flag FLAG is set to [0] to stop seeking.

It should be noted that the reason that step 436 includes the condition regarding the number of estimation times NE is to prevent the seeking process from ending without a sufficient number of estimation times due to the lowered success index RSC, which may be caused from, at the initial stage of seeking, sizes of the initial set GPS0, the crossover rate CR, and the mutation rate MR. If such a problem is not raised, the condition regarding the number of estimation times NE would be unnecessary for the determination condition of seeking end, and, thereby, even the condition regarding the success index RSC would be sufficientse.

As described above, in the fifth embodiment, the seeking end is determined from the success index RSC founded on the number of estimation times and the number of additional registration times, so that whether seeking is sufficiently converged is determined with high accuracy. Therefore, it is unnecessary to repeat seeking pointlessly, so that the optimum set can be efficiently sought.

In addition, in the fifth embodiment, the initial stage of seeking is detected by the number of estimation times NE, and during this initial stage the seeking process does not end even if the success index RSC becomes less than the seeking end determination value RSCa, so that the seeking process will not end without a sufficient number of estimation times.

[Sixth Embodiment (another embodiment of seeking end determination)]

Figure 28:
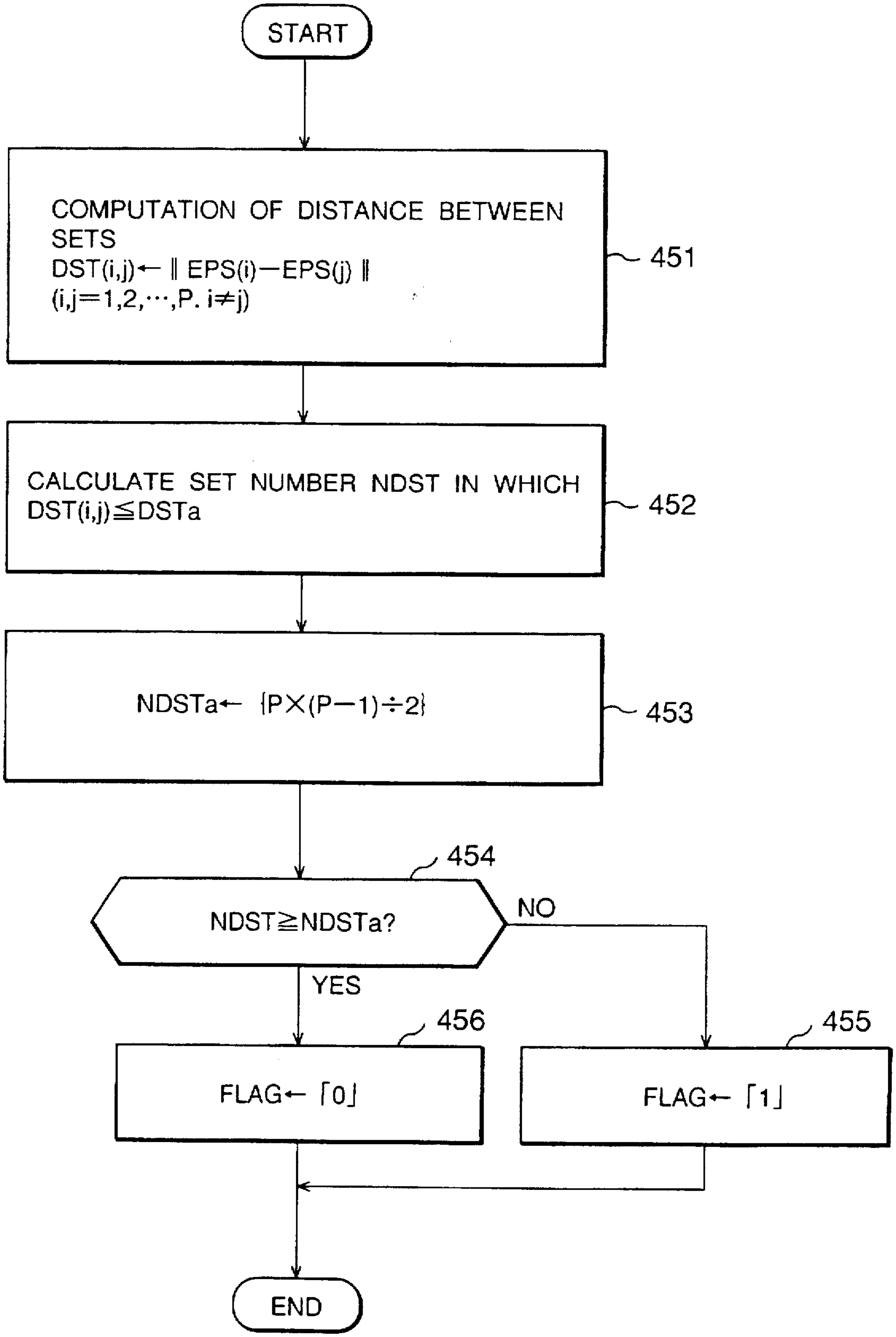
FIG. 28 is a flow chart showing a seeking end determination program for a sixth embodiment.

Referring to FIG. 28, another embodiment of the seeking end determination unit 17 is described as follows. In this sixth embodiment, portions which are different from the first embodiment are mainly described.

FIG. 28 shows a seeking end determination program 37 of the sixth embodiment and corresponds to FIG. 19 for the first embodiment.

At step 451, the distance DST(i,j) between sets is computed. The distance DST(i,j) is computed in compliance with the formula [31] described above. It is to be noted that this computation is almost the same as at step 414 of the deletion program 35 in the third embodiment.

At step 452, the similar set number NDST, or the number of set whose DST(i,j)≦DSTa, is counted based on the computed distance DST(i,j) above. The DSTa is a determination value for determining whether the sets are similar, and in this sixth embodiment it is set to twenty five as in the third embodiment. The seeking end determination value NDSTa is calculated at next step 453. Generally, when seeking is converging, there is a tendency for many sets to get concentrated around the optimum set. The similar set number NDST is used as one index to detect such a tendency, and the convergence of seeking is determined from a ratio of the similar set number NDST to the entire number of set combinations. If the threshold of the determination against the ratio is set to 80%, the seeking end determination value NDSTa is computed from NDSTa={P×(P−1)+2}×0.8 because when the number of sets already registered is P, the entire number of combinations becomes {P×(P−1)−2}.

At that time, if the number of sets additionally registered reaches the maximum value Pmax, though the unnecessary sets will be deleted under a certain reference, the similar set number NDST varies depending on how the unnecessary sets are deleted. Similarly, the similar set number NDST may vary depending on the methods for producing sets or for additional registration. Accordingly, the determination threshold is not restricted to 80%, and has to be properly modified based on other elements.

It is thus determined whether seeking is to be ended at step 454 based on the similar set number NDST and the seeking end determination value NDSTa. If NDST<NDSTa, it is determined that seeking has not yet been sufficiently completed; the seeking permission flag FLAG is set to [1] to continue seeking at step 455; and the operation of the seeking end determination program 37 is ended. If NDST≧NDSTa, it is determined that seeking has been sufficiently carried out; at step 456 the seeking permission flag FLAG is set to [0] to stop seeking; and the operation of the seeking end determination program 37 is ended.

As described above, in the sixth embodiment, the seeking end is determined from the distance DST between the sets, so that the convergence of seeking is detected with high accuracy. Therefore, it is unnecessary to pointlessly repeat seeking, so that the seeking process can be efficiently implemented. The seeking end determination conditions are not restricted to those described above, and other conditions can be used.

[Seventh Embodiment (another embodiment of extraction of the optimum set)]

Figure 29:
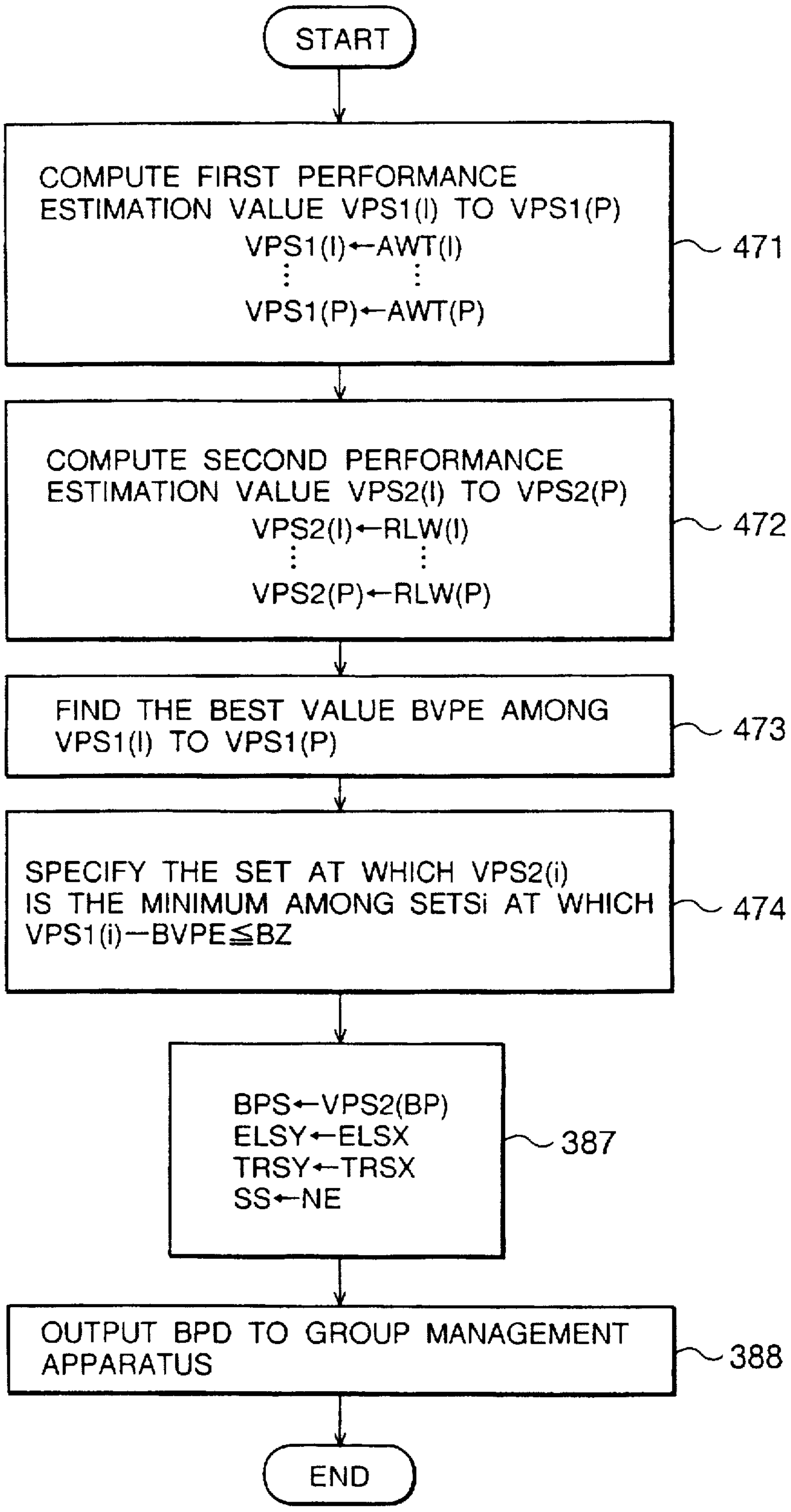
FIG. 29 is a flow chart showing an optimum value extraction program for a seventh embodiment.

Referring to FIG. 29, another embodiment of the extractor 20 is described as follows. In this seventh embodiment, the different portions from the first embodiment are mainly described.

FIG. 29 shows an optimum set extraction program 38 of the seventh embodiment and corresponds to FIG. 20 for the first embodiment.

At step 471, the mean waiting times AWT(1) to AWT(P) are taken out of the group management performance data PRE(1) to PRE(P), respectively, and then set as first performance estimation values VPS1(1) to VPS1(P). At step 472, the long waiting times RLW(1) to RLW(P) are taken out of the group management performance data PRE(1) to PRE(P), respectively, and then set as second performance estimation values VPS2(1) to VPS2(P). At step 473, the minimum value of the first performance estimation values VPS1(1) to VPS1(P) is found and set as the best value BVPE.

At step 474, the optimum set BP is selected based on the performance estimation values. That is, plural sets i at which the value (VPS1(i)−BVPE) is equal to or less than the BZ, are found from the memory 11. Then, the set having the smallest second reference estimation value VPS2(i) among them is selected as the optimum set BP. That is, a two step selection is performed. BZ is a reference value showing an allowable range from the best value BVPE and is set to two seconds in this embodiment.

Optimum set data BPD are then produced in a similar manner to that of the first embodiment, and at the next step 388 the optimum set data BPD are delivered to the group management apparatus 1.

As described above, in the seventh embodiment, the two step selection is used for extraction of the optimum set. Where some priorities have been determined in the two estimation terms, the extraction of the optimum set according to such priorities can be realized since the two step selection is applied to the extraction. It is a matter of course that three or more step selections are applied. The seventh embodiment is equivalent in meaning to the contents of the sixth performance estimation function [30] described above.

[Eighth Embodiment (another calculation method for group management performance value)]

As described in Japanese Unexamined Patent Publication (KOKAI) No. Showa 57-57,168, the group management performance of new sets can be obtained using an actual group management apparatus 1 in lieu of the simulator 2 in the first embodiment. This is described referring to FIGS. 30 and 31.

Figure 30:
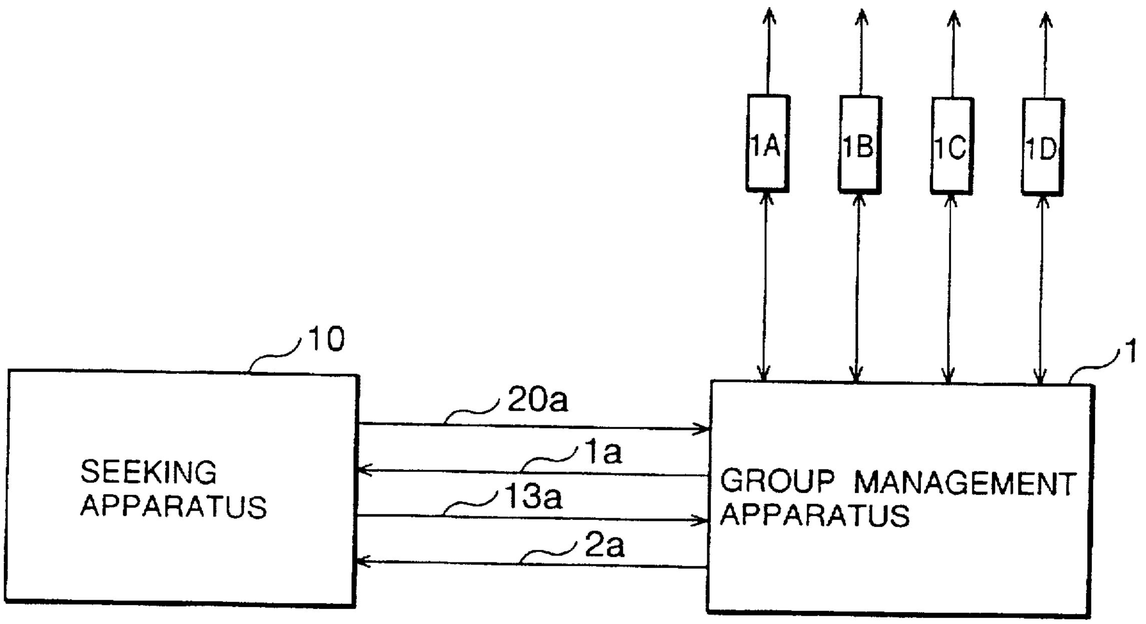
FIG. 30 is a block diagram showing an eighth embodiment.
Figure 31:
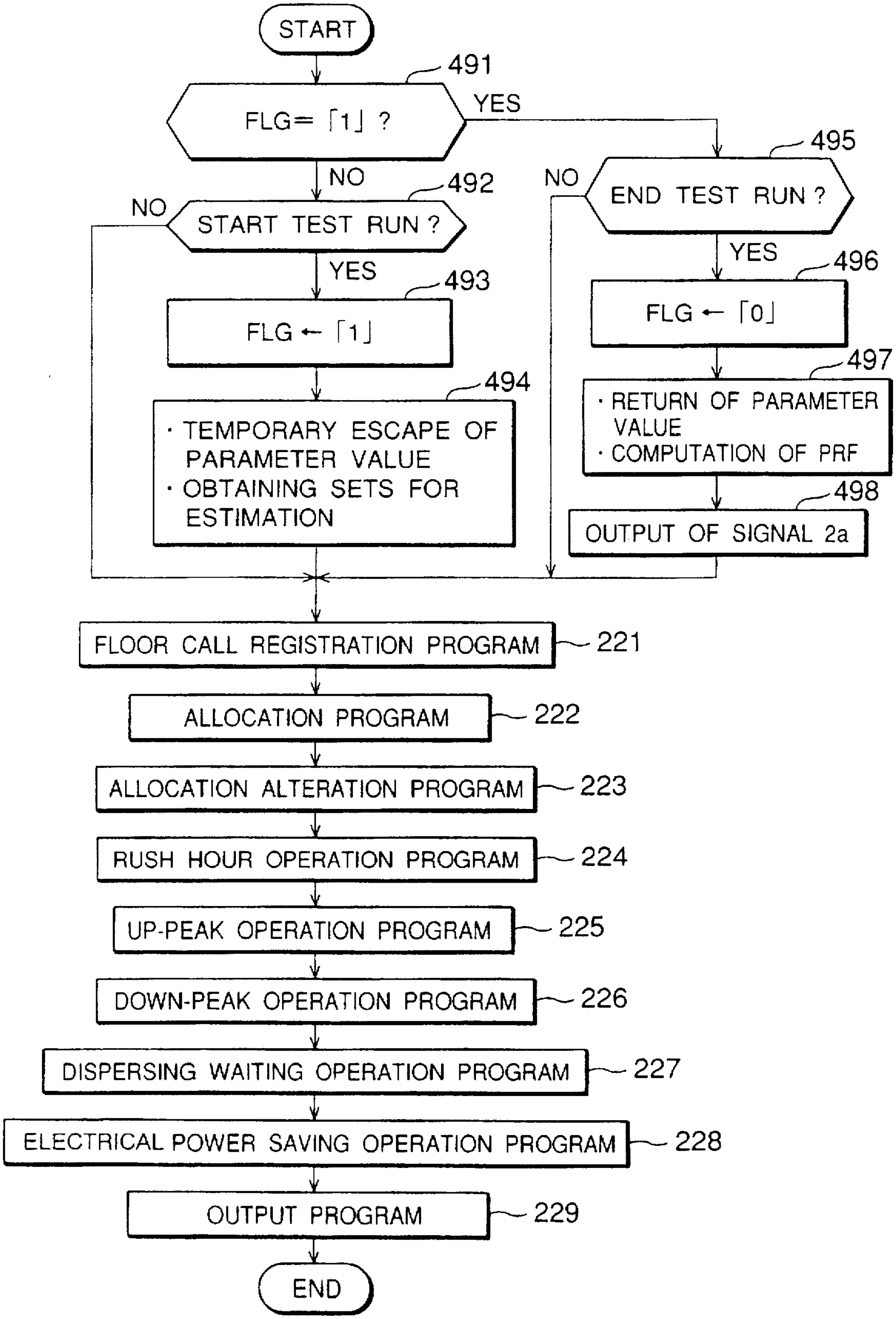
FIG. 31 is a flow chart showing a seeking main program for the eighth embodiment.

FIG. 30 is a diagram showing a system of this eighth embodiment and corresponds to FIG. 1 for the first embodiment. FIG. 31 is a diagram showing operation of the group management apparatus 1 and corresponds to FIG. 9 for the first embodiment. The eighth embodiment is described as follows in which the portions which are different from the first embodiment are mainly described.

Referring to FIG. 30, when seeking is commanded upon the input of the seeking condition signal 1*a* from the group management apparatus 1 to the seeking apparatus 10, the seeking apparatus 10 executes the estimation program (see FIG. 15) at step 33 in the operation program, produces simulation condition data similarly to that of the first embodiment, and outputs the simulation condition signal 13*a*.

However, as shown in FIG. 30, the signal 13a is fed to the group management apparatus 1 in this embodiment. The group management apparatus i enters a test run mode upon receiving the signal 13a. This operation is described in detail as follows using a flow chart in FIG. 31.

In FIG. 31, it is determined at step 491 whether it is a test run, and it is determined at step 492 whether to start the test run. When a test run flag FLG is "0" and when the signal 13a contains no designation of the start of the test run, a regular group management operation is executed in compliance with steps 221 to 229.

On the other hand, when the start of the test run mode is detected from the contents of the signal 13a at step 492, the test run flag FLG is set to |1| at step 493, and the parameter value sets currently used temporarily escape at step 494. The sets for estimation (new sets) NPSX contained in the signal 13a are written therein in lieu of those escaping.

Then, in the regular group management operation, the group management operation is carried out with steps 221 to 229. During the test run, the group management operation is carried out with steps 221 to 229 by way of steps 491 to 495 after the test run flag FLG is [1].

While the group management operation is thus carried out for a certain period of time (for example, one hour), the group management apparatus 1 detects the end of the test run at step 495, resets the test run flag FLG to |0| at step 496, brings back the parameter sets that had been escaped at step 497, and, at the same time, computes the group management performance data PRF (such as the mean waiting time, and the long waiting time) regarding the test run. At step 498, the group management performance data PRF is fed to the seeking apparatus 10 as the group management performance value signal 2a. Then, the group management apparatus 1 returns to a normal state and performs the group management operation through step 221 to 229.

As described above, when the group management performance value signal 2a through the test run is obtained, the seeking apparatus 10 shown in FIG. 30 obtains the performance estimation value VPN based on the group management performance value signal 2a, and compares the performance estimation value VPN with the estimation reference value BX to determine whether the new sets are additionally registered.

As described above, in this eighth embodiment, the estimation of the new sets is made at the actual apparatus, so that, although it is unfavorable because the period of time to obtain the optimum set tends to become longer, the simulator 2 becomes unnecessary, thereby making the system inexpensive.

[Ninth Embodiment (another embodiment for production of new sets)]

Although in the first embodiment the crossover rate CR and the mutation rate MR are fixed, it is the feature of the ninth embodiment that the crossover rate CR and the mutation rate MR are modified according to the circumstances of seeking.

Figure 32:
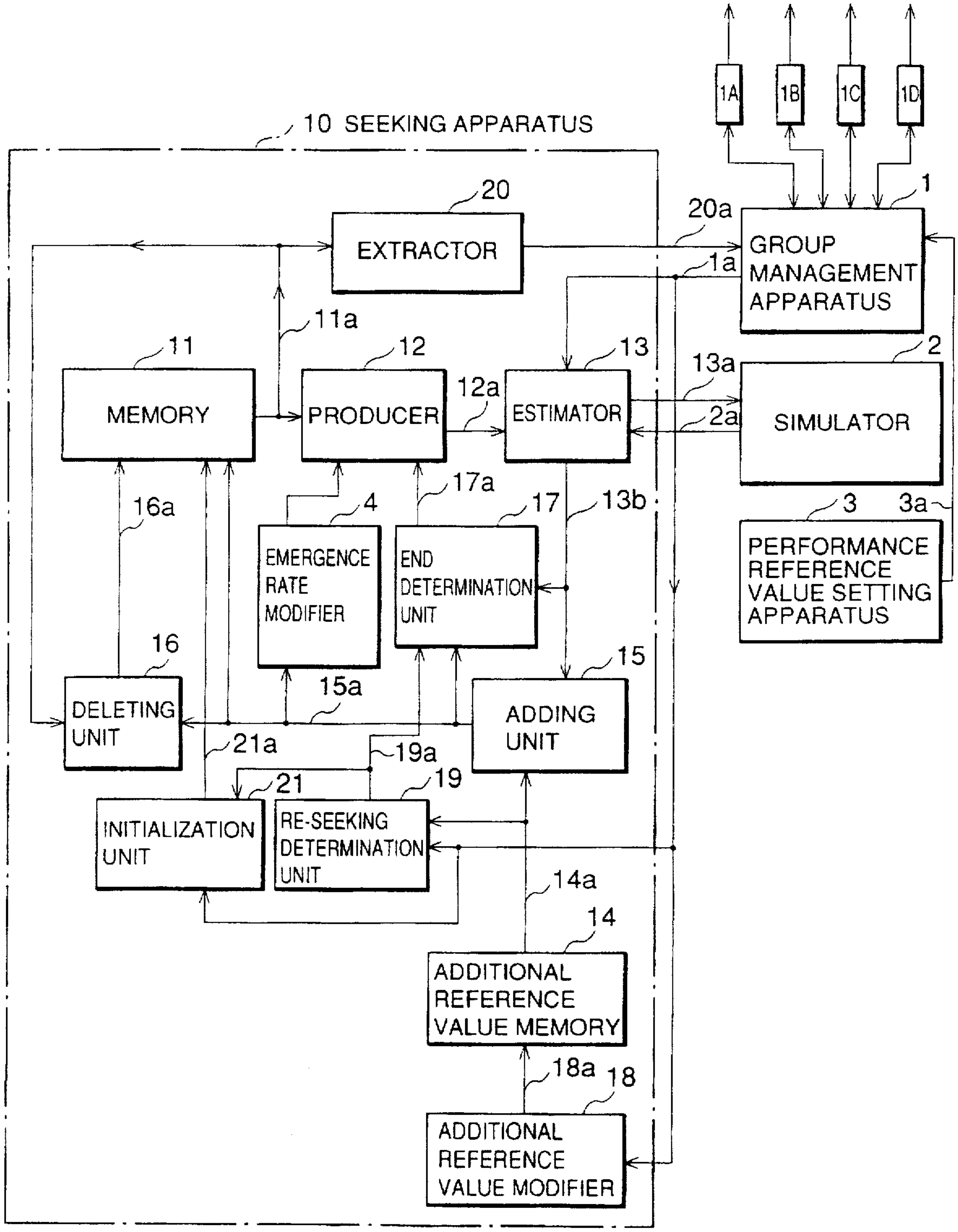
FIG. 32 is a block diagram showing a ninth embodiment.
Figure 33:
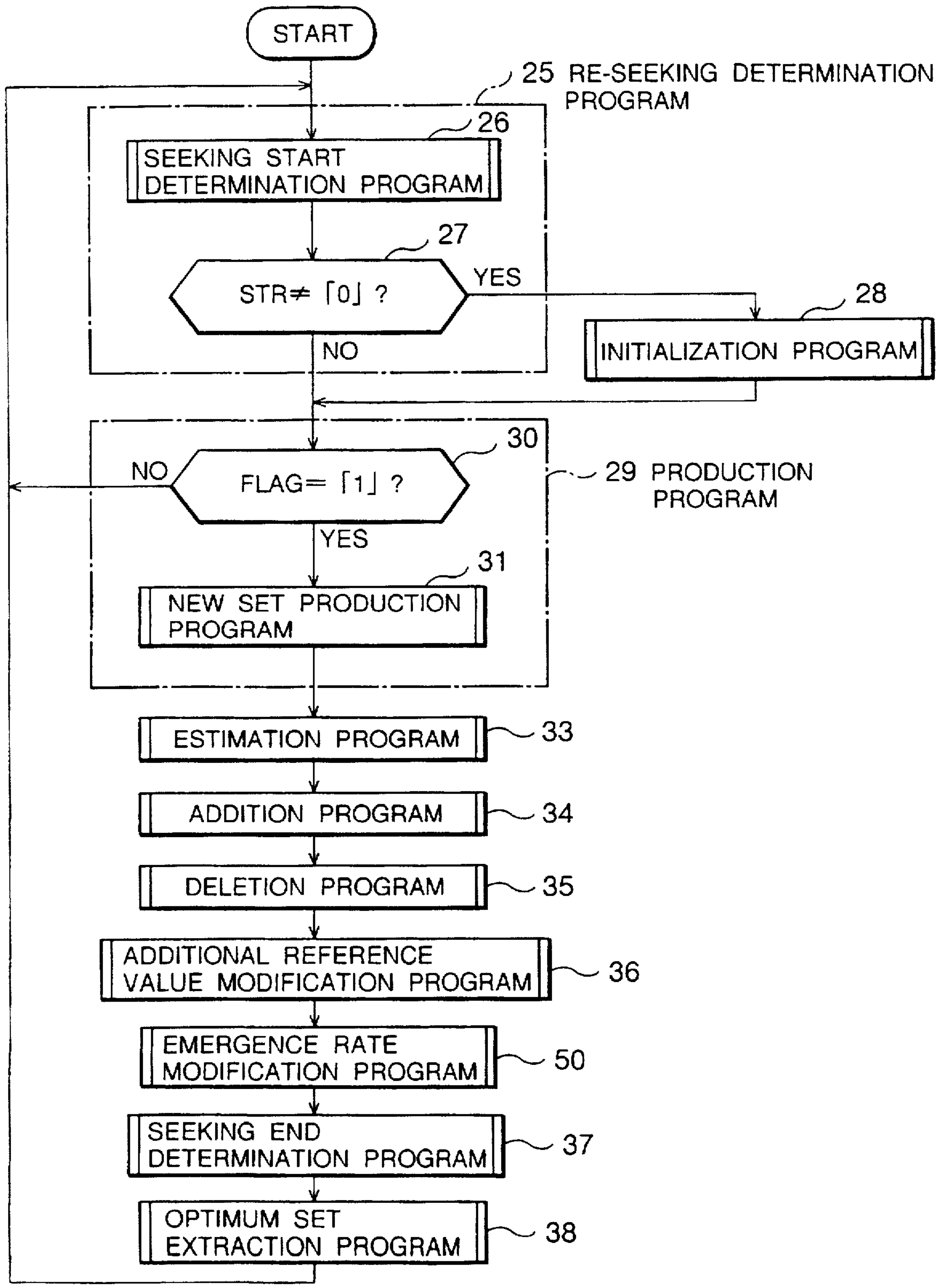
FIG. 33 is a flow chart showing a seeking main program for the ninth embodiment.
Figure 34:
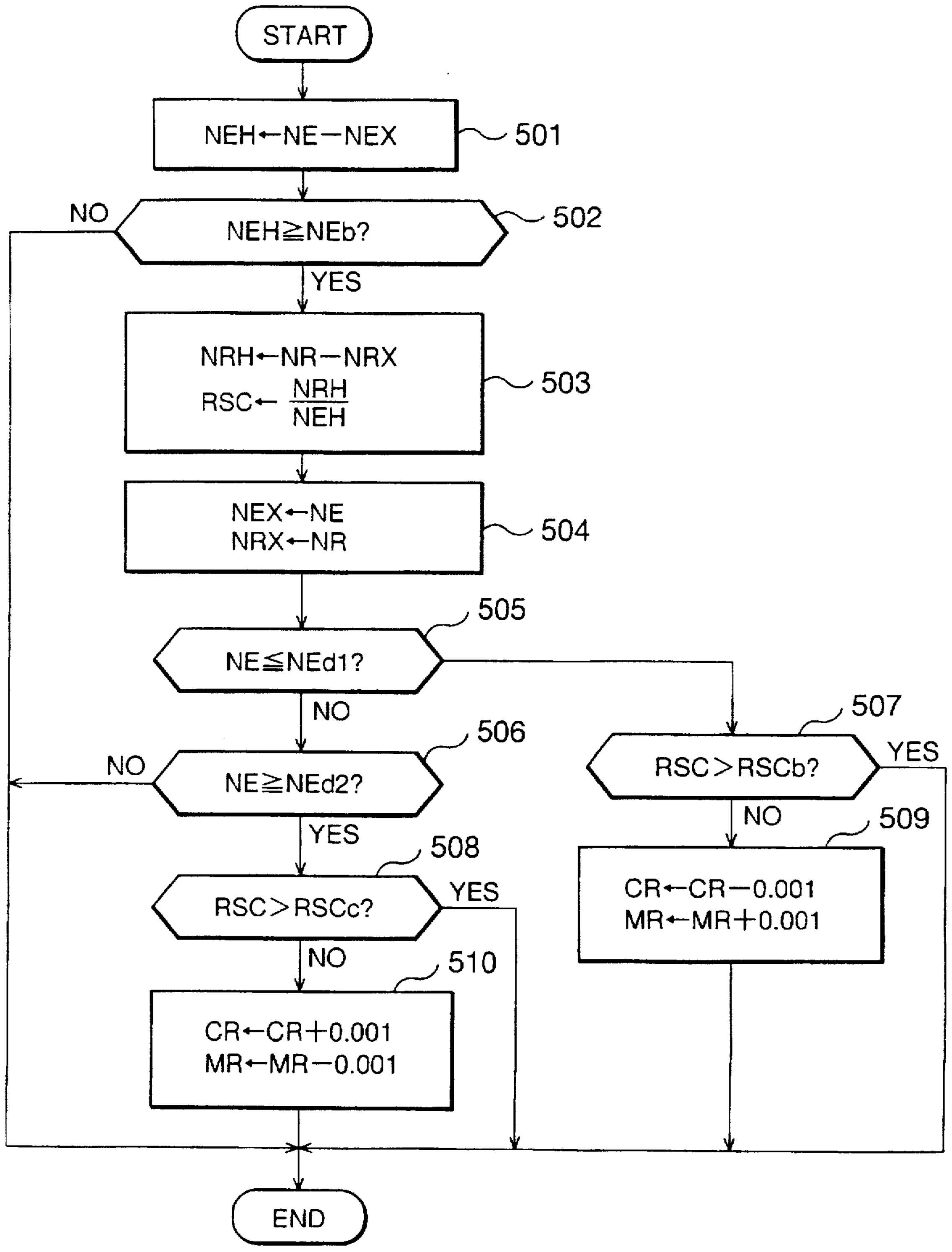
FIG. 34 is a flow chart showing an emergence rate modification program for the ninth embodiment.

Referring to FIGS. 32 to 34, this embodiment will be described. The portions which are different from the first or second embodiment will be described mainly.

FIG. 32 shows an over all structure of a ninth embodiment and corresponds to FIG. 1 of the first embodiment. In FIG. 32, an emergence rate modifier 4 modifies the crossover rate CR and the mutation rate MR (selection rates of respective production methods) in accordance with the circumstances of seeking.

FIG. 33 is a diagram showing an operation program of the ninth embodiment, and corresponds to FIG. 11 for the first embodiment. If should be noted that, this is the same as the operation program 100 shown in FIG. 11 except that an emergence rate modification program, corresponding to the function of the emergence rate modifier 4 shown in FIG. 32, is added at step 50.

FIG. 34 is a diagram showing the emergence rate modification program. At step 501, the number of elapsed estimation times NEH, which indicates the number of times of estimations newly conducted after the last end determination, is computed from a formula, NEH=NE−NEX. The same value of the number of estimation times NE at the time that the last end determination was performed in the previous cycle is set to the number of estimation times at the last determination NEX. At step 502, it is determined whether estimations have been made a certain number of times or more since the previous cycle. If the number of elapsed estimation times NEH is less than a certain value NEb (for example, 20 times), this emergence rate modification program is ended.

On the other hand, If the number of times of elapsed estimation NEH is equal to or greater than a certain value NEb at step 502, the process goes to step 503, at which the success index RSC is calculated.

First of all, the number of times at which registration NRH representing the number of times new sets have been additionally registered since the last end determination is calculated from a formula, NRH=NR−NRX. The success index RSC is calculated from a formula, RSC=NRH÷NEH. The same number of times of additional registration NR at the time that the last end determination is performed in the previous cycle is set to the number of times of registration at the last determination NRX. At next step 504, the number of times of estimation at the last determination NEX and the number of times of registration at the last determination NRX are renewed based on the number of times of estimation NE and the number of times of additional registration NR at the current time.

At steps 505 to 510, the crossover rate CR and the mutation rate MR are modified based on the number of times of estimation NE, a first determination value NEd1, a second determination value NEd2, the success index RSC, a success rate determination value RSCb, and a success rate determination value RSCc. For example, NEd1=500; NEd2=800; RSCb=0.10; RSCc=0.05.

If NE≦NEd1 and if RSC≦RSCb, or if the success index is in a lower state than an expected value during a first half of seeking, it is determined that the crossover rate CR and the mutation rate MR currently set are improper, and the process goes to steps 505, 507, 509, thereby reducing the crossover rate CR a slightly (for example, by 0.001) from the current value and increasing the mutation rate MR slightly (for example, by 0.001) from the current value. Furthermore, at step 509, in a manner opposite to the modification above, the crossover rate CR can be set to be slightly larger (for example, 0.001) than the current value, and the mutation rate MR can be set to be slightly smaller (for example, 0.001) than the current value.

Either method can be basically applied to clear such a depressed success index. That is, if the crossover rate is too large to be used, the crossover rate CR is made smaller, and the mutation rate MR is made larger. On the contrary, if the crossover rate is too small to be used, the crossover rate CR is made larger, and the mutation rate MR is made smaller. In conclusion, if seeking is in a depressed state, the ratio of selection probability of each production method is changed to clear such a depressed state.

If NE≧NEd2 and if RSC≦RSCc, or if the success index is in a lower state than an expected value during the last stage of seeking, it is determined that seeking of excellent sets tends to be converging, and the process goes to steps 505, 506, 508, 510, in this order, thereby increasing the crossover rate CR slightly (for example, by 0.001) from the current value and reducing the mutation rate MR slightly (for example, 0.001) from the current value.

If the conditions above are not satisfied, it is determined that the crossover rate CR and the mutation rate MR currently set are proper, and the emergence rate modification program is ended without modifications to those rates.

As described above, in this ninth embodiment, the proceeding degree of seeking is determined based on the number of estimation times NE and the success index RSC, and according to the determination, the crossover rate CR and the mutation rate MR can be modified. Therefore, excellent sets can be discovered early, in comparison with the system having the fixed crossover rate CR and the fixed mutation rate MR, and seeking time can be made shorter. As a result, the system can improve seeking efficiency.

In the ninth embodiment, in particular, if the success index becomes lower than an expected value during the initial stage (or the first half) of seeking, the process sets the crossover rate CR to a lower value than its current value and the mutation rate MR to a higher value than its current value, so that while weighting in a broad seeking process carried out by mutation, the system can improve the possibility of producing sets having more excellent group management performance. The system can also clear a depressed seeking state.

Furthermore, in the ninth embodiment, if the success index becomes lower than an expected value during the last stage (or the second half) of seeking, the process sets the crossover rate CR to a higher value than its current value and the mutation rate MR to a lower value than its current value, so that while weighting on a localized seeking process the system can make the seeking process converge early. The system can also clear a depressed seeking state.

[Tenth Embodiment (another embodiment of emergence rate modification)]

Figure 35:
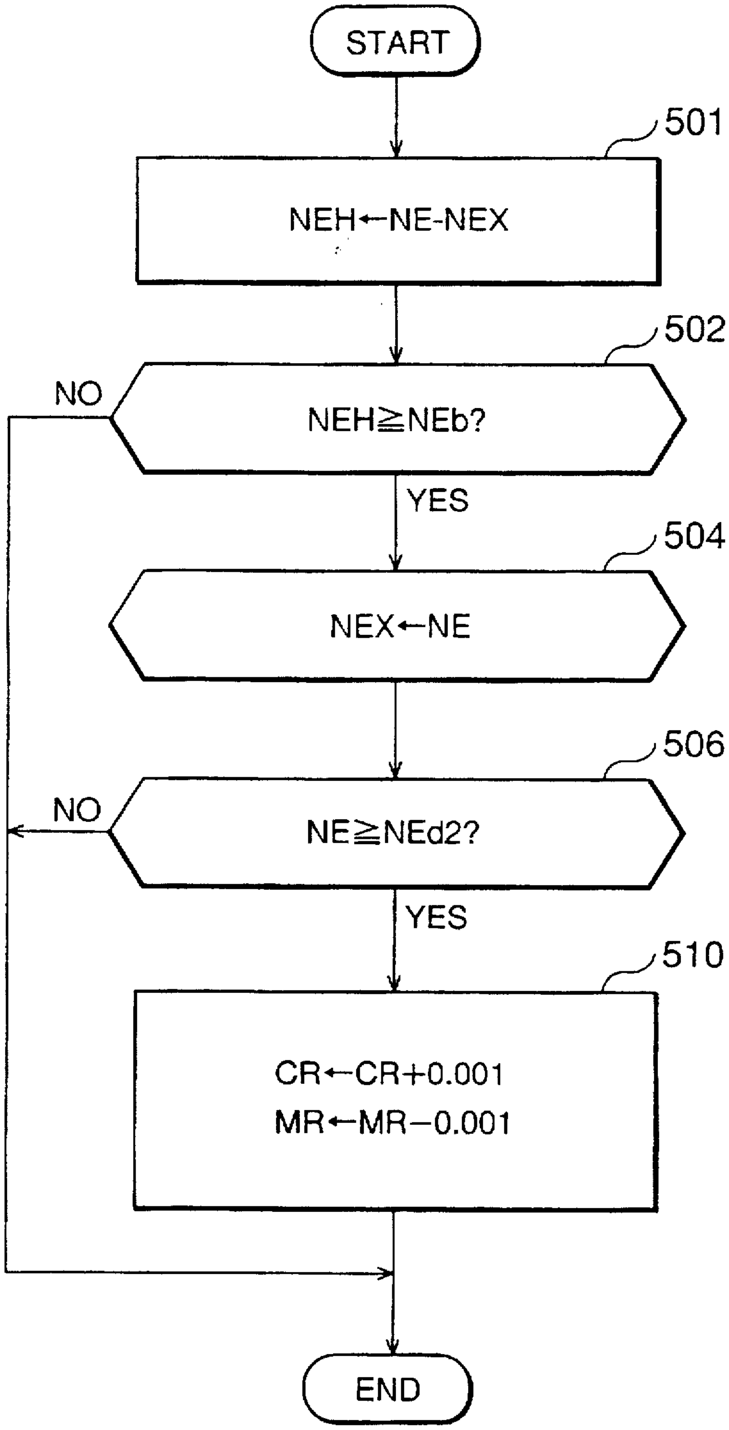
FIG. 35 is a flow chart showing an emergence rate modification program for the tenth embodiment.

Referring to FIG. 35, another embodiment of the emergence rate modifier 4 is described. FIG. 35 is a diagram showing an emergence rate modification program, which is a program partly modified by the emergence rate modification program (see FIG. 34) in the ninth embodiment.

In FIG. 35, it is determined at step 502 whether a certain number of estimation times NEb (for example, 40 times) has been reached. At step 506, it is determined whether it is in the final stage of seeking (or, whether NE≧the NEd2). Finally, at step 510, the crossover rate CR is set to be slightly larger (for example, 0.001) than the current value and the mutation rate MR is set to be slightly smaller (for example, 0.001) than the current value. Therefore, in the final stage of seeking, the crossover rate CR becomes gradually larger as the seeking process proceeds, and in contrast, the mutation rate MR becomes gradually smaller. The operation, except the one described above, is entirely the same as that in the ninth embodiment.

As described above, in the tenth embodiment, since as the seeking process proceeds the system switches from production weighting mutation to production mainly relying on crossover, the system can maintain the variations of the group management performance during the initial stage (first half) of seeking and can make the seeking process converge early during the final stage (second half). As a result, the sets having more excellent group management performance can be efficiently sought.

[Eleventh Embodiment (another embodiment of crossover pair selection)]

Referring to FIGS. 36 to 39, an eleventh embodiment is described, be explaining mainly the portions which are different portions from the first or second embodiment.

Figure 36:
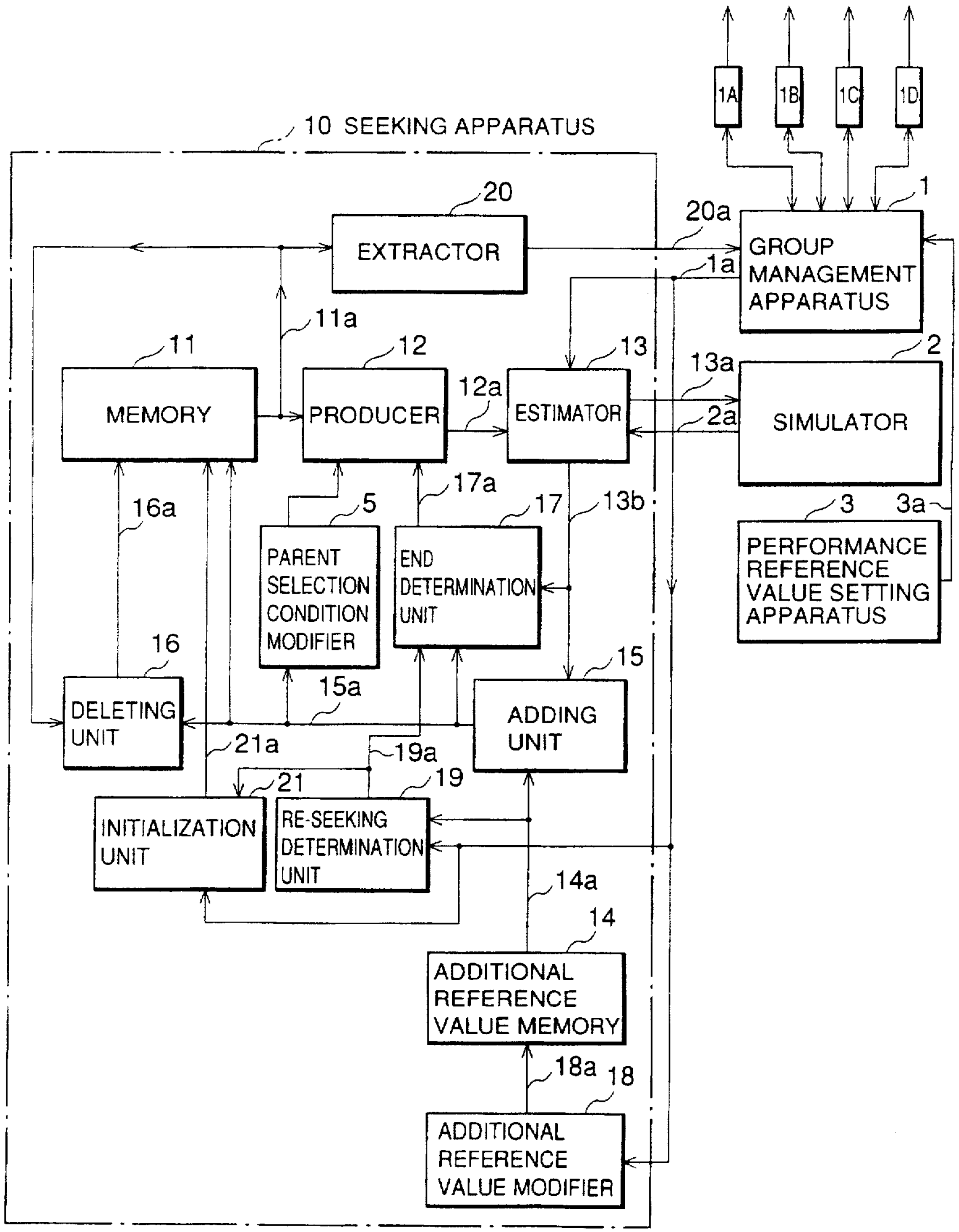
FIG. 36 is a block diagram showing an eleventh embodiment.

FIG. 36 shows a system of the eleventh embodiment. In this embodiment, as conditions to select pairs of sets (crossover pairs) for objects of the crossover, distances between sets are used. Moreover, in this embodiment, the system is constituted so as to be able to modify the conditions on the distance between sets (hereinafter called, "distance condition"). A parent selection condition modifier 5 shown in FIG. 36 is to modify the distance condition in accordance with the circumstances of seeking.

Figure 37:
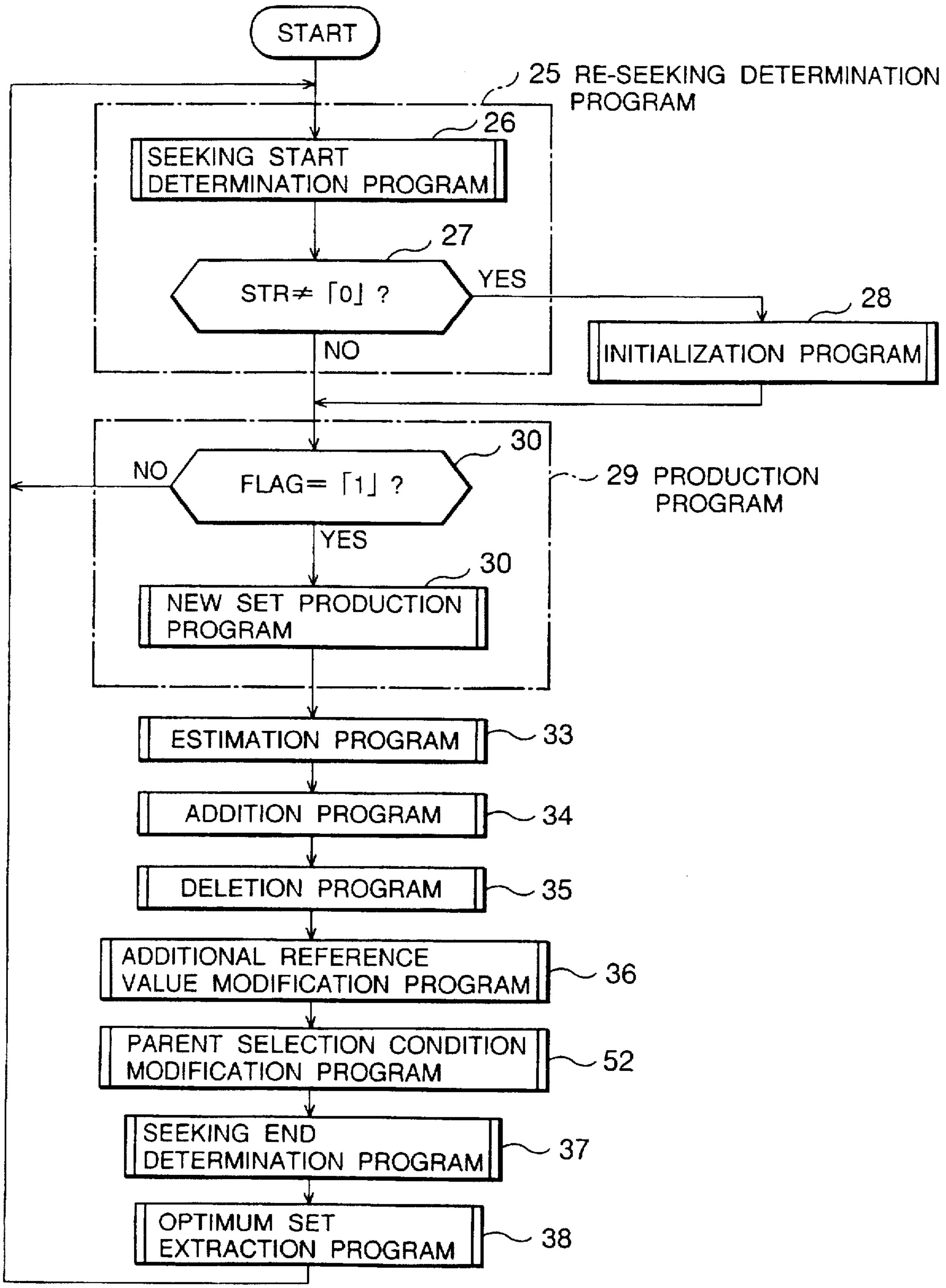
FIG. 37 is a flow chart showing an operation main program for the eleventh embodiment.

FIG. 37 is a diagram showing an operation program of the eleventh embodiment and corresponds to FIG. 11 for the first embodiment. In FIG. 37, at step 31, new sets are produced. Though the operation for such production is as described using FIG. 14 for the first embodiment, this embodiment is different from the first embodiment with respect to the process for selection of crossover pairs PS1, PS2 (step 317). A parent selection condition modification program, corresponding to the parent selection condition modifier 5 (see FIG. 36), is added to step 52, thereby modifying the distance conditions described above. The rest of the structure of this embodiment is constructed in the same manner as that of the first embodiment.

Figure 38:
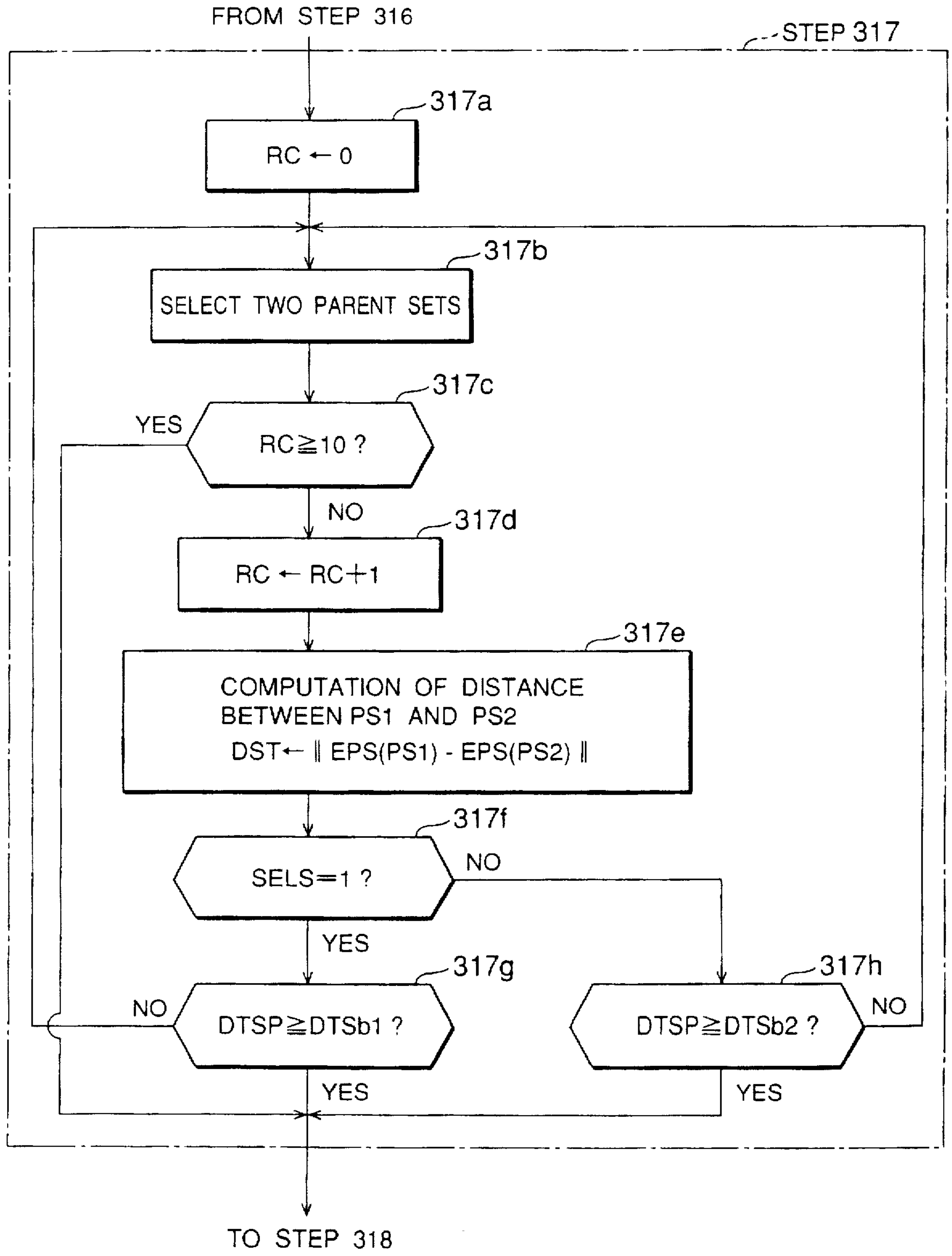
FIG. 38 is a flow chart showing a part of a new set production program for the eleventh embodiment.

FIG. 38 is a diagram showing operation at step 317 contained in the new set production program 31 (see FIG. 14). At step **317*a* in FIG. 38**, the value of the counter RC is initialized to [0]. The counter RC counts the number of selection times of pairs using the distance condition between sets in this embodiment. The distance between sets is calculated from the formula [31].

At the next step **317*b*, where the system weights the selection probability based on the size of performance estimation values, two sets PS1, PS2 forming a pair are randomly selected. It is determined at the next step 317*c*** whether the set selection using the distance condition is performed a certain number of times or more (for example, ten times).

If two sets PS1, PS2 satisfying the distance condition cannot be selected even by repeating steps **317*d* to 317*h* a certain number of times or more, two sets PS1, PS2 selected at step 317*b*** are determined as the pair for the crossover.

On the other hand, when the number of times of the set selection in use for the distance condition is less than the certain number of times (RC<10), the process goes to step **317*c* and then to 317*d* and increases the value of the counter RC by one. At step 317*e*, the distance DST between two sets PS1, PS2 selected at step 317*e*** is computed. That is, as well as the formula [31], $$DST=\|EST(PS1)-EPS(PS2)\|$$

is computed. Each parameter value is normalized to a numerical value between 0 and 100 as described above. At step **317*e*, if the distance DST is computed, it is determined at steps 317*f* through 317*h*** whether the distance DST satisfies the distance condition as one of the selection conditions for the crossover pair.

If the condition selection flag SELS is set to [1] and if a first selection condition is designated as the distance condition, the process goes to steps **317*f*, 317*g*, at which it is determined whether the distance DST is equal to or greater than a first selection reference value DSTb1. If DST<DSTb1, the two sets PS1, PS2 satisfying the distance condition are discarded, and the process returns to step 317*b*** again to repeat the same process from the beginning.

On the other hand, if the condition selection flag SELS is set to [2] and if a second selection condition is designated as the distance condition, as well as described above, it is determined at step **317*h* whether the distance DST is equal to or less than a second selection reference value DSTb2. If DST>DSTb2, it is determined that the selection condition is dissatisfied, and the process goes to step 317*b*** to restart from the beginning.

The operations at steps **317*b* to 317*h* are thus repeated until the distance condition is met a certain number of times (10 times) or until two sets satisfying the distance condition are found. If the two sets meeting with DST≧DSTb1 or with DST≦DSTb2 are produced, these two sets are made to be the regular crossover pair PS1, PS2, and the process goes to step 318. The steps subsequent to step 318** are the same as those in the first embodiment.

As described above, the system can select the crossover pair using the distance condition. The distance condition is modified by the selection condition modification program 52 in accordance with the circumstances of seeking.

Figure 39:
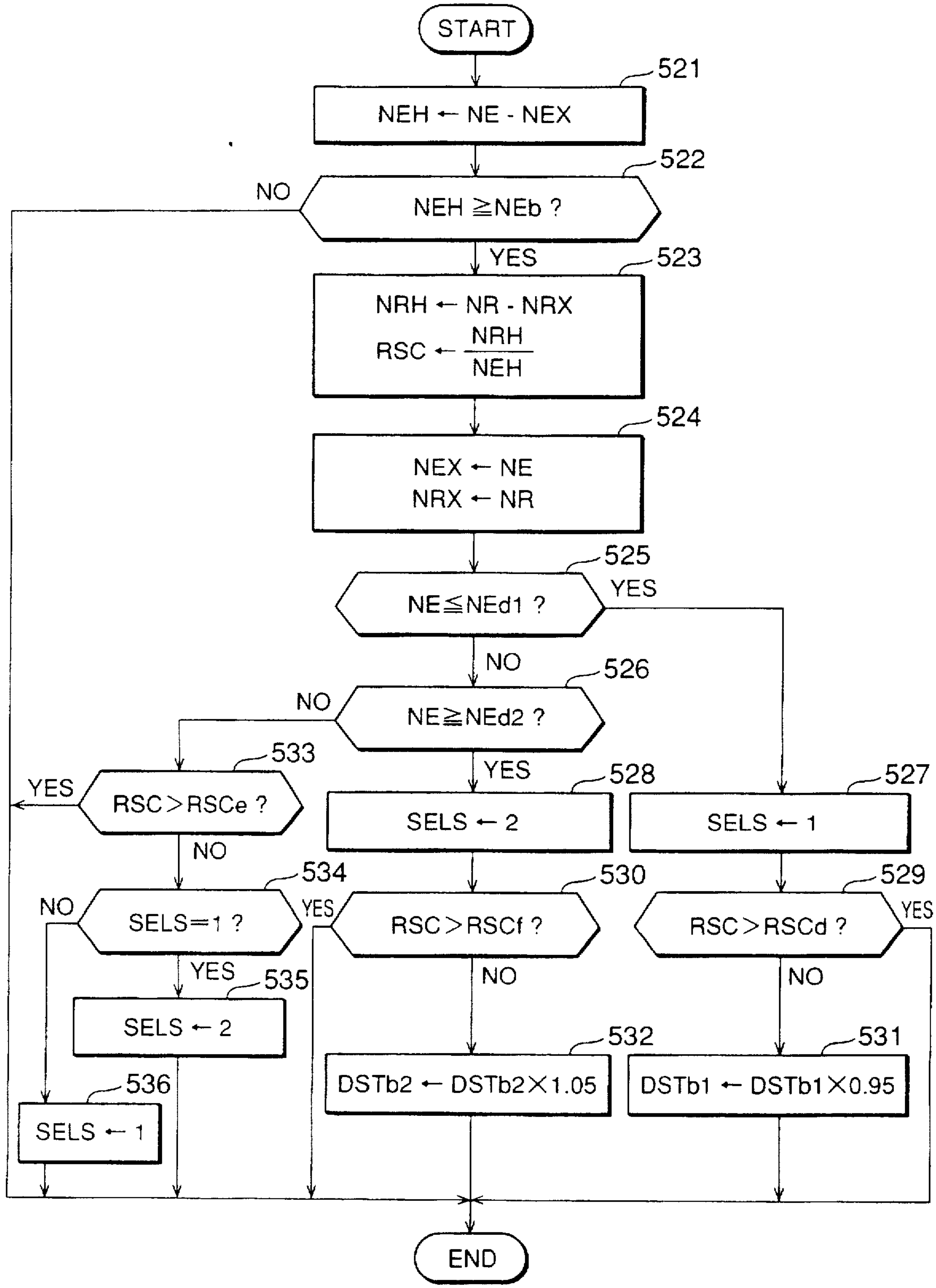
FIG. 39 is a flow chart showing a selection condition modification program for the eleventh embodiment.

FIG. 39 shows detailed contents of the selection condition modification program at step 52 (see FIG. 37).

At steps 521 to 524, the success index RSC is operated similarly the operation at steps 501 to 504 of the emergence rate modification program 50 (see FIG. 34) in the ninth embodiment. This success index is defined, generally, as the number of additional registration times divided by the number of estimation times.

At steps 525 to 536, the selection reference values DSTb1, DSTb2 are modified using the number of times of estimation NE, a first determination value NEd1, a second determination value NEd2, the success index RSC, and a success rate determination value RSCd, RSCe, RSCf. For example, NEd1=500; NEd2=800; RSCd=0.10; RSCe=0.05; and RSCf=0.05. At step 283 of the initialization program 28 (FIG. 13), for example, SELS=1; DSTb1=250; and DSTb2=250.

At step 525, it is determined as NE≦NEd1, namely, that the seeking is still in [the first half], the SELS is set to [1] at step 527, and the first selection condition is designated as the crossover pair selection condition. Then, at step 529, the success index RSC and the success rate determination value RSCd are compared. If the success index RSC is less than the success rate determination value RSCd (RSC≦RSCd), it is determined that since the value of the first selection reference value DSTb1 currently set is too restricted, the sets in compliance with the condition are too few thereby preventing the success index RSC from being higher. Therefore, at step 531, the value of the first selection reference value DSTb1 is set to be slightly smaller (for example, 5%).

On the other hand, if NE≧NEd2, or namely, if seeking is in the [final stage], the process goes to steps 525, 526, 528; SELS is set to [2]; and the second selection condition is designated as the crossover pair selection condition. Then at step 529, the success index RSC and the success rate determination value RSCf are compared. If the success index RSC is less than the success rate determination value RSCf (RSC≦RSCf), it is determined that since the value of the second selection reference value DSTb2 currently set is too restricted, the sets in compliance with the condition are too few thereby preventing the success index RSC from being higher. Therefore, at step 532, the value of the second selection reference value DSTb2 is set to be a little larger (for example, 5%).

If the success index RSC is higher than the success rate determination value RSCf, it is determined that the currently selected selection reference value of the crossover pair selection condition raises no problem at the current value, and the operation of the selection condition modification program 52 is ended.

At steps 525, 526, when it is determined that NEd1<NE<NEd2, i.e., that it is [midway], the success index RSC and the success rate determination value RSCe are compared at step 533. If the success index RSC is less than the success rate determination value RSCe (RSC≦RSCe), it assumed that the current selection condition is improper, so that the selection condition has to be switched. Therefore, after it is determined whether the current selection condition is the first or the second at step 534, the selection condition is altered to the second selection condition (SELS=2) at step 535, or to the first selection condition (SELS=1) at step 536.

If the success index RSC is higher than the success rate determination value RSCe, it is determined that the selection condition currently selected has no problem, so that the operation of the selection condition modification program 52 is ended.

As described above, in the eleventh embodiment, new sets are produced with both broad and local seeking processes because the distance between sets indicating the similarity between two sets is used as a selection reference for the crossover pair.

That is, if the pair whose distance between sets is equal to or greater than the first selection reference value DSTb1 takes the selection priority, and if a crossover is conducted to match the two sets having characteristics as different as possible from one another, the probability of producing sets having better group management performance can be raised, although the process may suffer from hit or miss performance and poor convergence. On the contrary, if the pair whose distance between sets is equal to or less than the second selection reference value DSTb2 takes the selection priority, and if crossover is conducted to match the two sets having characteristics as similar as possible to one another, although the possibility of producing sets having excellent group management performance may be lowered, the probability of producing new sets having excellent group management performance can be raised.

In the eleventh embodiment, the system determines the initial stage or the final stage of seeking from, particularly, the number of estimation times, and, during the initial stage of seeking, the pair whose distance between sets is equal to or greater than the first selection reference value DSTb1 is given selection priority to weight the broad seeking process. During the final stage of seeking, the pair whose distance between sets is equal to or less than the second selection reference value DSTb2 is given selection priority to weight the convergence of seeking, so that the system can improve its seeking efficiency.

In the eleventh embodiment, in particular, where seeking is implemented using the crossover pair selection condition in which the pair whose distance between sets is equal to or greater than the first selection reference value DSTb1 is given selection priority, the first selection reference value DSTb1 is set to a smaller value than its current value so that the crossover condition will become gentler if the success index RSC becomes lower than the expected value during the initial stage of seeking. As a result, where seeking is in a depressed state because the assigned first selection reference value DSTb1 is improper, a proper first selection reference value DSTb1 is automatically set to clear the depressed state.

In the eleventh embodiment, in particular, where seeking is implemented using the crossover pair selection condition in which the pair whose distance between sets is equal to or less than the second selection reference value DSTb2 is given selection priority, the second selection reference value DSTb2 is set to a larger value than its current value so that the crossover condition will become gentler if the success index RSC becomes lower than the expected value during the final stage of seeking. As a result, where seeking is in a depressed state because the assigned second selection reference value DSTb2 is improper, a proper second selection reference value DSTb2 is automatically set to clear the depressed state.

In the eleventh embodiment, in particular, where seeking is implemented under the first crossover pair selection condition midway during seeking, if the success index RSC becomes lower than an expected value, then the condition is altered to the second crossover pair selection condition, so that when the selection condition does not adapt itself to the current circumstances and causes seeking to go into a depressed state, the system can automatically switch it to a proper selection condition.

Moreover, in the eleventh embodiment, in particular, where seeking is implemented under the second crossover pair selection condition at the final stage of seeking, if the success index RSC becomes lower than an expected value, then the condition is altered to the first crossover pair selection condition, so that when the selection condition does not adapt itself to the current circumstances, causing seeking to go into a depressed state, the system can automatically switch it to a proper selection condition.

[Twelfth Embodiment (another embodiment of crossover pair selection)]

Figure 40:
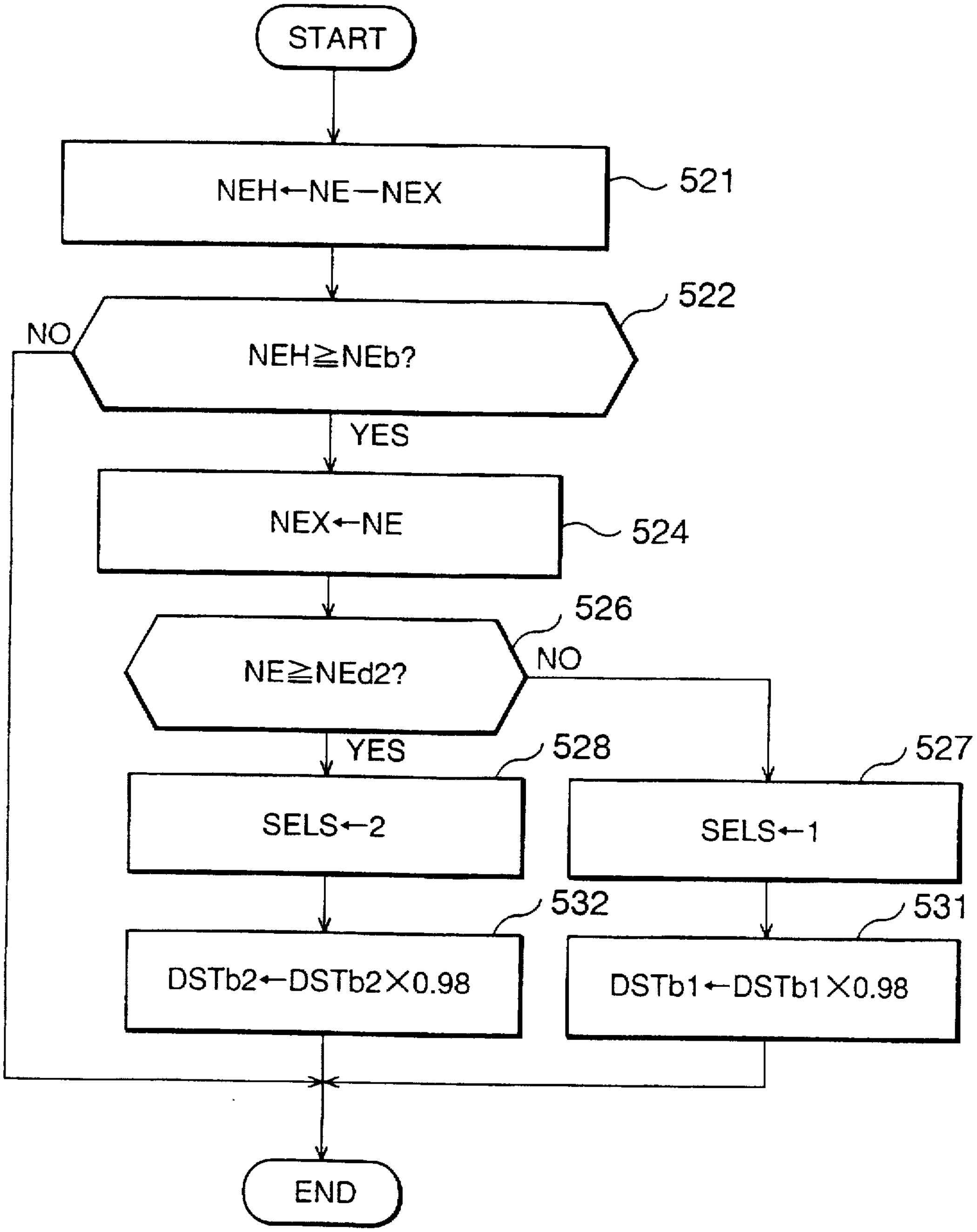
FIG. 40 is a flow chart showing a selection condition modification program for a twelfth embodiment.

Referring to FIG. 40, another embodiment of the selection condition modifier 5 is described. FIG. 40 shows a selection condition modification program, which is a partly modified version of the selection condition modification program 52 (see FIG. 39) of the eleventh embodiment.

In FIG. 40, it is determined at step 522 whether the number of estimation times is a fixed number NEb (for example, 50 times). At step 526, it is determined whether it is the second period (final stage), and if it is not the second period (NE<NEd2), a first condition is designated as the crossover pair selection condition at step 527; at step 531, the first selection reference value DSTb1 is set to be slightly smaller (for example, 2%). On the contrary, if it is determined at step 526 to be the second period (NE>NEd2), a second condition is designated as the crossover pair selection condition at step 528; at step 532, the second selection reference value DSTb2 is set to be slightly smaller (for example, 2%).

As described above, in the twelfth embodiment, the crossover pair selection conditions can be switched, according to the preceding degree of seeking, during a period while the crossover pair selection conditions in use for the first selection reference value DSTb1 are used. That is, the value of the first selection reference value DSTb1 during the initial stage of the period is set to be larger than the value during the final stage of the period, so that during the initial stage of the period the variations of the group management performance are weighted whereas during the final stage of the period the convergence of seeking is weighted.

Similarly, in the twelfth embodiment, the crossover pair selection conditions are switched, according to the preceding degree of seeking, during a period while the pair selection conditions in use for the second selection reference value DSTb2 are used. That is, the value of the second selection reference value DSTb2 during the initial stage of the period is set to be smaller than the value during the final stage of the period, so that during the initial stage of the period the variations of the group management performance are weighted whereas during the final stage of the period the convergence of seeking is weighted. Consequently, the system can improve the seeking efficiency by switching the selection conditions.

[Thirteenth Embodiment (another embodiment of crossover parameter selection)]

In the first embodiment, the crossover parameters (parameter positions) at which the parameter values are replaced are randomly selected regarding the two parent sets. In contrast, the producer in the thirteenth embodiment is characterized in that differences of parameter values (parameter deviations) are used as the parameter selection conditions and in that the parameter selection conditions are modified according to the circumstances of seeking.

Figure 41:
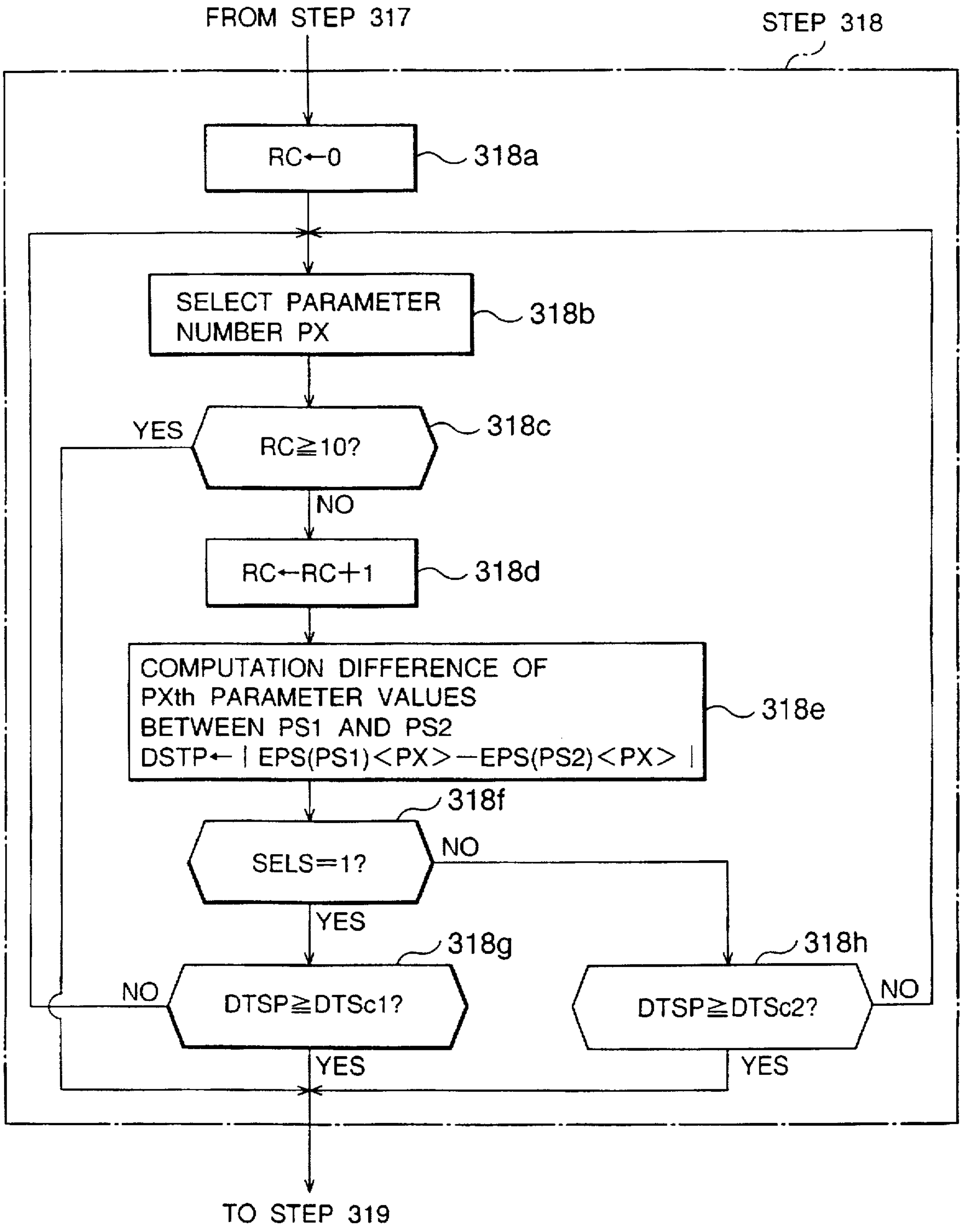
FIG. 41 is a flow chart showing a part of a new set production program for a thirteenth embodiment.
Figure 42:
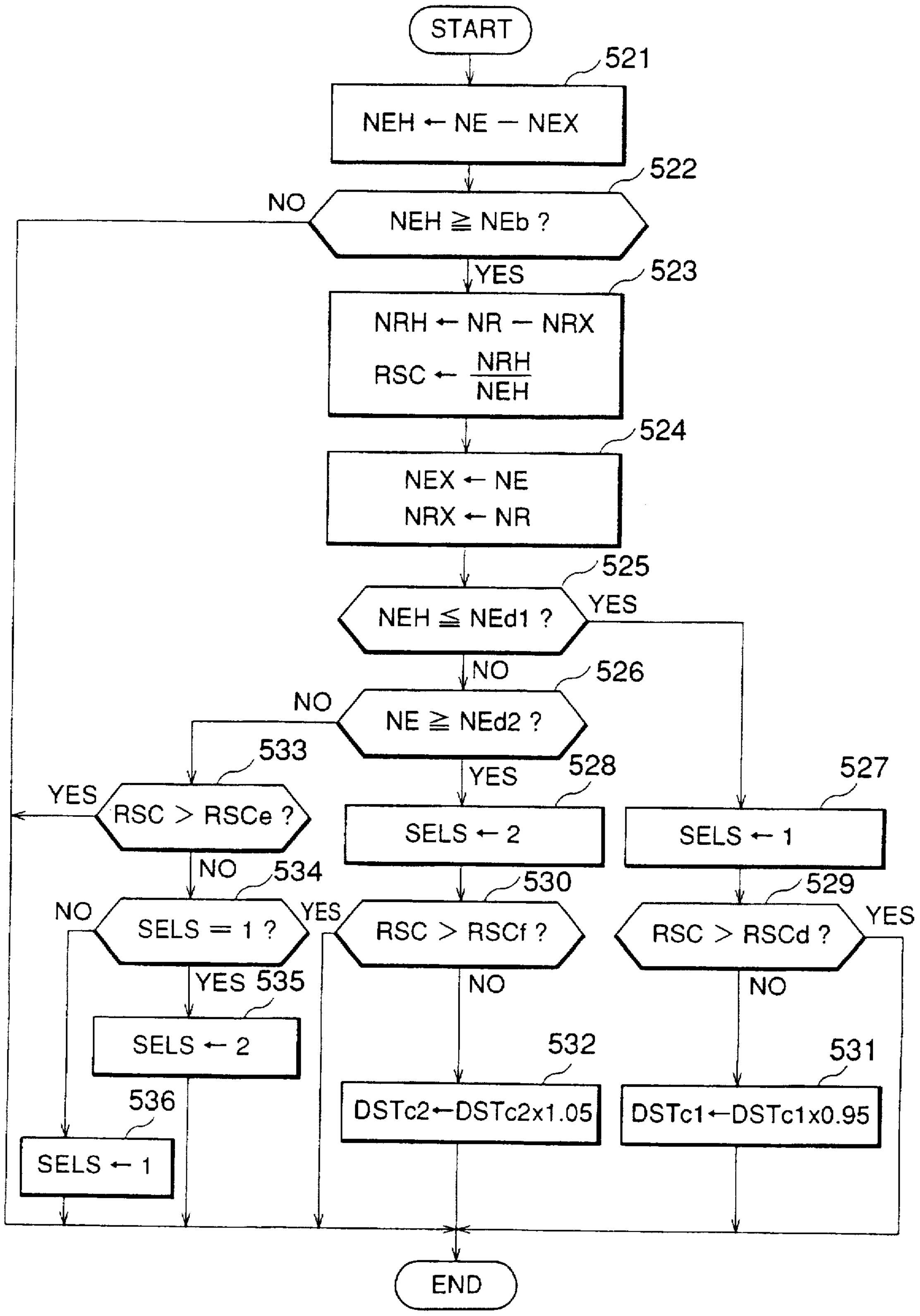
FIG. 42 is a flow chart showing a selection condition modification program for the thirteenth embodiment.

Referring to FIGS. 41 and 42, the producer is described. In this thirteenth embodiment, portions which are different from the eleventh embodiment are mainly described.

FIG. 41 shows the contents of step 318 in the new set production program 31 (see FIG. 14) for the thirteenth embodiment. In FIG. 41, at step **318*a*, the value of the counter RC is initialized to "0". The counter RC is, in this embodiment, used for counting the number of times that the parameter deviation condition as one of the crossover parameter selection conditions is determined. A random number is generated in a range between 0 and 25 at step 318*b*** to specify the parameter number PX therewith. This is the same operation as in the first embodiment.

Comparison is made between the number of times that the parameter deviation condition is determined and a certain number of times, at steps **318*c*. When the crossover parameter PX satisfying the parameter deviation condition cannot be discovered even by repeating steps 318*d* to 318*h* a certain number of times or more (for example, ten times), it is determined that the selection taking the parameter deviation into account has been sufficiently performed, and the process at step 318 is ended to determine the parameter number PX selected at step 318*b*** as the crossover parameter number.

On the other hand, at step **318*c*, if the number of times that the parameter deviation condition is determined is less than a certain number of times (RC<10), the process goes to step 318*c* and then to step 318*d*, at which the counter RC is increased by one. At the next step 318*e*, the difference of the PXth numerical values [|EPS(PS1)<PX>−EPS(PS2)<PX>|] for the selected two sets PS1, PS2 is computed to find the distance DSTP. Each parameter is converted to a numerical value between 0 and 100, and normalized. At step 387 of the optimum set extraction program 38 (see FIG. 20**), each parameter is reconverted to a usable value in the group management apparatus 1 when the optimum set data BPD are produced.

As described above, the difference DSTP of the PXth parameter values of the two sets PS1, PS2 are computed at step **318*e*, and then it is determined, at steps 318*f* to 318*h*** whether the deviation condition designated by the selection is satisfied.

Where the first selection condition is designated as the parameter deviation condition (SELS=1), the process goes to step **318*f* and then to step 318*g*, at which it is determined whether the deviation DSTP is equal to or greater than the first selection reference value DSTc1. If DSTP<DSTc1, the crossover parameter PX not satisfying the parameter deviation condition is discarded, and the process returns to step 318*b*** to repeat the same operations from the beginning.

Similarly, where the second selection condition is designated as the parameter deviation condition (SELS=2), it is determined at step 318h whether the deviation DSTP is equal to or less than the second selection reference value DSTc2. If the selection condition is not satisfied (DSTP>DSTc2), the process goes to step **318*b*** to restart from the beginning.

The operations at steps **318*b* to 318*h* are repeated until the parameter deviation condition is determined a certain number of times (ten times) or more or until the crossover parameter satisfying the parameter deviation condition is found. If the crossover parameter PX for DSTP>DSTc1 or DSTP<DSTc2 is detected, the parameter PX is determined as the regular crossover parameter PX, and the process goes to the next step 319. Since the steps following step 319** are the same as those in the first embodiment, description there of is omitted.

FIG. 42 shows a method for modifying the selection conditions described above according to the progress of seeking.

FIG. 42 is a diagram showing a selection condition modification program at step 52 in the operation program 100 (see FIG. 37).

The selection condition modification program in the thirteenth embodiment is the same as the selection condition modification program (FIG. 39) in the eleventh embodiment except for steps 531, 532. Hence, the operations at steps 529 to 532 at which the selection reference value DSTc1, DSTc2 are corrected are mainly described assuming that at step 283 of the initialization program 28 (see FIG. 13): the designated data SELS=1; the selection reference value DSTc1=50; and the selection reference value DSTc2=50.

During the initial stage of seeking (NE<NEd1), if the success index RSC is less than an expected value RSCd (RSC<RSCd) while the first selection condition is selected (SELS=1), it is determined that the number of crossover parameters meeting the condition is too small and prevents the success index RSC from being higher because the currently set first selection reference value DSTc1 is too restricted and is improper. Then the process goes to step 529 and then to 531, at which the first selection reference value DSTc1 is set to be slighlty smaller (for example, 5%), ending the operation of the selection condition modification program 52.

On the other hand, during the final stage of seeking (NE≧NEd2), if the success index RSC is less than an expected value RSCf (RSC≦RSCf) while the second selection condition is selected (SELS=2), it is determined that the number of crossover parameters meeting the condition is too small and prevents the success index RSC from being higher because the currently set second selection reference value DSTc2 is too restricted and is improper. Then the process goes to step 530 and then to 532, at which the second selection reference value DSTc2 is set to be slightly larger (for example, 5%).

If the success index RSC is larger than the expected value RSCd, it is determined that the selection reference value of the selection condition being currently selected raises no problem at the current value, and the operation of the selection condition modification program 52 is ended.

As described above, the production taking the variations of the group management performance and the convergence of seeking into account can be performed in the thirteenth embodiment because the parameter deviation indicating the similarity of the two selected sets is obtained and because the parameter selection condition is then set based on the parameter deviation.

That is, if the control parameter whose parameter deviation is equal to or greater than the first selection reference value DSTc1 takes priority in the selection, and if the crossover matches the parameters having characteristics as different as possible from one another, the possibility of producing new sets having excellent group management performance can be raised, although the selection may suffer from of hit or miss performance and from poor convergence of seeking. If the control parameter whose parameter deviation is equal to or less than the second selection reference value DSTc2 takes the selection priority, and if the crossover matches the parameters having characteristics as similar as possible to one another, although the possibility of producing new sets having excellent group management performance may be lowered, the probability of producing new sets having relatively excellent group management performance can be raised.

In the thirteenth embodiment, the initial and final stages of seeking are determined from the number of estimation times; during the initial stage of seeking, the seeking process weighting the variations of the group management performance is conducted where the control parameter whose parameter deviation is equal to or greater than the first selection reference value DSTc1 takes the selection priority; during the final stage of seeking, in contrast, the seeking process weighting the convergence of seeking is conducted where the control parameter whose parameter deviation is equal to or less than the second selection reference value DSTc2 takes the selection priority. Therefore, production taking the variations of the group management performance and the convergence of seeking into account can be performed in accordance with the period of seeking.

In the thirteenth embodiment, where seeking is implemented using the crossover parameter selection condition in use of the first selection reference value DSTc1, the first selection reference value DSTb1 is set to a smaller value than its current value so that the selection condition will become gentler if the success index RSC becomes lower than the expected value during the initial stage of seeking. As a result, where seeking is in a depressed state because the assigned first selection reference value DSTb1 is improper, its value is automatically modified to a proper value.

In the thirteenth embodiment, where seeking is implemented using the crossover parameter selection condition using the second selection reference value DSTc2, the second selection reference value DSTb2 is set to a smaller value than its current value so that the selection condition will become gentler if the success index RSC becomes lower than the expected value during the final stage of seeking. As a result, where seeking is in a depressed state because the assigned second selection reference value DSTb2 is improper, its value is automatically modified to a proper value.

In the thirteenth embodiment, where seeking is implemented midway during seeking using the first crossover parameter selection condition using the first selection reference value DSTc1, if the success index RSC becomes lower than the expected value, it is switched to the second crossover parameter selection condition using the second selection reference value DSTc2. As a result, where seeking is in a depressed state because the first crossover parameter selection condition is not suitable for the current circumstances, the condition can be automatically switched to a proper selection condition.

In the thirteenth embodiment, where seeking is implemented midway during seeking using the second crossover parameter selection condition using the second selection reference value DSTc2, if the success index RSC becomes lower than the expected value, it is switched to the first crossover parameter selection condition using the first selection reference value DSTc1. As a result, where seeking is in a depressed state because the second crossover parameter selection condition is not suitable for the current circumstances, the condition can be automatically switched to a proper selection condition.

Thus, the system according to the thirteenth embodiment can clear the depressed state of seeking and thereby improve the seeking efficiency by alteration of the selection reference value and switching of the selection condition in accordance with the circumstances of seeking.

[Fourteenth Embodiment (another embodiment of selection condition modification)]

Figure 43:
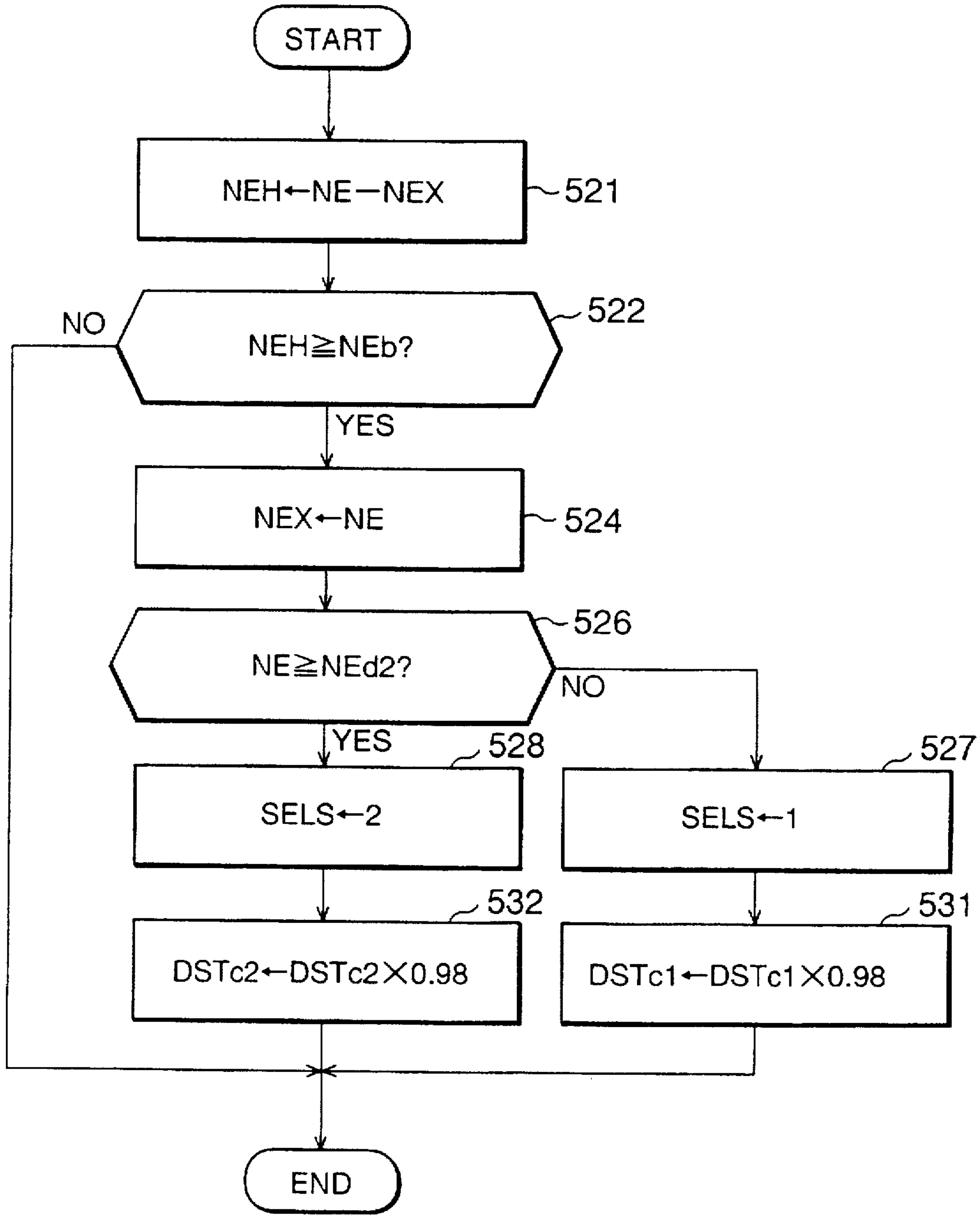
FIG. 43 is a flow chart showing a selection condition modification program for a fourteenth embodiment.

Referring to FIG. 43, another embodiment of the selection condition modifier 5 is described. FIG. 43 shows operation steps of a selection condition modification program 52, which is a partly modified program of (see FIG. 42) in the thirteen embodiment.

In FIG. 43, it is determined at step 522 whether the number of estimation times is a fixed number NEb (for example, 50 times). At step 526, it is determined whether it is the second period (final stage), and, if it is not the second period (NE<NE2d), a first condition is designated as the crossover parameter selection condition at step 527; at step 531, the first selection reference value DSTb1 is set to be slightly smaller (for example, 2%).

On the contrary, if it is determined at step 526, to be the second period (NE≧NE2d ), a second condition is designated as the crossover parameter selection condition at step 528; at step 532, the second selection reference value DSTb2 is set to be slightly smaller (for example, 2%).

Thus, the conditions regarding to the parameter deviations are altered in accordance with the circumstances of seeking. Operations except the one described above are exactly the same as those of the thirteenth embodiment.

As described above, in the fourteenth embodiment, during a period using the crossover parameter selection condition using the first selection reference value DSTb1, the first selection reference value DSTb1 during the initial stage of the period is set to be larger than the value during the final stage of the period, and, thereby, the selection condition is set so that the initial stage of the period is stricter than the final stage, so that during the initial stage of the period the variations of the group management performance are weighted whereas during the final stage of the period the convergence of seeking is weighted.

Similarly, in the fourteenth embodiment, during a period using the crossover parameter selection condition using the second selection reference value DSTb2, the second selection reference value DSTb2 during the final stage of the period is set to be smaller than the value during the initial stage of the period, and, thereby, the selection condition is set so that the final stage of the period becomes stricter than the initial stage. As a result, during the initial stage of the period the variations of the group management performance are weighted whereas during the final stage of the period the convergence of seeking is weighted.

Although in the ninth to fourteenth embodiments it is determined whether it is the first or second half of seeking or whether it is the initial or final stage of seeking in accordance with the number of estimation times NE, whether it is the first or second half of seeking or whether it is the initial or final stage of seeking, can be determined by using the number of additional registration times NR in lieu of the number of estimation times NE.

[Fifteenth Embodiment (another embodiment of parameter selection)]

Next, another embodiment of the producer will be described using FIGS. 44 and 45. In the fifteenth embodiment, selection probability (emergence rate) for each parameter is determined based on a related degree of traffic flow characteristics and a related degree of the estimation term of the group management performance. The fundamental structure of the fifteenth embodiment is the same as that of the second embodiment, and, therefore, the portions which are different from those in the second embodiment are mainly described.

Figure 44:
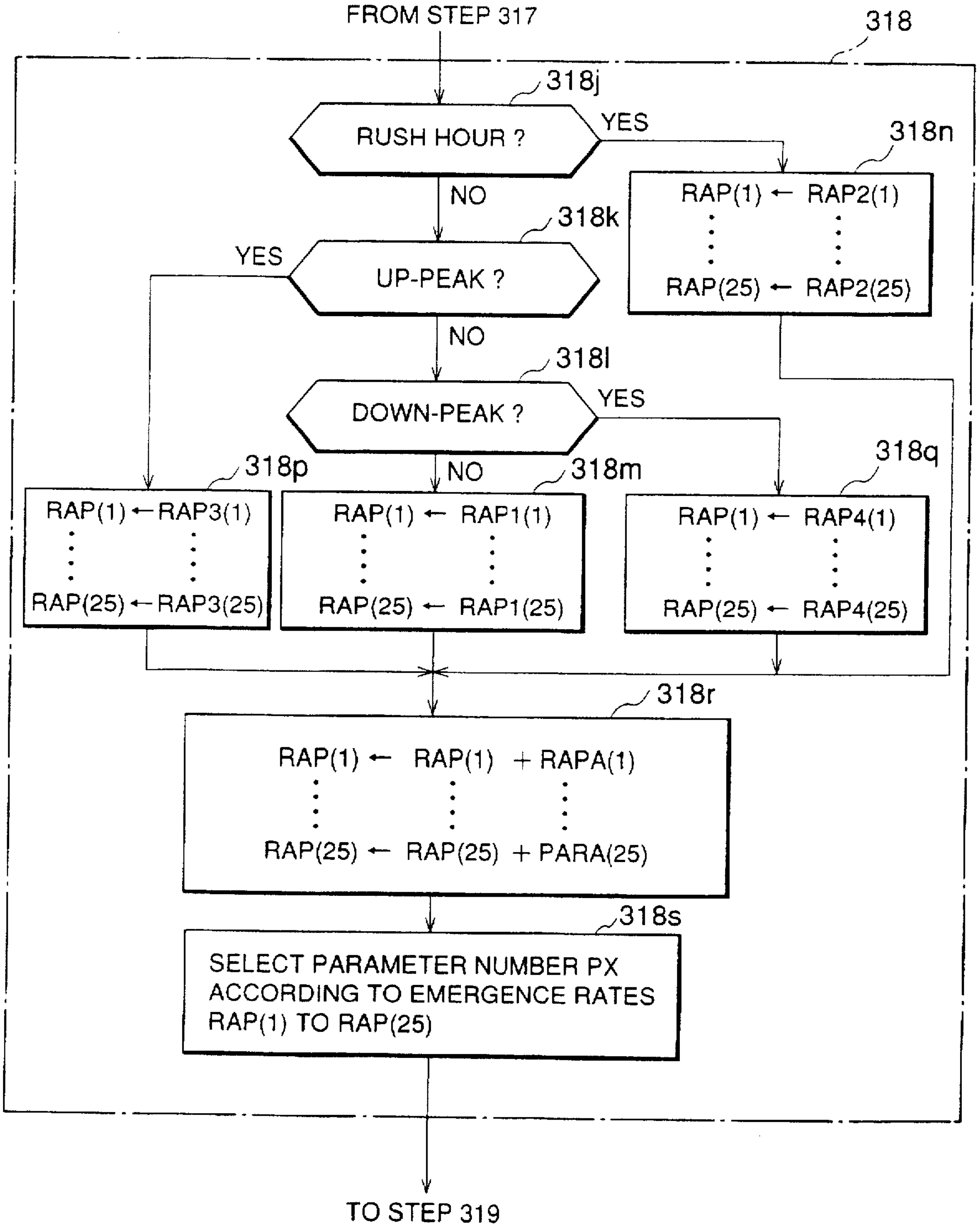
FIG. 44 is a flow chart showing a part of a new set production program for a fifteenth embodiment.

FIG. 44 shows the contents at step 318 in the new set production program 31 (see FIG. 14).

In FIG. 44, at steps **318*j* to 318*q*, parameter emergence rates RPA(1) to RPA(25) for twenty five parameters are determined according to the traffic flow specification. Specifically, types of traffic flows are distinct at steps 318*j* to 318*l*** based on the contents of passenger number, ground floor traffic ratio, traveling-up traffic ratio, traveling-down traffic ratio, and the like, which are included in the traffic flow specification data TRS. That is, it is determined which situation is the current traffic situation among the rush hour time band, up-peak, down-peak, and regular time band.

If it is determined to be the regular time band, the emergence rates RPA1(1) to RPA1(25) for respective parameters previously prepared for the regular hour time band are set as parameter emergence rates RPA(1) to RPA(25) at step **318*m*. Similarly, when it is determined to be the rush hour time, the RPA2(1) to RPA2(25) are set as parameter emergence rates RPA(1) to RPA(25) at step 318n; when it is determined to be up-peak, RPA3(i) to RPA3(25) are set as parameter emergence rates RPA(1) to RPA(25) at step 318*p*; when it is determined to be down-peak, RPA4(1) to RPA4 (25) are set as parameter emergence rates RPA(1) to RPA (25) at step 318*q*. Columns 10B in FIG. 45** show parameter emergence rates, prepared for respective traffic flows, RPA1 (1) to RPA1(25), and RPA2(1) to RPA2(25), RPA3(1) to RPA3(25), RPA4(1) to RPA4(25).

In FIG. 45, where the characteristics of the traffic flow is for the regular time band, regarding the parameter emergence rates RPA1(1) to RPA1(25), the emergence rate is set to "10" for parameters having a close relation to the traffic flow (parameter number=1 to 9, 22 to 25), whereas the emergence rate is set to "0" for parameters having almost no relation to the traffic flow (the parameter number=18 to 21). The emergence rate is set to "5" for control parameters having moderate relation to the traffic flow (the parameter number=10 to 17).

Where the characteristics of the traffic flow are for the rush hour time band, regarding the parameter emergence rates RPA2(1) to RPA2(25), the emergence rate is set to "10" for parameters having a close relation to the traffic flow (parameter number=1 to 9, 18 to 21), whereas the emergence rate is set to "0" for parameters having almost no relation to the traffic flow (the parameter number=10 to 17). The emergence rate is set to "5" for control parameters having moderate relation to the traffic flow (the parameter number= 22 to 25).

Where the characteristics of the traffic flow are for the up-peak time band, regarding the parameter emergence rates RPA3(1) to RPA3(25), the emergence rate is set to "10" for parameters having a close relation to the traffic flow (parameter number=1 to 13), whereas the emergence rate is set to "0" for parameters having almost no relation to the traffic flow (the parameter number=14 to 21). The emergence rate is set to "5" for control parameters having moderate relation to the traffic flow (the parameter number= 22 to 25).

Where the characteristics of the traffic flow are for the down-peak time band, regarding the parameter emergence rates RPA4(1) to RPA4(25), the emergence rate is set to "10" for parameters having a close relation to the traffic flow (parameter number=1 to 9, 14 to 17), whereas the emergence rate is set to "0" for parameters having almost no relation to the traffic flow (the parameter number=18 to 21). The emergence rate is set to "5" for control parameters having moderate relation to the traffic flow (the parameter number=22 to 25).

As described above, the parameter emergence rates RPA (1) to RPA(25) for twenty five control parameters are determined at steps 318*j* to 318*q* according to the traffic flow specification. The values of the emergence rates for respective traffic flows RPA1(1) to RPA1(25), RPA2(1) to RPA2 (25), RPA3(1) to RPA3(25), and RPA4(1) to RPA4(25) are not limited to the values shown in FIG. 45. It is possibly to set any value if it relatively indicates a degree relevant to respective traffic flow characteristics. Smaller differences are possible for emergence rates between the control parameters.

Referring to FIG. 44, next, the parameter emergence rates RPA(1) to RPA(25) are corrected at step 318*r* in accordance with correction values RPAA(1) to RPAA(25) in proportion to the degree relevant to the estimation terms of the group management performance (for example, mean waiting time).

The correction values RPAA(1) to RPAA(25) are set by the performance reference value setting apparatus 3 described above. As described in the second embodiment, the performance reference value setting apparatus 3 provides as its output the [target value] for the mean waiting time, the [designated value] for the estimation reference value BX, similarly to the second embodiment, and, in this fifteenth embodiment, in addition to those, the [related degree] to the mean waiting time as of the estimation term is delivered as the correction value.

Accordingly, the reference value data TGT contained in the seeking condition signal 1*a* provided from the group management apparatus 1 to the seeking apparatus 10 containing the waiting time target value TAW, the additional reference designation value TCB, and the correction values RPAA(1) to RPAA(25). RPAA(1) to RPAA(25) shown in FIG. 45 indicate the correction values for the target values of the mean waiting time.

Regarding the correction values RPAA(1) to RPAA(25), the correction value is set to "10" for control parameters having a close relation to the mean waiting time as the estimation term (parameter number=8, 22, 23), whereas the correction value is set to "0" for control parameters having almost no relation (the parameter number=10 to 21). The correction value is set to "5" for control parameters having a moderate relation (the parameter number=1 to 7, 9, 24, 25).

On the other hand, if the estimation term is not the mean waiting time but the electrical power saving, regarding the correction values RPAA(1) to RPAA(25), the correction value is set to "10" for control parameters having a close relation to the mean waiting time as the estimation term (parameter number=4 to 7, 22 to 25), whereas the correction value is set to "0" for control parameters having almost no relation (the parameter number =9 to 21). The correction value is set to "5" for control parameters having moderate relation (the parameter number=1 to 3, 8).

Even if the estimation term is not as described above, the correction values RPAA(1) to RPAA(25) are likewise determined according to the degree of relation. It is possible to set any value for the correction values RPAA(1) to RPAA(25) if it relatively indicates a degree relevant to the estimation term. Smaller differences are possible as the correction values between the control parameters.

Next, at step 318*s*, a random number having a value between [0] and [the total of the parameter emergence rates RPA(1) to RPA(25)] is generated to determine the parameter number PX at which crossover or mutation is performed. Then, the process goes to the next step 319. Since the steps following step 319 are the same as those of the first embodiment, their description is omitted.

As described above, in the fifteenth embodiment, the values of the parameters having a close relation to particular traffic flow characteristics take priority in being changed because the related degree between the parameter and the traffic flow characteristics is set as the parameter selection condition, thereby increasing the possibility that new sets having excellent group management performance will be produced.

In the fifteenth embodiment, the emergence rate in proportion to the related degree of traffic flow characteristics is set for every parameter, and the parameter is selected according to the emergence rate, so that the parameters having a close relation to the particular traffic flow characteristics and readily affecting the group management performance tend to be easily selected, and so that the possibility of producing new sets having excellent group management performance becomes higher.

In the fifteenth embodiment, application of crossover or mutation to the parameters to which the traffic flow characteristics are not relevant is completely prevented, because the control parameters having no relation to the traffic flow characteristics when the group management is performed would not be selected by setting their emergence rates to zero.

In the fifteenth embodiment, the values of the parameters having a close relation to the estimation item take priority in being changed because the related degree between the parameters and the estimation items as the estimation object is set as the parameter selection condition, thereby increasing the possibility that new sets having excellent group management performance will be produced.

In the fifteenth embodiment, the emergence rate in proportion to the related degree to the estimation term as the estimation object is set for every parameter, and the parameter is selected according to the emergence rate, so that the parameter readily affecting the group management performance tends to be easily selected, and so that the possibility of producing new sets having excellent group management performance increases.

In the fifteenth embodiment, application of crossover or mutation to the parameter to which the estimation term as the estimation object is not relevant is completely prevented, because the control parameter having no relation to the estimation term would not be selected by setting its emergence rate to zero.

Moreover, in the fifteenth embodiment, the related degree between the parameter and the estimation term as of the estimation object and the related degree between the control parameter and the traffic flow characteristics are combined to make the parameter condition, so that the possibility of producing new sets having excellent group management performance is increased.

Thus, according to the fifteenth embodiment, production, estimation, additional registration determination, and the like of useless new sets are reduced, so that seeking is performed efficiently.

It should be noted that if the estimation function of group management performance includes plural estimation terms, respective emergence rates are to be weighted, or correction values are to be added, according to the importance of respective estimation terms.

[Sixteen Embodiment (another embodiment of crossover pair selection)]

Next, another embodiment of the producer will be described. In this embodiment, the crossover sets are selected based on the number of similar sets. Regarding the sixteenth embodiment, hereinafter, those portions different from the first embodiment are mainly described.

Figure 46:
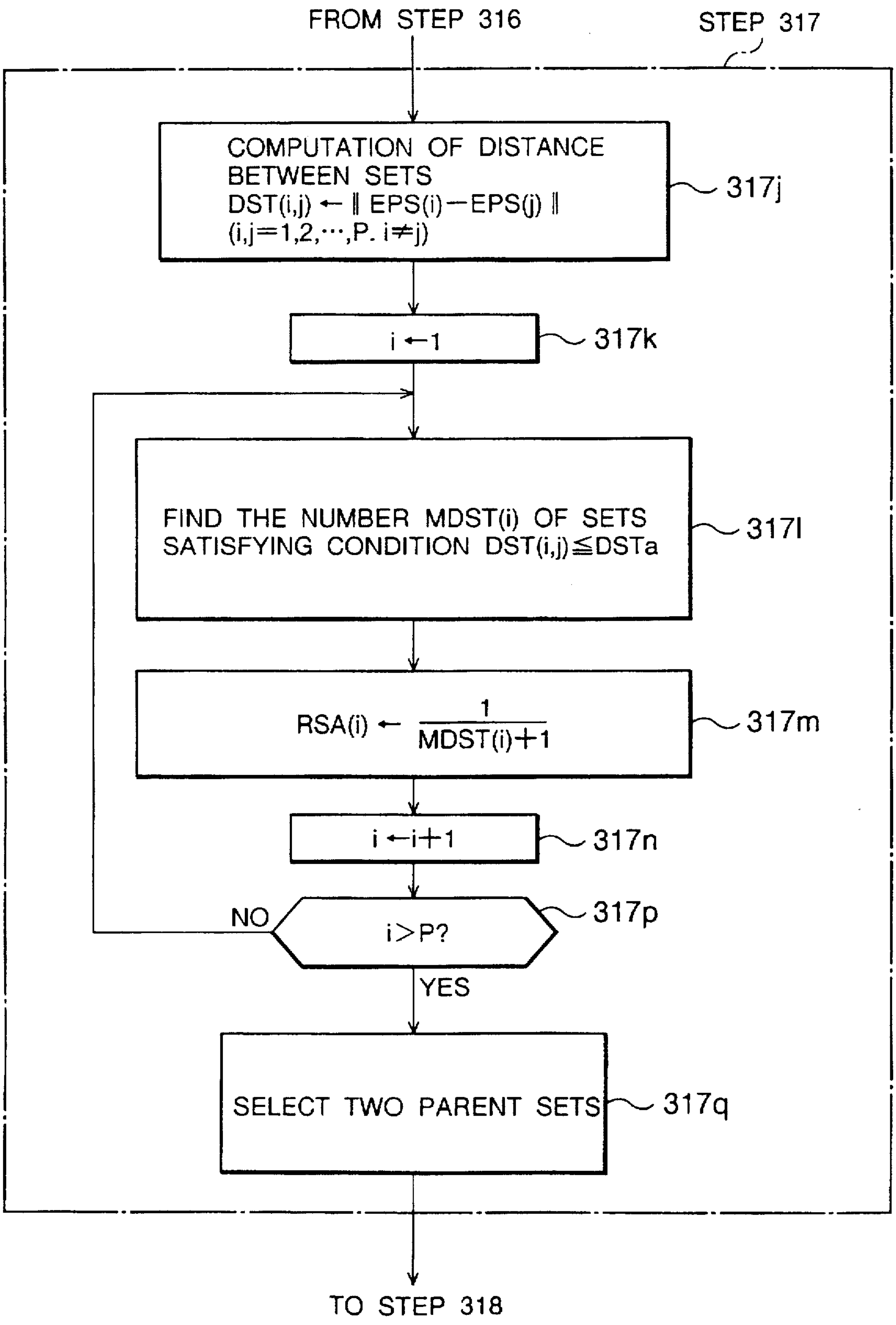
FIG. 46 is a flow chart showing a part of new set production program for a sixteenth embodiment.

In the new set production program 31 (see FIG. 11), the operation at step 317 (see FIG. 14) for selecting the crossover pair PS1 and PS2 according to this embodiment is considerably different from that of the first embodiment, and the operation is described using FIG. 46.

In FIG. 46, first, the distance DST(i,j) between sets (providing that i, j=1, 2, . . . , P; i≠j) according to the formula [31] is computed at step **317*j*. This computation is the same as the computation at step 414 in the deletion program 35 (FIG. 26**) of the third embodiment. Each parameter value is normalized to a value between 0 and 100.

At step **317*k*, the set number i is initialized to one, and the operations at steps 317*l* to 317*n* are repeated until setting of the emergence rates RSA(1) to RSA(P) for all the sets (i=1, 2, . . . , P) is detected at step 317*p*. The number of sets MDST(i) at which DST(i,j)≦the DSTa (similar set number) is found at step 3171** for all numerals j=1, 2, . . . , P at j≠i. DSTa is a determination value for determining whether two sets are similar to each other, and in the sixteenth embodiment, it is set to twenty five as in the third embodiment.

At step **317*m*, the emergence rate RSA(i) of set i is calculated from a formula, RSA(i)=1+{MDST(i)+1}, based on the similar set number MDST(i). That is, the emergence rate is set to be higher as the similar set number becomes smaller. To compute the emergence rate for the next set, the set number is incremented by one at step 317*n***.

Thus, where the emergence rates RSA(1) to RSA(P) are determined for all the sets, finally, two random numbers having a value between [0] and [the total of the emergence rates RSA(1) to RSA(P)] are generated at step **317*q***, and then, according to the respective random numbers and the emergence rates RUA(1) to RUA(P), two parent sets PS1, PS2 are selected.

This is the end of the operation at step 317, and the two sets PS1 and PS2 are determined as the regular crossover pairs. Then, the process goes to the next step 318. The steps subsequent to step 318 are the same as those of the first embodiment, so that their description is omitted.

As described above, in the sixteenth embodiment, the probability of making pairs having different characteristics from each other perform crossover is improved because the crossover pairs are selected based on a similar set number. Accordingly, the probability of producing new sets having excellent group management performance is improved.

It should be noted that although in the embodiments described above only one of the crossover parameters is selected (such a parameter selection method is generally called "one point crossover"), other ways are possible. A method in which two or more of the crossover parameters are simultaneously selected ("multi-point crossover") can be used. It is also possible to adopt a method, called "uniform crossover", in which bit sequences (masks) having the same length as the number of the parameter are prepared in advance determining which of the parents can transfer the genes (parameter values) to the children from the values of respective bits designated by the mask. This is the same thing as [mutation].

Although the sets includes twenty five parameters, the number and the contents are merely examples, so that this invention can be applied to any type of parameter set used in the group management algorithm.

[Seventeenth Embodiment (another example of system constitution)] Although in the embodiments described above the group management apparatus 1 and the seeking apparatus 10 are installed in the elevator machine room of the building and the optimum set is obtained by on-line operation, other ways are possible.

Figure 47:
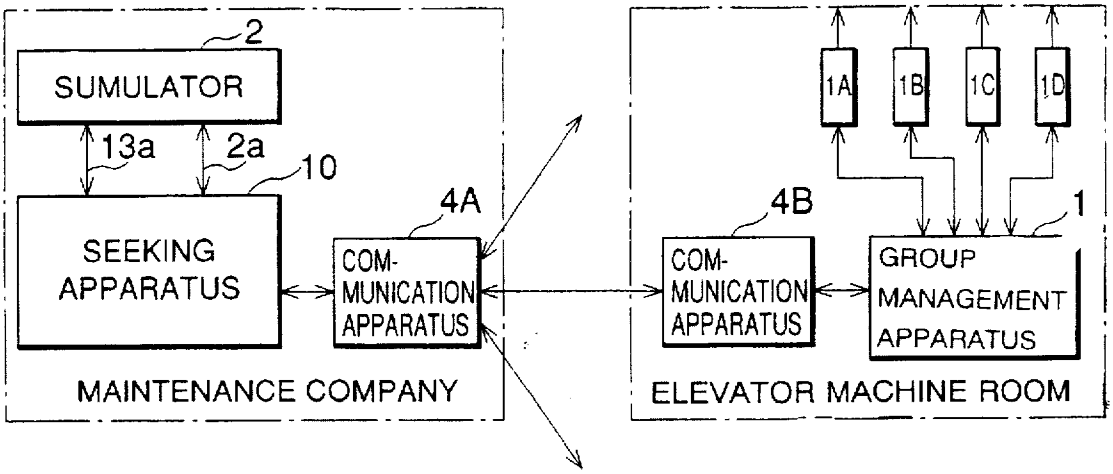
FIG. 47 is a diagram showing a seventeenth embodiment.

For example, regarding the embodiments 1 to 6, and 8 to 15, as shown in FIG. 47, it is also possible to install a seeking apparatus 10 and a simulator 2 in a monitor center of an elevator maintenance company and to connect the seeking apparatus 10 and a group management apparatus 1 by a telephone line using communication apparatus 4A and 4B. In such a case, the communication apparatus 4A is capable of data communication with other buildings having the communication apparatus B. By such a structure, one set of the seeking apparatus and one simulator is commonly used for plural group management apparatus. The seeking apparatus 10, the simulator 2, and the communication apparatus 4A can be installed in a manager's room or an accident prevention center.

According to the seventeenth embodiment, the system can be made inexpensive by commonly using an expensive seeking apparatus 10 and a simulator 2.

Figure 48:
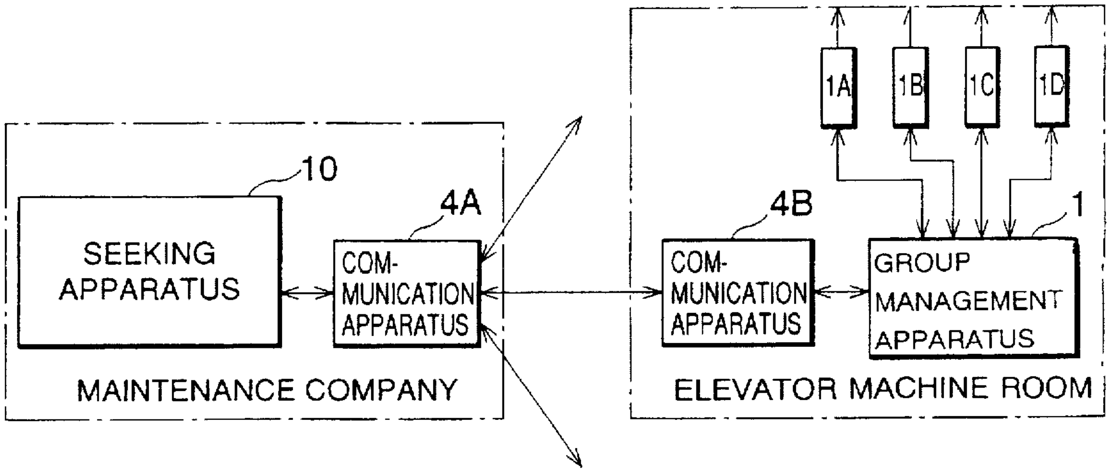
FIG. 48 is a diagram showing an eighteenth embodiment.

In particular, in the eighth embodiment, as shown in FIG. 48, it is also possible to install a seeking apparatus 10 in a manager's room of the building or a monitor center of an elevator maintenance company and to connect the seeking apparatus 10 and a group management apparatus 1 by a telephone line using communication apparatus 4A and 4B.

The seeking apparatus 10 can be used for developing group management algorithm, i.e., for a situation where the optimum group management algorithm draft is selected from plural group management algorithm drafts. Generally, when a new group management algorithm is to be developed, a simulation is conducted using a simulator, and based on group management performance data PRF obtained at that time, the performance group management algorithm is estimated, or the optimum set is found. In such a case, the simulator 2 is connected to the seeking apparatus 10 as shown in FIG. 49.

Figure 49:
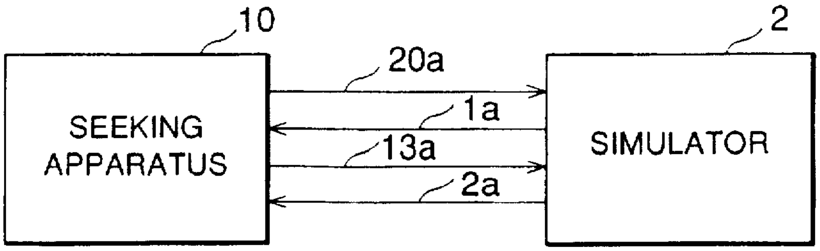
FIG. 49 is a diagram showing a nineteenth embodiment.

The seeking apparatus 10 is also useful when the group management apparatus 1 is shipped from its factory, when the optimum set is sought by the simulator 2 shown in FIG. 49 and then registered, or when the set group GPS1 to GSP4, for initialization are registered. The seeking apparatus 10 and the simulator 2 can be realized by a single microcomputer. Moreover, the group management apparatus 1, the seeking apparatus 10, and the simulator 2 can be a single microcomputer.

What is claimed is:

1. A system for group managing a plurality of elevator cars according to a group management algorithm including a plurality of parameters, said system including:

a group management apparatus for implementing a group management algorithm for controlling a plurality of elevators and for outputting a seeking condition signal, the seeking condition signal including at least one of: traffic flow specification data, elevator car specification data, and seeking command data;

a seeking apparatus for seeking an optimum set from a plurality of sets, said seeking apparatus comprising:

memorizing means for storing a plurality of sets and group management performance data for each set, each set including a plurality of parameter values to be input into the group management algorithm, the group management performance data including information regarding a waiting time of an elevator user, peak and average boarding time data, power consumption data, responding rate data, and prediction data resulting from execution of the group management algorithm using the respective sets;

producing means for selecting one or plural sets as a parent or parents from said memorizing means and for producing one or plural new sets inheriting part of the characteristics of the parent or parents;

estimating means for estimating a result of execution of the group management algorithm using each new set in response to the seeking condition signal, the result of executing being group management performance data for each new set, the group management performance data including information regarding a waiting time of an elevator user, peak and average boarding time data, power consumption data, responding rate data, and prediction data resulting from execution of the group management performance algorithm using the respective sets;

selecting means for improving the plurality of sets stored in said memorizing means through both of addition of the new sets to said memorizing means based on the group management performance data for each new set and deletion of impaired sets from said memorizing means based on the group management performance data of each impaired set, the addition of the new sets including storing the group management performance data corresponding to each new set with each new set stored in said memorizing means, the deletion of the impaired sets including deleting the group management performance data corresponding to each impaired set with each set deleted from said memorizing means; and extracting means for extracting an optimum set based on the group management performance data from among the plurality of sets stored in said memorizing means.

2. A system as set forth in claim 1, wherein said producing means includes:

numerical value exchanging means for producing two new sets by exchanging numerical value portions between two sets which are selected from said memorizing means;

new value replacing means for producing one new set by replacing a part of a plurality of parameter values of one set selected from said memorizing means with new numerical values generated in a random manner; and production method selecting means for selecting between exchanging of numerical values and replacing of new values according to a probability.

3. A system as set forth in claim 1, wherein said producing means includes:

parent selecting means for selecting one or plural sets from said memorizing means;

parameter selecting means for selecting, in conjunction with the one or two sets, parameters by which exchanging of numerical values or replacing of new values is performed;

numerical value exchanging means for producing two new sets by exchanging between two sets which are selected by said parent selecting means a portion of values of the parameters which are selected by said parameter selecting means;

new value replacing means for producing one new set by replacing parameter values, selected by said parameter selecting means, of one set selected by said parent selecting means with new numerical values generated in a random manner; and production method selecting means for selecting between exchanging of numerical values and replacing of new values according to a probability.

4. A system as set forth in claim 3, wherein said parent selecting means performs parent selections based on parent selection reference information for raising production probability of excellent new sets.

5. A system as set forth in claim 4, wherein the parent selection reference information is the distance between sets and wherein said parent selecting means computes the distance between sets and randomly selects from said memorizing means a pair of sets at which the distance between sets satisfies a certain condition.

6. A system as set forth in claim 4, wherein the parent selection reference information includes the group management performance data stored with each set in said memorizing means and wherein said parent selecting means weights a selection probability of each set according to the group management performance data and thereby randomly selects one or two sets from said memorizing means.

7. A system as set forth in claim 4, wherein the parent selection reference information is the number of similar sets and wherein said parent selecting means computes the number of similar sets for every set, weights a selection probability of each set according to the number of similar sets, and thereby randomly selects one or two sets from said memorizing means.

8. A system as set forth in claim 3, further comprising modifying means for modifying parent selection conditions in accordance with proceeding circumstances of seeking.

9. A system as set forth in claim 3, wherein said parameter selection means selects the parameter, based on parameter selection reference information for raising the probability of producing excellent new sets.

10. A system as set forth in claim 9, wherein the parameter selection reference information is the difference of the two parameter values to be exchanged between the two sets and wherein said parameter selection means computes the difference and randomly selects parameters at which the difference satisfies a selection condition.

11. A system as set forth in claim 9, wherein the parameter selection reference information is a related degree between circumstances of use of elevator cars and each parameter and wherein said parameter selecting means weights selection probability of each parameter according to said related degree and thereby randomly selects said parameters.

12. A system as set forth in claim 9, wherein the parameter selection reference information is a related degree between contents of the performance estimation value and each parameter and wherein the parameter selecting means weights selection probability of each parameter according to the related degree and thereby randomly selects said parameters.

13. A system as set forth in claim 3, further comprising modifying means for modifying parameter selection reference information in accordance with proceeding circumstances of seeking.

14. A system as set forth in claim 2, further comprising probability modifying means for modifying selection probability of respective production methods in accordance with proceeding on-going circumstances of seeking.

15. A system as set forth in claim 14, wherein said probability modifying means computes a success index from a ratio of the number of sets which are added to said memorizing means to the number of estimated sets and modifies the selection probability based on the success index.

16. A system for group managing a plurality of elevator cars according to a group management algorithm including:

group management apparatus for implementing a group management algorithm for controlling a plurality of elevators and for outputting a seeking condition signal, the seeking condition signal including at least one of: traffic flow specification data, elevator car specification data, and seeking command data;

a plurality of parameters;

a seeking apparatus for seeking an optimum set from a plurality of sets, said seeking apparatus comprising:

memorizing means for storing a plurality of sets including parent sets, and group management performance data for each set, each set including a plurality of parameter values to be input into the group management algorithm, the group management performance data including information regarding a waiting time of an elevator user, peak and average boarding time data, power consumption data, responding rate data, and prediction data resulting from execution of the group management algorithm using the respective sets;

numerical value exchanging means for producing two new sets partially inheriting a characteristic of the parent sets by exchanging a part of the parameter values of each parent set between the parent sets;

new value replacing means for producing one new set partially inheriting characteristics of one parent set selected from said memorizing means by replacing a part of the plurality of parameter values of the one parent set from said memorizing means with new numerical values generated in a random manner;

producing method selecting means for selecting a numerical value exchanging method and a new value replacing method in conjunction with a probability factor of each method;

estimating means for estimating a result of execution of the group management algorithm using the new set or sets in response to the seeking condition signal, the result of execution being group management performance data for each new set, the group management performance data including information regarding a waiting time of an elevator user, peak and average boarding time data, power consumption data, responding rate data, and prediction data resulting from execution of the group management algorithm using the respective sets;

adding means for additionally storing in said memorizing means only new sets satisfying an adding condition, the adding condition being based on the group management performance data for each new set, said adding means storing in said memorizing means the group management performance data corresponding to each new set with each new set stored in said memorizing means;

deleting means for deleting from said memorizing means impaired sets satisfying a deletion condition, the deletion condition being based on the group management performance data of each impaired set, said deleting means deleting the group management performance data corresponding to each impaired set with each impaired set deleted from said memorizing means; and extracting means for extracting an optimum set based on the group management performance data stored with the plurality of sets in said memorizing means.

17. A system as set forth in claim 16, further comprising modifying means for modifying the adding condition conditions.

18. A system as set forth in claim 17, wherein the adding condition is determined based on the group management performance data of respective sets stored in said memorizing means and is determined to be gradually stricter.

19. A system as set forth in claim 16, wherein said deleting means deletes sets whose performance estimation value is impaired.

20. A system as set forth in claim 19, wherein said deleting means deletes sets similar to another set based on the distance between sets.

21. A system as set forth in claim 16, further comprising initializing means for initializing seeking.

22. A system as set forth in claim 21, wherein: said initializing means includes a first initialization mode and a second initialization mode; in the first initialization mode, previously prepared plural sets are used for initialization; and in the second initialization mode plural sets improved at the last seeking cycle are used for initialization, whereby in accordance with a seeking start condition, the first initialization mode and the second initialization mode are selected.

23. A system as set forth in claim 16, further comprising end judging means for judging the end of seeking in accordance with circumstances of seeking.

24. A system as set forth in claim 23, wherein said end judging means judges the end of seeking based on the number of estimated sets.

25. A system as set forth in claim 23, wherein said end judging means judges the end of seeking based on the number of added sets.

26. A system as set forth in claim 23, wherein said end judging means judges the end of seeking based on a success index as a ratio of the number of added sets to the number of estimated sets.

27. A system as set forth in claim 23, wherein said end judging means computes distance between sets with respect to the plural sets stored in said memorizing means and judges the end of seeking based on the distance between sets.

28. A system as set forth in claim 16, further comprising re-seeking judging means for judging re-seeking based on finding of a change of premises given at a time of seeking start.

29. A system as set forth in claim 16, wherein said seeking apparatus is connected with a target value setting apparatus for setting a target value in association with the process of seeking.

30. A system as set forth in claim 16, wherein said seeking apparatus is connected to a group management apparatus including the group management algorithm and controls operation of said plural elevator cars and is connected to a simulator including the same group management algorithm as that of said group management apparatus and wherein said estimating means sets the executed results of simulations as the group management performance data.

31. A system as set forth in claim 30, wherein said seeking apparatus and said simulator are provided remotely from said group management apparatus and wherein said seeking apparatus and said group management apparatus are linked by a communication line.

32. A system as set forth in claim 16, wherein said seeking apparatus is connected to a group management apparatus including the group management algorithm and controls operation of said plural elevator cars and wherein said estimating means sets the executed results at a time that said group management apparatus implements the simulation of the group management algorithm as the group management performance data.

33. A system as set forth in claim 32, wherein said seeking apparatus is provided remotely to said group management apparatus, and said seeking apparatus and said group management apparatus are linked by a communication line.

34. A system for group managing a plurality of elevator cars according to a group management algorithm including:

a group management apparatus for implementing a group management algorithm for controlling a plurality of elevators and for outputting a seeking condition signal, the seeking condition signal including at least one of: traffic flow specification data, elevator car specification data, and seeking command data;

a plurality of parameters; and a seeking apparatus for seeking an optimum set from a plurality of sets, said seeking apparatus comprising:

memorizing means for storing a plurality of sets, including parent sets, and group management performance data for each set, each set including a plurality of parameter values to be input into the group management algorithm, the group management performance data including information regarding a waiting time of an elevator user, peak and average boarding time data, power consumption data, responding rate data, and prediction data resulting from execution of the group management algorithm using the respective sets;

numerical value exchanging means for producing two new sets partially inheriting a characteristic of the parent sets by exchanging a part of the parameter values of each parent set between the parent sets;

new value replacing means for producing one new set partially inheriting characteristics of one parent set selected from said memorizing means by replacing a part of the plurality of parameter values of the one set with new numerical values generated in a random manner;

producing method selecting means for selecting a numerical value exchanging method and a new value replacing method in conjunction with a probability of each method;

estimating means for estimating a result of execution of the group management algorithm using the new set or sets in response to the seeking condition signal, the result of execution being group management performance data for each new set, the group management performance data including information regarding a waiting time of an elevator users, peak and average boarding time data, power consumption data, responding rate data, and prediction data resulting from execution of the group management algorithm using the respective sets;

adding means for additionally storing in said memorizing means only new sets satisfying an adding condition, the adding condition being based on the group management performance data for each new set, the adding means storing the group management performance data corresponding to each new set with each new set stored in said memorizing means;

deleting means for deleting from said memorizing means impaired sets satisfying a deletion condition, the deletion condition being based on the group management performance data of each impaired set, said deleting means deleting the group management performance data corresponding to each impaired set along with each impaired set deleted from said memorizing means; and extracting means for extracting an optimum set based on the group management performance data stored with the plurality of sets stored in said memorizing means.

35. A system for group managing a plurality of elevator cars according to a group management algorithm including:

a group management apparatus for implementing a group management algorithm for controlling a plurality of elevators and for outputting a seeking condition signal, the seeking condition signal including at least one of: traffic flow specification data, elevator car specification data, and seeking command data;

a plurality of parameters; and a seeking apparatus for seeking an optimum set from a plurality of sets, said seeking apparatus comprising:

memorizing means for storing a plurality of sets and group management performance data for each set, each set including a plurality of parameter values to be input into the group management algorithm, the group management performance data including information regarding a waiting time of an elevator user, peak and average boarding time data, power consumption data, responding rate data, and prediction data resulting from execution of the group management algorithm using the respective sets;

crossover producing means for producing two new sets partially inheriting characteristics of two parent sets selected from said memorizing means by exchanging a part of the plurality of parameter values between the two parent sets from said memorizing means;

estimating means for estimating a result of execution of the group management algorithm using the new set or sets in response to the seeking condition signal, the result of execution being group management performance data for each new set, the group management performance data including information regarding a waiting time of an elevator users, peak and average boarding time data, power consumption data, responding rate data, and prediction data resulting from simulation of the group management algorithm using the respective sets;

selecting means for improving the plurality of sets stored in said memorizing means by adding the new sets to said memorizing means based on the group management performance data of each new set, said selecting means storing in said memorizing means the group management performance data corresponding to each new set with each new set stored in said memorizing means, and by deleting impaired sets from said memorizing means based on the group management performance data of each impaired set, said deleting means deleting the group management performance data corresponding to each of the impaired sets along with each impaired set deleted from said memorizing means; and extracting means for extracting an optimum set based on the group management performance data of the plurality of sets stored in said memorizing means.

36. A system for group managing a plurality of elevator cars according to a group management algorithm including a plurality of parameters, said system including:

a group management apparatus for implementing a group management algorithm for controlling a plurality of elevators and for outputting a seeking condition signal, the seeking condition signal including at least one of: traffic flow specification data, elevator car specification data, and seeking command data; and a seeking apparatus for seeking an optimum set from a plurality of sets, said seeking apparatus comprising:

memorizing means for storing a plurality of sets and group management performance data for each set, each set including a plurality of parameter values to be input into the group management algorithm, the group management performance data including information regarding a waiting time of an elevator user, peak and average boarding time data, power consumption data, responding rate data, and prediction data resulting from execution of the group management algorithm using the respective sets;

mutation producing means for producing one new set partially inheriting a characteristic of one parent set selected from said memorizing means by replacing a part of the plurality parameter values of the one parent set with a new numerical value randomly generated;

estimating means for estimating a result of execution of the group management algorithm using the new set or sets in response to the seeking condition signal, the result of execution being group management performance data for each new set, the group management performance data including information regarding a waiting time of an elevator users, peak and average boarding time data, power consumption data, responding rate data, and prediction data resulting from execution of the group management algorithm using the respective sets;

selecting means for improving the plurality of sets stored in said memorizing means by adding the new set to said memorizing means based on the group management performance data of the new set, said selecting means storing in said memorizing means the group management performance data corresponding to the new set along with the new set in said memorizing means and by deleting an impaired set from said memorizing means based on the group management performance data of the impaired set, said selecting means deleting the group management performance data corresponding to the impaired set along with the impaired set; and extracting means for extracting the optimum set based on the group management performance value among plural sets improved and stored in said memorizing means.

37. The system of claim 1, wherein the prediction data includes a prediction error rate and a prediction alteration rate for each set.

38. The system of claim 16, wherein the prediction data includes a prediction error rate and a prediction alteration rate for each set.

39. The system of claim 34, wherein the prediction data includes a prediction error rate and a prediction alteration rate for each set.

40. The system of claim 35, wherein the prediction data includes a prediction error rate and a prediction alteration rate for each set.

41. The system of claim 36, wherein the prediction data includes a prediction error rate and a prediction alteration rate for each set.

42. The system of claim 1, wherein each set includes at least about twenty-five parameter values.

43. The system of claim 16 wherein each set includes at least about twenty-five parameter values.

44. The system of claim 34, wherein each set includes at least about twenty-five parameter values.

45. The system of claim 35, wherein each set includes at least about twenty-five parameter values.

46. The system of claim 36, wherein each set includes at least about twenty-five parameter values.

* * * * *

UNITED STATES PATENT AND TRADEMARK OFFICE
CERTIFICATE OF CORRECTION

PATENT NO. : 5,780,789
DATED : July 14, 1998
INVENTOR(S) : Shintaro Tsuji

It is certified that error appears in the above-identified patent and that said Letters Patent is hereby corrected as shown below:

Column 63, Line 7, before "group" insert --a--;

Column 64, Line 5-6, delete "conditions";

Column 65, Line 53, change "users" to --user--;

Column 66, Line 41, change "users" to --user--.

Signed and Sealed this

Twenty-fourth Day of November, 1998

Attest:

Bruce Lehman

BRUCE LEHMAN

*Attesting Officer* *Commissioner of Patents and Trademarks*